US012540220B2

(12) United States Patent
Xi et al.

(10) Patent No.: US 12,540,220 B2
(45) Date of Patent: Feb. 3, 2026

(54) LIGHT-ACTIVATED COUPLING OF OLIGONUCLEOTIDES TO POLYMERS

(71) Applicant: ILLUMINA, INC., San Diego, CA (US)

(72) Inventors: Weixian Xi, San Diego, CA (US); Tanmay Ghonge, San Diego, CA (US); Sahngki Hong, San Diego, CA (US); Alexandra Szemjonov, Cambridge (GB)

(73) Assignee: ILLUMINA, INC., San Diego, CA (US)

( * ) Notice: Subject to any disclaimer, the term of this patent is extended or adjusted under 35 U.S.C. 154(b) by 670 days.

(21) Appl. No.: 17/815,979

(22) Filed: Jul. 29, 2022

(65) Prior Publication Data

US 2023/0102550 A1  Mar. 30, 2023

Related U.S. Application Data

(60) Provisional application No. 63/227,776, filed on Jul. 30, 2021.

(51) Int. Cl.
*C08J 3/28* (2006.01)
*B33Y 30/00* (2015.01)
*C08F 2/48* (2006.01)

(52) U.S. Cl.
CPC .............. *C08J 3/28* (2013.01); *C08F 2/48* (2013.01); *C08J 2300/106* (2013.01)

(58) Field of Classification Search
None
See application file for complete search history.

(56) References Cited

U.S. PATENT DOCUMENTS

| | | | | |
|---|---|---|---|---|
| 6,033,784 A | * | 3/2000 | Jacobsen | C07K 1/042 427/508 |
| 9,994,687 B2 | | 6/2018 | Berti et al. | |
| 2005/0148027 A1 | | 7/2005 | Pirrung et al. | |
| 2006/0008840 A1 | | 1/2006 | Goldberg et al. | |
| 2007/0255054 A1 | | 11/2007 | Kuimelis et al. | |
| 2008/0206752 A1 | * | 8/2008 | Balakirev | G01N 33/54353 435/6.11 |
| 2012/0053299 A1 | | 3/2012 | Popik et al. | |
| 2018/0195950 A1 | | 7/2018 | Tsay et al. | |
| 2022/0289876 A1 | * | 9/2022 | Mather | C08F 8/00 |

FOREIGN PATENT DOCUMENTS

| | | | | |
|---|---|---|---|---|
| CN | 101298464 A | * | 11/2008 | .......... B01J 19/0046 |
| CN | 101360834 A | * | 2/2009 | ........ C12N 15/1093 |
| CN | 101024856 B | * | 12/2012 | |
| CN | 110055318 A | | 7/2019 | |
| EP | 2859055 | | 12/2013 | |
| FR | 2737012 A1 | * | 1/1997 | ............. C07K 17/14 |
| WO | 2006084482 A1 | | 8/2006 | |
| WO | 2013012440 A1 | | 1/2013 | |
| WO | 2013184796 A1 | | 12/2013 | |
| WO | 2015002813 A1 | | 1/2015 | |
| WO | 2020097005 A1 | | 5/2020 | |
| WO | 2021028815 A1 | | 2/2021 | |
| WO | 2022192083 A1 | | 9/2022 | |

OTHER PUBLICATIONS

Huang et al., "Spatiotemporal patterning of photoresponsive DNA-based hydrogels to tune local cell response," Nature Communications, 2021, 12(1):2364.
Fodor et al., "Light-Directed, Spatially Addressable Parallel Chemical Synthesis," Science, 1991, 251(4995):767-773.
Kaur et al., "Photochemical tuning of materials: A click chemistry perspective," Materials Today Chemistry, 2018, 8:56-84.
Faribanks et al., "Photoclick Chemistry: A Bright Idea," Chemical Reviews, 2021, 121(12):6915-6990.
Manning et al., "Use of Oligonucleotides Carrying Photolabile Groups for the Control of the Deposition of Nanoparticles in Surfaces and Nanoparticle Association," International Journal of Molecular Sciences, 2021, 12:7238,7249.
Orski et al., "High density Orthogonal Surface Immobilization via Photoactivated Copper-Free Click Chemistry," Journal of the American Chemical Society, 2010, 132(32):11024-11026.
Situma et al., "Fabrication of DNA microarrays onto poly(methyl methacrylate) with ultraviolet patterning and microfluidics for the detection of low-abundant point mutations," Analytical Biochemistry, 2005, 340(1):123-135.
Kehagias et al.; "Stamp replication for thermal and UV nanoimprint lithography using a UV-sensitive silsesquioxane resist"; Microelectronic Engineering 2009; 86:776-778.
Li et al.; "A Dual Wavelength Polymerization and Bioconjugation Strategy for High Throughput Synthesis of Multivalent Ljgands"; J. Am Chem. Soc. 2019; 141:19823-19830.
Luo et al.; "Investigation of Au SAMs Photoclick Derivatization by PM-IRRAS"; Langmuir 2020; 36:1014-1022.
Shao et al.; "Diphenyl cyclopropenone-centered polymers for site-specific CO-releasing and chain dissociation"; Chinese Chemical Letters 2020; 31:299-302.
Bjerknes et al.; "Facile Quenching and Spatial Patterning of Cylooctynes via Strain-Promoted Alkyne-Azide Cycloaddition of Inorganic Azides"; Bioconjugate Chemistry 2017; 28(5):1560-1565.
Chrisey et al.; "Fabrication of patterned DNA surfaces"; Nucleic Acids Research 1996; 24(15):3040-3047.

(Continued)

*Primary Examiner* — Sanza L. McClendon
(74) *Attorney, Agent, or Firm* — Heslin Rothenberg Farley & Mesiti P.C.

(57) ABSTRACT

Provided herein are various examples of a method of coupling oligonucleotides to a polymer. The method may include selectively irradiating first inactive moieties in a one or more first region of a polymer with light, while not irradiating second inactive moieties in a one or more second region of the polymer, to generate first active moieties in the one or more first region of the polymer. The method may also include coupling the first active moieties to first oligonucleotides. The method may further include irradiating the second inactive moieties in the one or more second region of the polymer with light to generate second active moieties in the one or more second region of the polymer. The method may also include coupling the second active moieties to second oligonucleotides.

23 Claims, 24 Drawing Sheets

(56) References Cited

OTHER PUBLICATIONS

Kumar et al.; "Light-Triggered Click Chemistry"; Chemical Reviews 2020; 121(12):6991-7031.
Mcnitt et al.; "Multiphoton Activation of Photo-Strain-Promoted Azide Alkyne Cycloaddition "Click" Reagents Enables In Situ Labeling with Submicrometer Resolution"; Journal of the American Chemical Society 2017; 139(40):14029-14032.
Miyahara et al.; "A Cu-free clickable surface with controllable surface density"; Colloid & Polymer Science 2019; 297(6):927-931.
Qu et al.; "Cyclopropenone-masked dibenzocyclooctyne end-functionalized polymers from reversible addition-fragmentation chain transfer polymerization"; Polymer 2017; 114:36-43.
Sun et al.; "Well-defined cyclopropenone-masked dibenzocyclooctyne functionalized polymers from atom transfer radical polymerization"; Polymer 2015; 64:202-209.
Tasdelen et al.; "Externally stimulated click reactions for macromolecular syntheses"; Progress in Polymer Science 2016; 52:19-78.
Voelkerding et al.; "Next-Generation Sequencing: From Basic Research to Diagnostics"; Clinical Chemistry 2009; 55(4):641-658.
Arumugam et al., "Patterned Surface Derivatization Using Diels-Alder Photoclick Reaction", Journal of the American Chemical Society 133(39):15730-15736 (Sep. 9, 2011).
Arumugam et al., "Photo-click chemistry strategies for spatiotemporal control of metal-free ligation, labeling, and surface derivatization", Pure & Applied Chemistry 85(7):1499-1513 (May 23, 2013).

* cited by examiner

LIGHT-ACTIVATED COUPLING OF OLIGONUCLEOTIDES TO POLYMERS

CROSS-REFERENCE TO RELATED APPLICATIONS

This application claims priority to U.S. Provisional Patent Application No. 63/227,776, which was filed on July 30, 2021, and is incorporated by reference herein in its entirety.

BACKGROUND

Cluster amplification is an approach to amplifying polynucleotides, for example for use in genetic sequencing. Target polynucleotides are captured by primers (e.g., P5 and P7 primers) coupled to a substrate surface in a flowcell, and form "seeds" at random locations on the surface. Cycles of amplification are performed to form clusters on the surface around each seed. The clusters include copies, and complementary copies, of the seed polynucleotides. In some circumstances, the substrate is patterned so as to define regions that bound different clusters, such as wells that may be filled with respective clusters.

SUMMARY

Shortcomings of the prior art can be overcome and benefits and advantages as described later in this disclosure can be achieved through the provision of a method for coupling oligonucleotides to a polymer. Various examples of the method are described below, and the method, including and excluding the additional examples enumerated below, in any combination (provided these combination are not inconsistent), overcome these shortcomings. The method comprises: selectively irradiating first inactive moieties in a one or more first region of a polymer with light, while not irradiating second inactive moieties in a one or more second region of the polymer, to generate first active moieties in the one or more first region of the polymer; coupling the first active moieties to first oligonucleotides; irradiating the second inactive moieties in the one or more second region of the polymer with light to generate second active moieties in the one or more second region of the polymer; and coupling the second active moieties to second oligonucleotides.

In some examples of the method, one or both of the first inactive moieties and the second inactive moieties comprise a protecting group wherein the protecting group is selected from an o-nitrobenzyl having a structure selected from

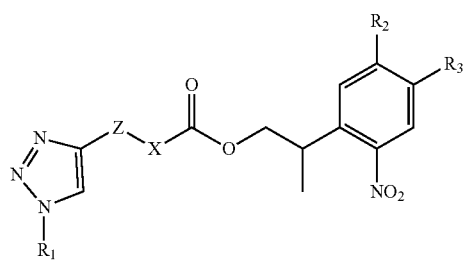

and

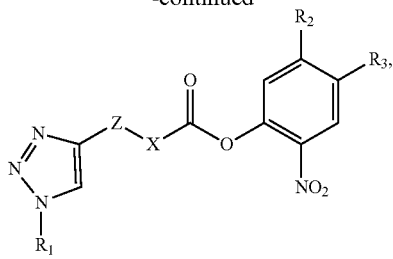

wherein $R_2$ and $R_3$ are each independently selected from —H and —O—$CH_3$, and a benzopyrone having a structure

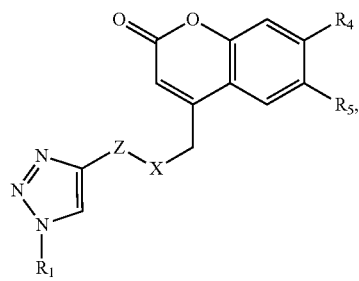

wherein $R_4$ is selected from —H, —O—$CH_3$, and —N—$(CH_3)_2$, and $R_5$ is selected from —H and —Br, Z comprises an alkane comprising one or more of —$CH_2$—, (—$CH_2$—)$_m$, and (—$CH_2$—O—)$_n$, wherein and n are independently an integer from 0 to 50, and X is selected from —S and —N(H)— and $R_1$ is a linkage to a backbone of the polymer.

In some examples of the method, one or both of the first active moieties and the second active moieties comprise a triazole:

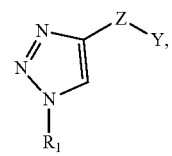

wherein Z comprises an alkane comprising one or more of —$CH_2$—, (—$CH_2$—)$_m$, and (—$CH_2$—O—)$_n$, wherein m and n are independently an integer from 0 to 50, and Y comprises a backbone reactive group selected from an amine and a thiol.

In some examples of the method, the backbone reactive group comprises an amine.

In some examples of the method, the first oligonucleotides or second oligonucleotides are coupled to oligonucleotide reactive groups and the oligonucleotide reactive groups are selected from N-hydroxysuccinimide esters, carboxylic acids, and o-acylisoureas that react with the amine to form a coupling having the structure:

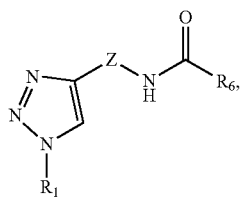

wherein Z comprises an alkane comprising one or more of —CH$_2$—, (—CH$_2$)$_m$, and (—CH$_2$—O—)$_n$, wherein m and n are independently an integer from 0 to 50, and R$_6$ comprises the first oligonucleotides or the second oligonucleotides.

In some examples of the method, the backbone reactive group comprises a thiol.

In some examples of the method, the first oligonucleotides or second oligonucleotides are coupled to oligonucleotide reactive groups and the oligonucleotide reactive groups are vinylsulfones that react with the thiol to form a coupling having the structure:

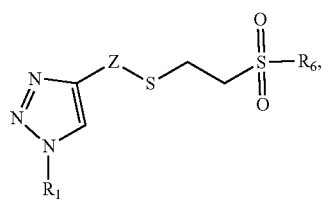

wherein Z comprises an alkane comprising one or more of —CH$_2$—, (—CH$_2$)$_m$, and (—CH$_2$—O—)$_n$, wherein m and n are independently an integer from 0 to 50, and R$_6$ comprises the first oligonucleotides or the second oligonucleotides.

In some examples of the method, the first oligonucleotides or second oligonucleotides are coupled to oligonucleotide reactive groups and the oligonucleotide reactive groups are maleimides that react with the thiol to form a coupling having the structure:

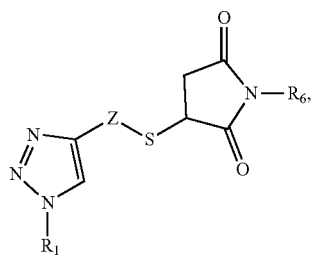

wherein Z comprises an alkane comprising one or more of —CH$_2$—, (—CH$_2$)$_m$, and (—CH$_2$—O—)$_n$, wherein m and n are independently an integer from 0 to 50, and R$_6$ comprises the first oligonucleotides or the second oligonucleotides.

In some examples of the method, the first oligonucleotides or second oligonucleotides are coupled to oligonucleotide reactive groups and the oligonucleotide reactive groups are acrylamides that react with the thiol to form a coupling having the structure:

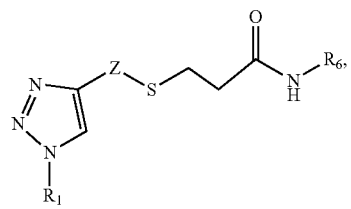

wherein Z comprises an alkane comprising one or more of —CH$_2$—, (—CH$_2$)$_m$, and (—CH$_2$—O—)$_n$, wherein m and n are independently an integer from 0 to 50, and R$_6$ comprises the first oligonucleotides or the second oligonucleotides.

Shortcomings of the prior art can be overcome and benefits and advantages as described later in this disclosure can be achieved through the provision of a method for coupling oligonucleotides to a polymer. Various examples of the method are described below, and the method, including and excluding the additional examples enumerated below, in any combination (provided these combination are not inconsistent), overcome these shortcomings. The method comprises: selectively irradiating first moieties in a one or more first region of a polymer with light in the presence of a photoinitiator, while not irradiating second moieties in a one or more second region of the polymer, to couple the first active moieties to first oligonucleotides; and irradiating the second moieties in the one or more second region of the polymer with light to couple the second active moieties to second oligonucleotides, wherein one or both of the first oligonucleotides and the second oligonucleotides comprise a thiol group.

In some examples of the method, one or both of the first inactive moieties and the second inactive moieties comprise alkenes having a structure:

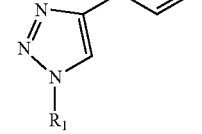

wherein Z comprises an alkane comprising one or more of —CH$_2$—, (—CH$_2$)$_m$, and (—CH$_2$—O—)$_n$, wherein m and n are independently an integer from 0 to 50, In some examples of the method, the first oligonucleotides or second oligonucleotides are coupled to polymer reactive groups and the polymer reactive groups are alkenes that react with the thiol group to form a coupling having the structure:

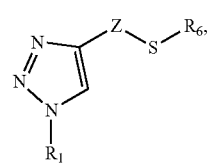

wherein Z comprises an alkane comprising one or more of —CH$_2$—, (—CH$_2$)$_m$, and (—CH$_2$—O—)$_n$, wherein m and n are independently an integer from 0 to 50, and R$_6$ comprises the first oligonucleotides or the second oligonucleotides.

In some examples of the method, the photoinitiator is selected from one or more of phenyl bis(2,4,6-trimethylbenzoyl) phosphine oxide, 2-hydroxy-2-methyl-1-phenyl-propan-1-one, 2-hydroxy-4'-(2-hydroxyethoxy)-2-methylpropiophenone, 2,2'-azobis[2-methyl-n-(2-hydroxyethyl) propionamide], 2,2-dimethoxy-2-phenylacetophenone, diphenyl(2,4,6-trimethylbenzoyl)phosphine oxide, lithium phenyl(2,4,6-trimethylbenzoyl)phosphinate, and ethyl (2,4,6-trimethylbenzoyl)phenylphosphonate.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: selectively irradiating first co-monomers with light in the presence of a photoinitiator, wherein one or more of the first co-monomers comprise first oligonucleotides, while not irradiating second co-monomers wherein one or more of the second co-monomers comprise second oligonucleotides, to polymerize the first co-monomers forming a one or more first region of the polymer; and irradiating the second co-monomers in the presence of the photoinitiator to polymerize the second co-monomers forming a one or more second region of the polymer.

In some examples of the method, polymerizing one or both of the first co-monomers and second co-monomers comprises a light-induced reaction forming a polymer network:

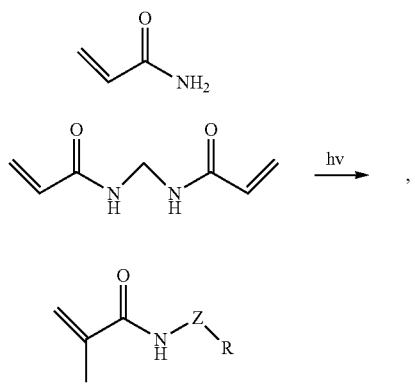

wherein R comprises the first oligonucleotides or the second oligonucleotides, and Z comprises an alkane including one or more of —CH$_2$—, (—CH$_2$)$_m$, and (—CH$_2$—O—)$_n$, wherein m and n are independently an integer from 0 to 50.

In some examples of the method, the photoinitiator is selected from one or more of phenyl bis(2,4,6-trimethylbenzoyl) phosphine oxide, 2-hydroxy-2-methyl-1-phenyl-propan-1-one, 2-hydroxy-4'-(2-hydroxyethoxy)-2-methylpropiophenone, 2,2'-azobis[2-methyl-n-(2-hydroxyethyl) propionamide], 2,2-dimethoxy-2-phenylacetophenone, diphenyl(2,4,6-trimethylbenzoyl)phosphine oxide, lithium phenyl(2,4,6-trimethylbenzoyl)phosphinate, and ethyl (2,4,6-trimethylbenzoyl)phenylphosphonate.

In some examples of the method, the first oligonucleotides comprise a mixture of first primers lacking an excision moiety and second primers comprising an excision moiety.

In some examples of the method, the second oligonucleotides comprise a mixture of third primers comprising an excision moiety and fourth primers lacking an excision moiety.

In some examples of the method, the first and third primers have the same sequence as one another except for the excision moiety, and wherein the second and fourth primers have the same sequence as one another except for the excision moiety.

In some examples of the method, the sequences of the first and second primers are orthogonal to one another, and wherein the sequences of the third and fourth primers are orthogonal to one another.

In some examples of the method, the one or more first region of the polymer comprises a plurality of first subregions, and wherein the one or more second region of the polymer comprises a plurality of second subregions.

In some examples of the method, a plurality of the first subregions each comprise a contiguous first subregion and a plurality of the second subregions each comprise a second contiguous subregion, wherein each contiguous first subregions is contiguous with a corresponding one of the contiguous second subregions.

In some examples of the method, the method includes a substrate, wherein the substrate comprises a plurality of nanowells, and one or more of the plurality of nanowells contains a contiguous subregion and a corresponding contiguous second subregion.

Shortcomings of the prior art can be overcome and benefits and advantages as described later in this disclosure can be achieved through a polymer. Various examples of this polymer are described below, and the polymer, including and excluding the additional examples enumerated below, in any combination (provided these combination are not inconsistent), overcome these shortcomings. The polymer comprises: a poly(o-nitrobenzyl-masked acrylamide-co-acrylamide) copolymer having a structure selected from:

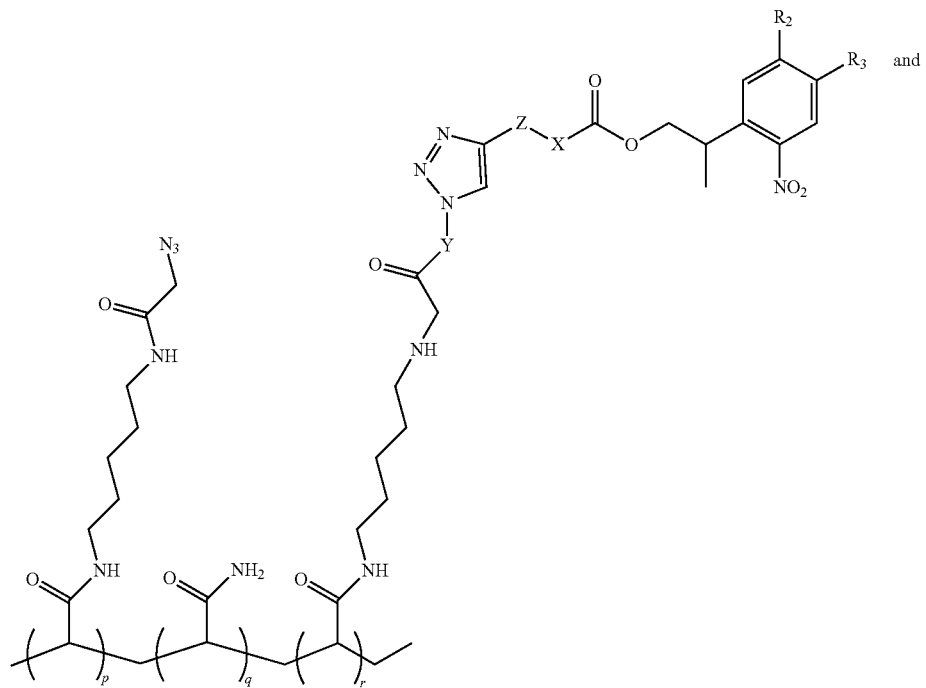
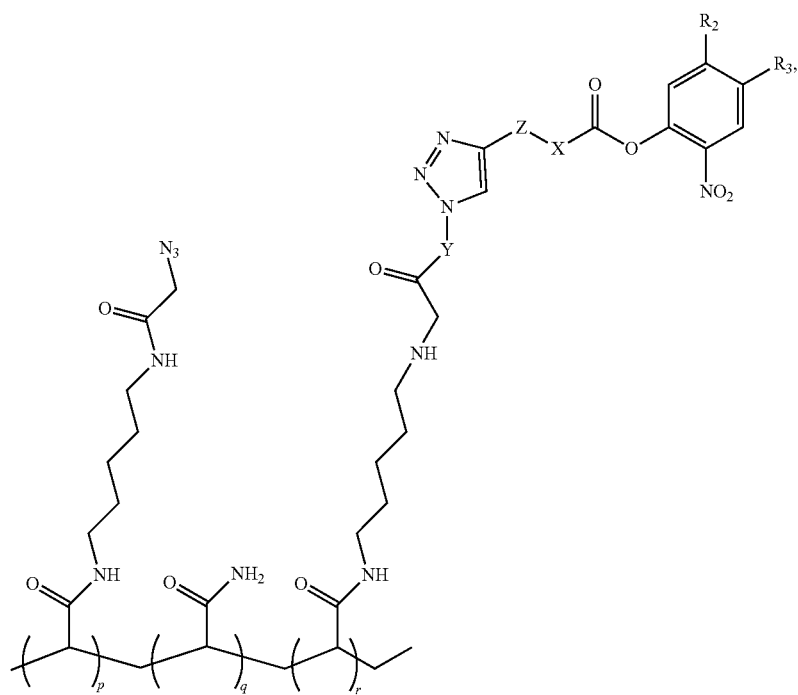

wherein $R_2$ and $R_3$ are each independently selected from —H and —O—$CH_3$, X is selected from —S and —N(H)—, Y is selected from —C($H_2$)—, —(C($H_2$)—C($H_2$)—O)$_s$ wherein s is an integer from 1 to 10, and

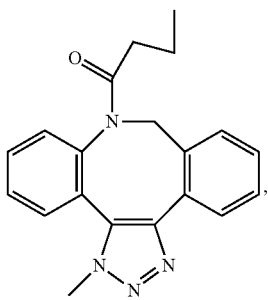

Z comprises an alkane comprising one or more of —$CH_2$—, (—$CH_2$)$_m$, and (—$CH_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through a polymer. Various examples of this polymer are described below, and the polymer, including and excluding the additional examples enumerated below, in any combination (provided these combination are not inconsistent), overcome these shortcomings. The polymer comprises: a poly(benzopyrone-masked acrylamide-co-acrylamide) copolymer having a structure:

wherein $R_4$ is selected from —H, —O—$CH_3$, and —N—($CH_3$)$_2$, and $R_5$ is selected from —H and —Br, X is selected from —S and —N(H)—, Y is selected from —C($H_2$)—, —(C($H_2$)—C($H_2$)—O)$_s$ wherein s is an integer from 1 to 10, and

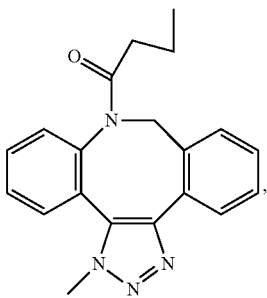 [SMILES: CCCC(=O)N1Cc2ccccc2-c2nnn(C)c2-c2ccccc21]

Z comprises an alkane comprising one or more of —$CH_2$—, (—$CH_2$)$_m$, and (—$CH_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through a polymer. Various examples of this polymer are described below, and the polymer, including and excluding the additional examples enumerated below, in any combination (provided these combination are not inconsistent), overcome these shortcomings. The polymer comprises: a poly(aminotriazole-acrylamide-co-acrylamide) copolymer having a structure:

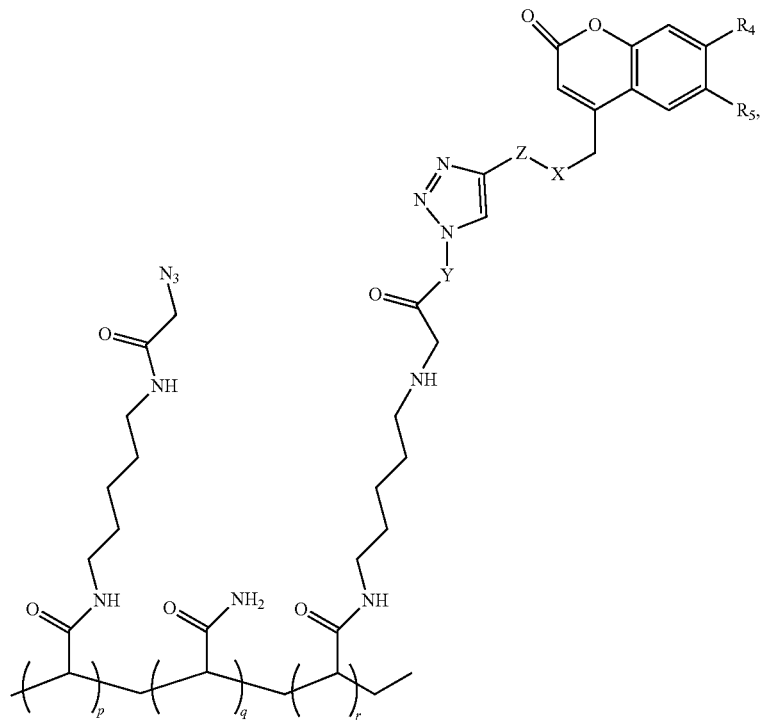

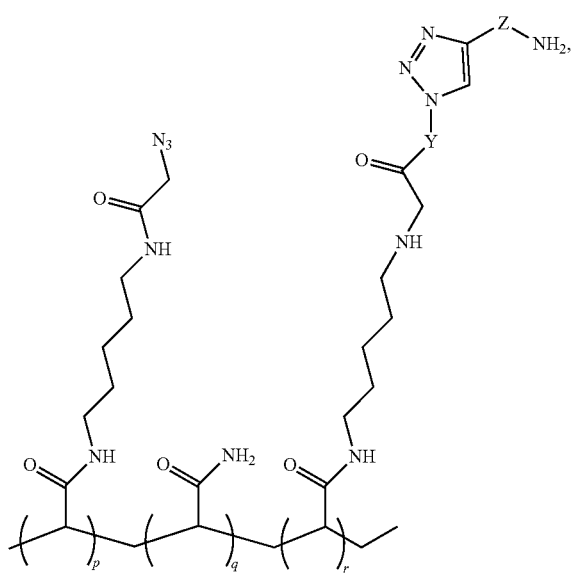

wherein Y is selected from —C(H$_2$)—, —(C(H$_2$)—C(H$_2$)—O)$_s$ wherein s is an integer from 1 to 10, and wherein
Y is selected from —C(H$_2$)—, —(C(H$_2$)—C(H$_2$)—O)$_s$
wherein s is an integer from 1 to 10, and

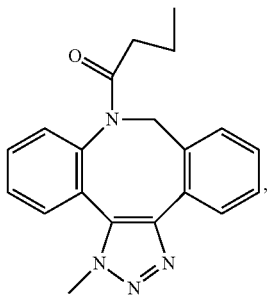 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through a polymer. Various examples of this polymer are described below, and the polymer, including and excluding the additional examples enumerated below, in any combination (provided these combination are not inconsistent), overcome these shortcomings. The polymer comprises: a poly(thiotriazole-acrylamide-co-acrylamide) copolymer having a structure:

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

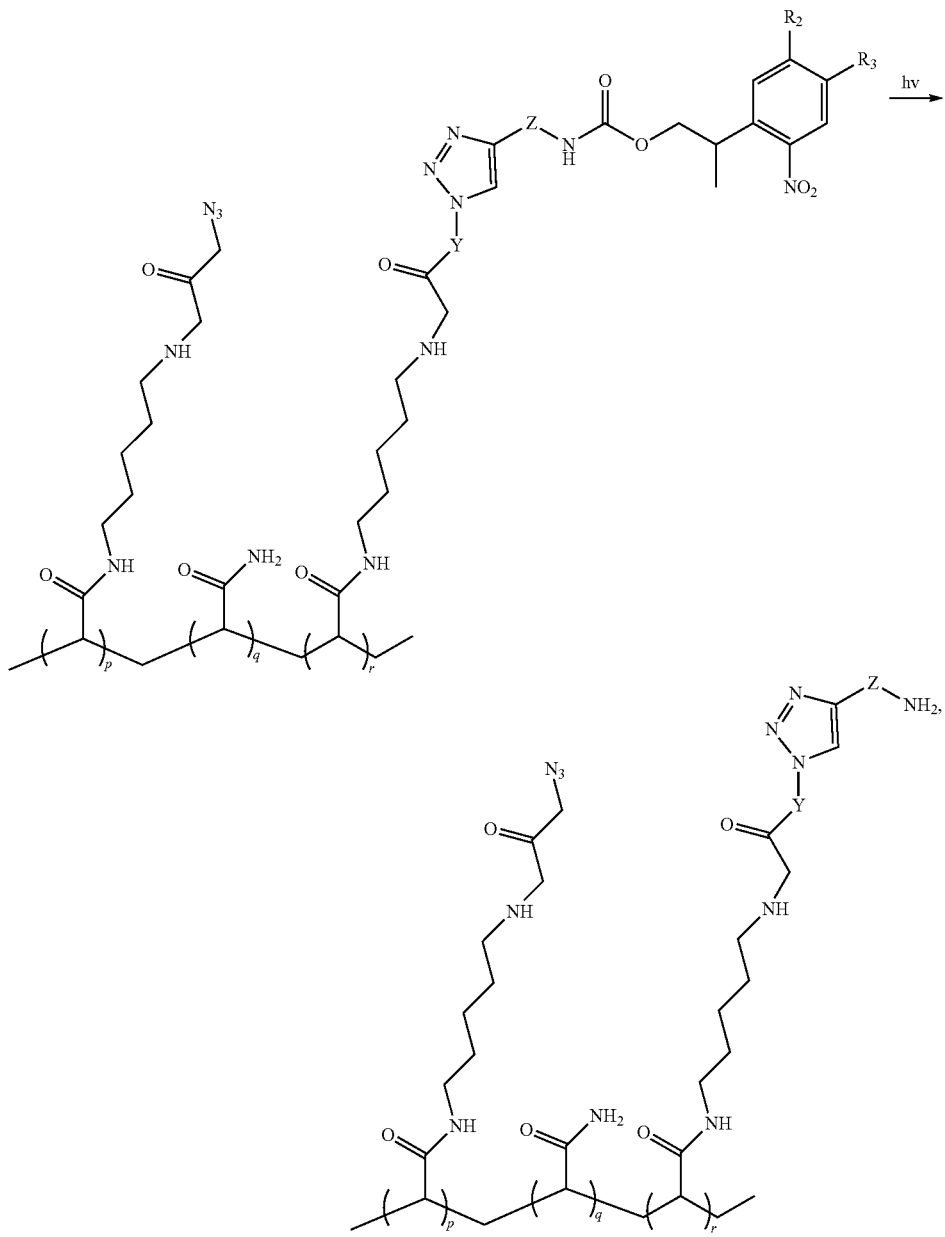

wherein
Y is selected from —C(H$_2$)—, —(C(H$_2$)—C(H$_2$)—O)$_s$ wherein s is an integer from 1 to 10, and

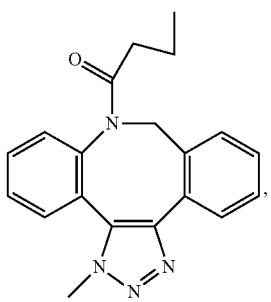 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

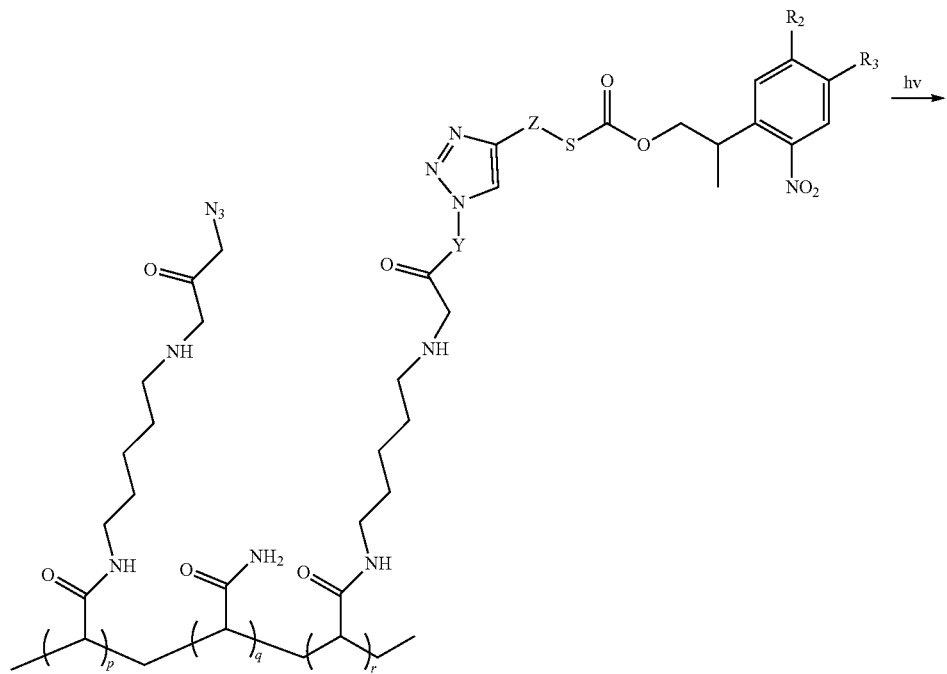
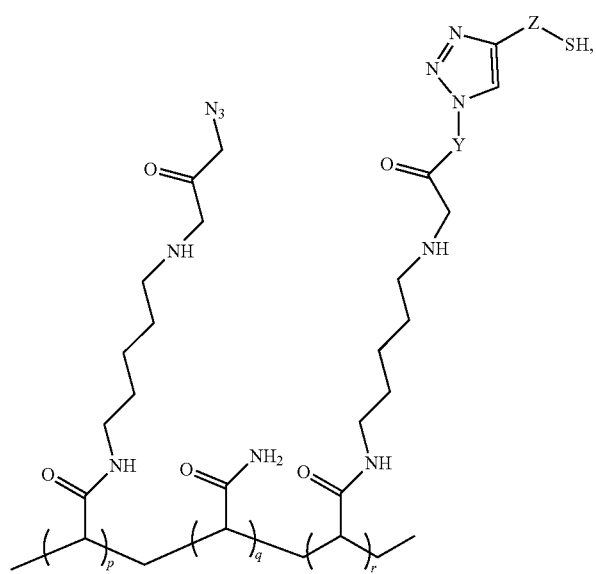

wherein

Y is selected from —C(H$_2$)—, —(C(H$_2$)—C(H$_2$)—O)$_s$ wherein s is an integer from 1 to 10, and

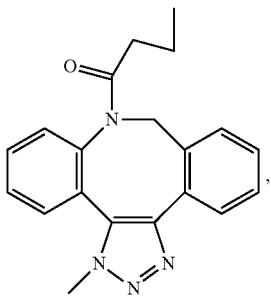 [SMILES: CCCC(=O)N1Cc2ccccc2-c2nnn(C)c2-c2ccccc21]

Z comprises an alkane comprising one or more of —CH$_2$—, (—CH$_2$)$_m$, and —CH$_2$—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

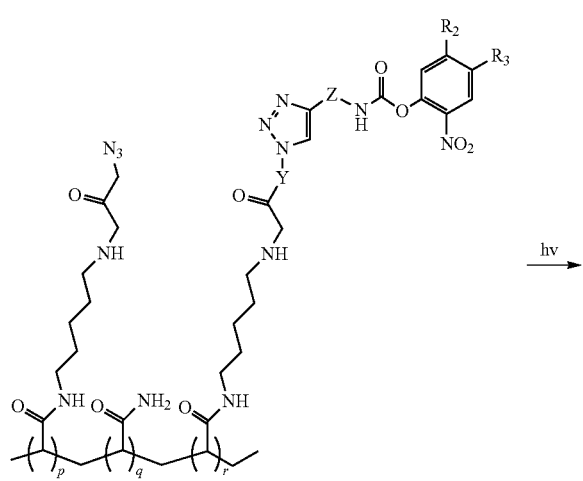

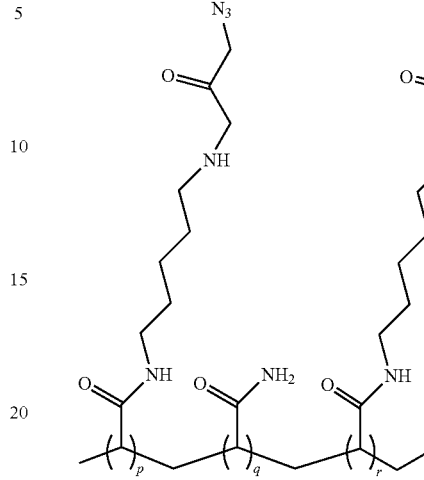

wherein

Y is selected from —C(H$_2$)—, —(C(H$_2$)—C(H$_2$)—O)$_s$ wherein s is an integer from 1 to 10, and

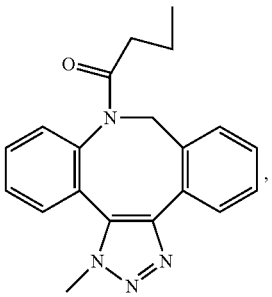

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

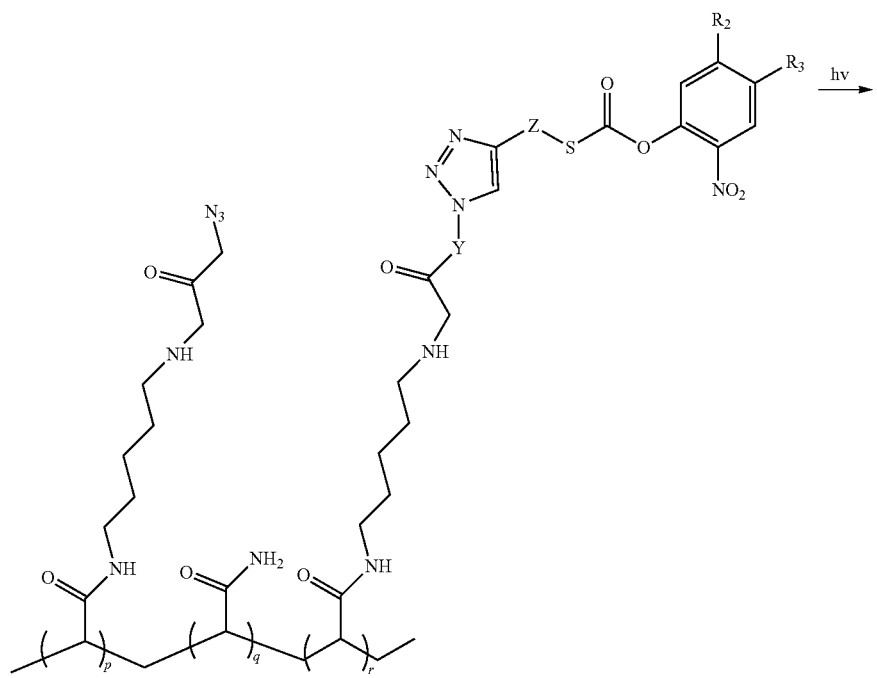
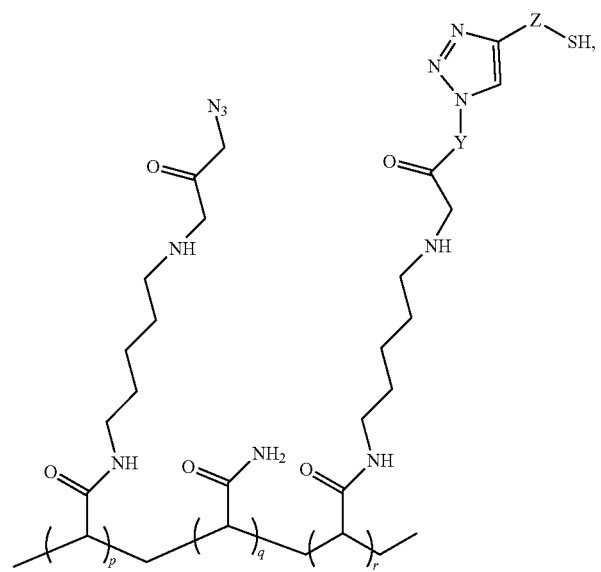

wherein
Y is selected from —C(H$_2$)—, —(C(H$_2$)—C(H$_2$)—O)$_s$ wherein s is an integer from 1 to 10, and

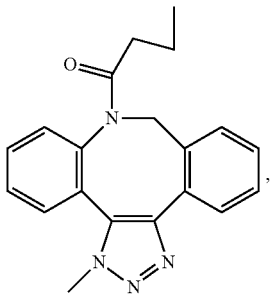 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

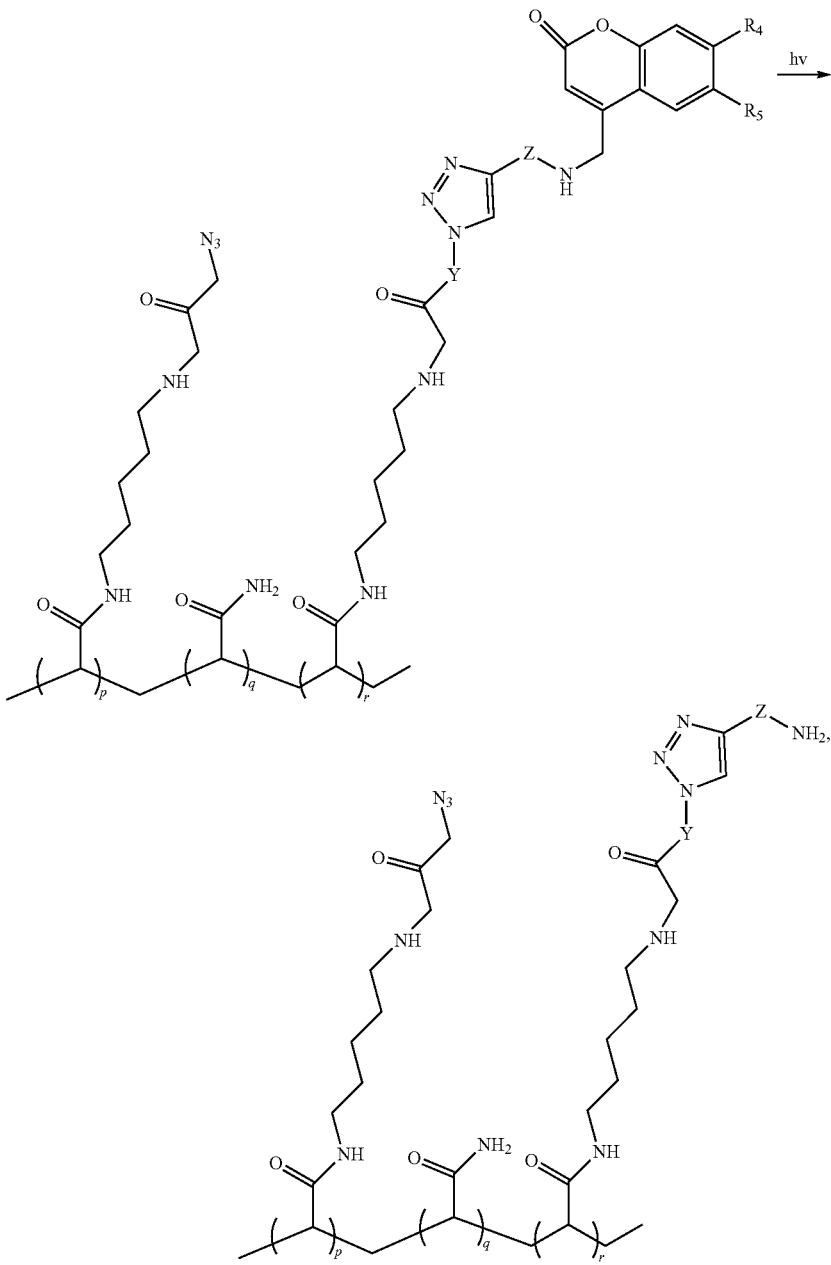

wherein

Y is selected from —C(H$_2$)—, —(C(H$_2$)—C(H$_2$)—O)$_s$ wherein s is an integer from 1 to 10, and

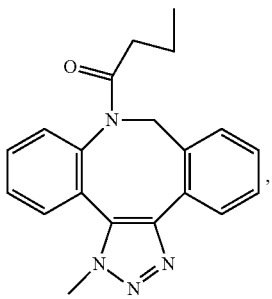 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through the provision of a method for making a polymer. Various examples of the method are described below, and the method, including and excluding the additional examples enumerated below, in any combination (provided these combination are not inconsistent), overcome these shortcomings. The method comprises: a light-induced reaction:

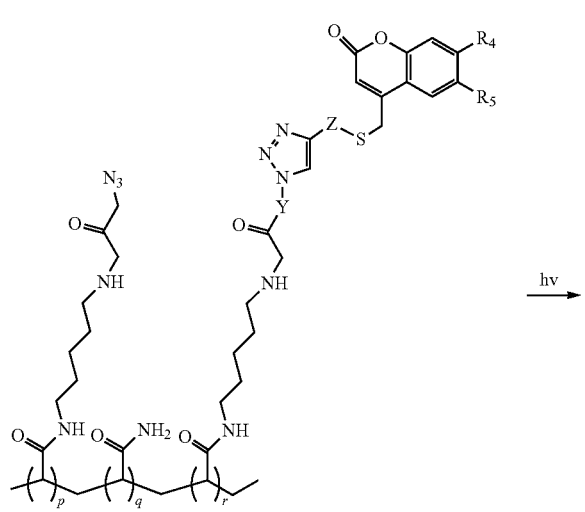

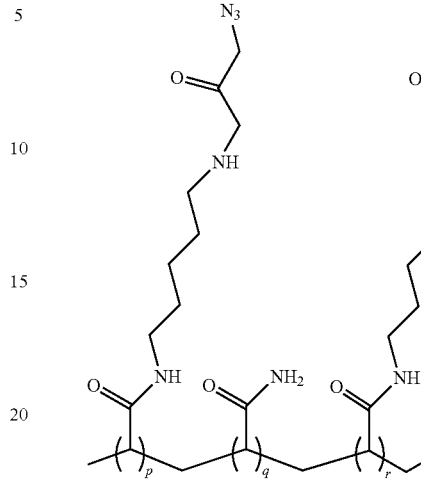

wherein

Y is selected from —C(H$_2$)—, —(C(H$_2$)—C(H$_2$)—O)$_s$ wherein s is an integer from 1 to 10, and

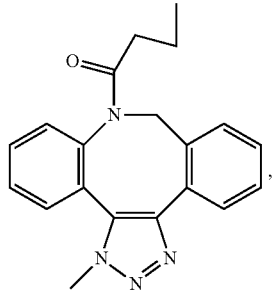 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

Shortcomings of the prior art can be overcome and benefits and advantages as described later in this disclosure can be achieved through a polymer. Various examples of this polymer are described below, and the polymer, including and excluding the additional examples enumerated below, in any combination (provided these combination are not inconsistent), overcome these shortcomings. The polymer comprises: a poly(alkenyltriazole-acrylamide-co-acrylamide) copolymer having a structure:

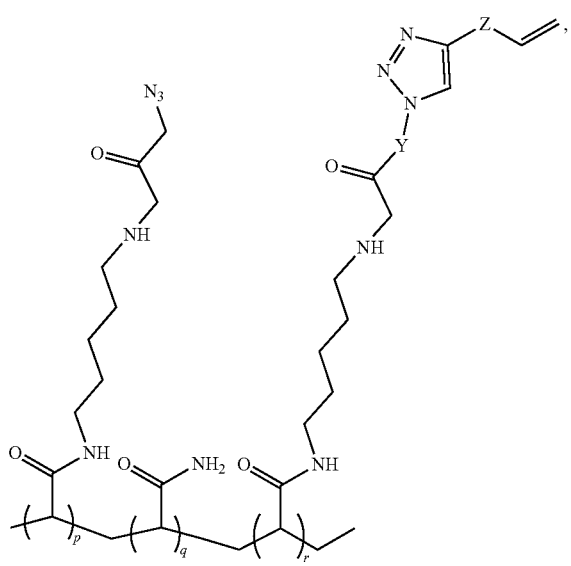

wherein

Y is selected from —C(H$_2$)—, —(C(H$_2$)—C(H$_2$)—O)$_s$ wherein s is an integer from 1 to 10, and

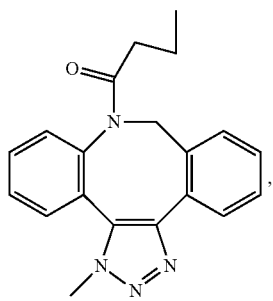 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples of one or more of the methods for coupling oligonucleotides to a polymer described herein, the polymer contacts a plurality of surfaces on a top side of a substrate, and one or both of the irradiating the first inactive moieties in the one or more first region of the polymer with light to generate the first active moieties in the one or more first region of the polymer and the irradiating the one or more second inactive moieties in the one or more second region of the polymer with light to generate the second active moieties in the one or more second region of the polymer comprises irradiating at least one surface of the plurality of surfaces.

In some examples of one or more of the methods for coupling oligonucleotides to a polymer described herein, the plurality of surfaces comprise surfaces of nanowells and one or both of the irradiating the first inactive moieties in the one or more first region of the polymer with light and the irradiating the second inactive moieties in the one or more second region of the polymer with light comprises irradiating a bottom side of the substrate with ultraviolet radiation.

In some examples of one or more of the methods for coupling oligonucleotides to a polymer described herein, the plurality of surfaces comprise surfaces of nanowells and a portion of the surfaces of the nanowells comprise a waveguide.

In some examples of one or more of the methods for coupling oligonucleotides to a polymer described herein, one or both of the first inactive moieties in the one or more first region of the polymer and the second inactive moieties in the one or more second region of the polymer is irradiated by the waveguide.

In some examples of one or more of the methods for coupling oligonucleotides to a polymer described herein, the substrate further comprises a material with low transparency to ultraviolet radiation.

In some examples of one or more of the methods for coupling oligonucleotides to a polymer described herein, the plurality of surfaces comprise surfaces of multidepth nanowells and the multidepth nanowells comprise a deep portion and a shallow portion, wherein the one or more first region of the polymer contacts the deep portion and the one or more second region of the polymer contacts the shallow portion, and irradiating the first inactive moieties comprises: irradiating a bottom side of the substrate and irradiating the second inactive moieties comprises: irradiating the top side of the substrate.

In some examples of one or more of the methods for coupling oligonucleotides to a polymer described herein, the plurality of surfaces comprise surfaces of multidepth nanowells and the multidepth nanowells comprising a deep well and a shallow well, wherein the one or more first region of the polymer contacts a bottom surface of the deep well and the one or more second region of the polymer contacts a bottom of the shallow, and: irradiating the first inactive moieties comprises irradiating a bottom side of the substrate and irradiating the second inactive moieties comprises irradiating the top side of the substrate.

In some examples of one or more of the methods for coupling oligonucleotides to a polymer described herein, the method further comprises: polishing the substrate to remove excess activated moieties.

In some examples of one or more of the methods for coupling oligonucleotides to a polymer described herein, a portion of the substrate comprises metal oxide, wherein the metal oxide portion defines a height and width of the deep well and a height and width of the shallow well:

In some examples of one or more of the methods for coupling oligonucleotides to a polymer described herein, the method further comprises before the irradiating, patterning metal oxide on a portion of the plurality of surfaces, wherein based on the patterning, the plurality of surfaces comprise substrate surfaces and metal oxide surfaces; and contacting the substrate surfaces with the one or more first region of the polymer and contacting the metal oxide surfaces with the one or more second region of the polymer.

In some examples of one or more of the methods for coupling oligonucleotides to a polymer described herein, irradiating the first inactive moieties in the one or more first region of the polymer with light comprises irradiating a bottom side of the substrate; and irradiating the second inactive moieties in the one or more second region of the polymer with light comprises irradiating the top side of the substrate.

In some examples of one or more of the methods for coupling oligonucleotides to a polymer described herein, the method includes polishing the substrate to remove excess active moieties.

In some examples of one or more of the methods for coupling oligonucleotides to a polymer described herein, the method includes: patterning the waveguide onto the substrate before the irradiating.

In some examples of one or more of the methods for coupling oligonucleotides to a polymer described herein, irradiating the first inactive moieties in the one or more first region of the polymer comprises irradiating with the waveguide, and irradiating the second inactive moieties in the one or more second region of the polymer comprises irradiating the top side of the substrate.

In some examples of one or more of the methods for coupling oligonucleotides to a polymer-described herein, the method includes: polishing the substrate to remove excess inactive moieties.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF THE DRAWINGS

These and other features, aspects, and advantages of the present disclosure will become better understood when the following detailed description is read with reference to the accompanying drawings, wherein:

FIG. 3A-3M schematically illustrate example compositions and operations in a process flow for coupling different oligonucleotides to first and second regions of a polymer disposed on a substrate.

DETAILED DESCRIPTION

Examples provided herein are related to polymers, methods of making polymers, methods of coupling oligonucleotides to polymers, and methods of grafting the resultant polymers to a substrate.

Figure 1:
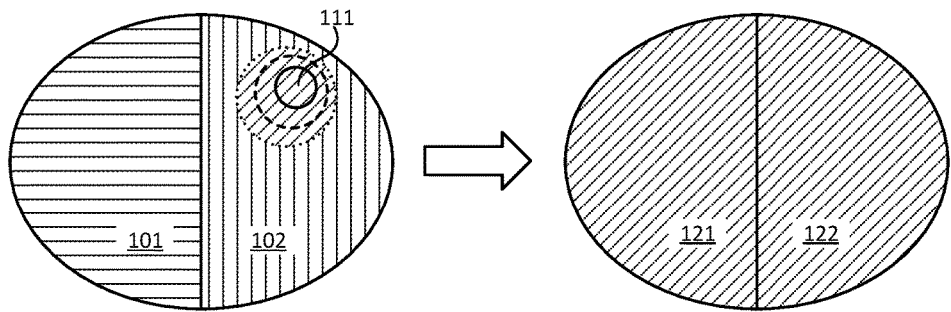
FIG. 1 schematically illustrates an example of amplifying polynucleotides on a substrate including different oligonucleotides in first and second regions of the substrate.

It may be desirable to perform sequencing-by-synthesis (SBS) using functionalized polymers to determine the sequence of target polynucleotides in a cluster. FIG. 1 schematically illustrates an example of amplifying polynucleotides on a substrate including different oligonucleotides in first and second regions of the substrate. The substrate may include a first region 101 and second region 102, which may be functionalized so as to include different oligonucleotides than one another in a manner such as described with reference to FIG. 2A. It may be desired to perform simultaneous paired-end reads on amplicons of the same target polynucleotide in both of regions 101, 102 so as to enhance reliability of the read, e.g., by performing SBS reads on the amplicons in a first direction in region 101 and in the opposite direction in region 102, and then using software to align the results, which should be complementary to one another and thus indicate the same sequence as one another. As shown in FIG. 1, capture and amplification of seed 111 (a target polynucleotide) on substrate region 102 (or, equivalently, substrate region 101) may results in a monoclonal cluster that substantially covers first region 121 and second region 122 and that readily may be used for simultaneous paired-end reads.

Figure 2A:
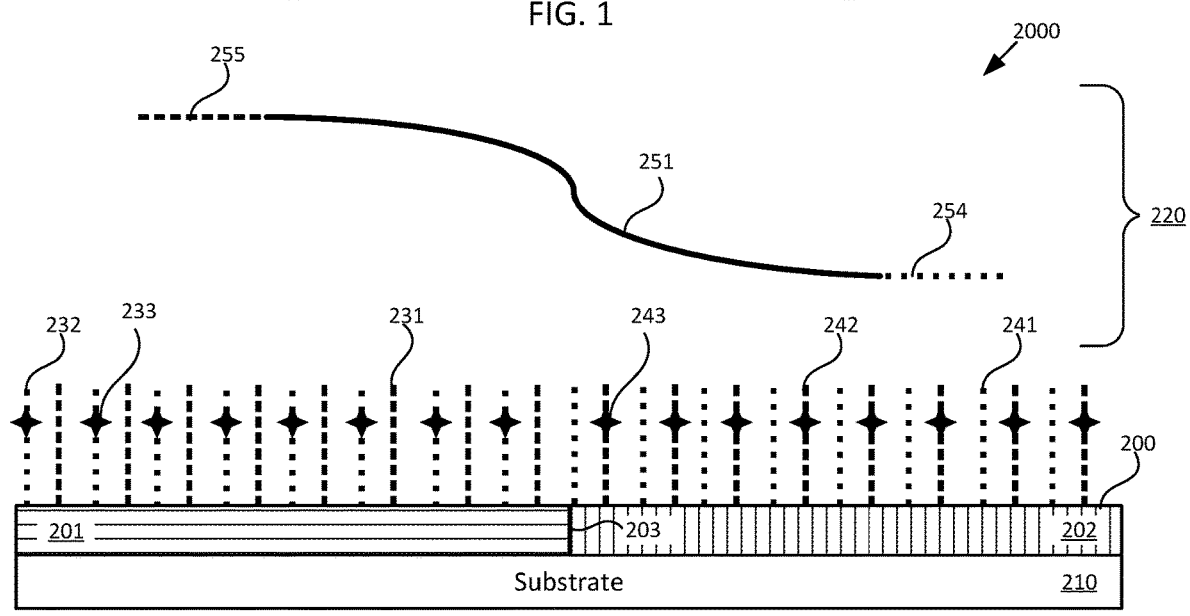
FIGS. 2A-2D schematically illustrate example compositions and operations in a process flow for amplifying a polynucleotide using different oligonucleotides in first and second regions of the substrate.

Functionalizing different regions of the substrate in different ways—such as providing different oligonucleotides in different regions of the substrate—may facilitate preparation of clusters of target nucleotides suitable for simultaneous paired-end reads. For example, FIGS. 2A-2D schematically illustrate example compositions and operations in a process flow for amplifying a polynucleotide using different oligonucleotides in first and second regions of the substrate. Referring first to FIG. 2A, composition 2000 includes substrate 200 and a plurality of oligonucleotides, such as primers, coupled thereto. In this example, substrate 200, includes first region 201 and second region 202, which may be adjacent to one another with interface 203 therebetween. First region 201 and second region 202 may be functionalized differently, more specifically having different capture primers coupled thereto. For example, capture primers 231 may be coupled to the first region 201 of substrate 200, and capture primers 241 may be coupled to the second region 202 of substrate 200. Capture primers 231 and 241 may have the same sequence as one another, except that capture primers 241 may include excision moieties 243 that may be used in a manner such a described below with reference to FIG. 2D. Orthogonal capture primers 232 may be coupled to first region 201 of substrate 200, and orthogonal capture primers 242 may be coupled to second region 202 of the substrate. Orthogonal capture primers 232 and 242 may have the same sequence as one another, except that orthogonal capture primers 232 may include excision moieties 233 that may be used in a manner such a described below with reference to FIG. 2D. Excision moieties 233, 243 may be located at any suitable position along the length of any suitable primer(s) and may be, but need not necessarily be, the same type of excision moiety as one another.

As shown in FIG. 2A, composition 2000 further may include a fluid 220 that includes target polynucleotide 251, e.g., a polynucleotide that is to be amplified and eventually sequenced. Target polynucleotide 251 may include first adapter 254 that is complementary to the orthogonal capture primers 232, 242, and a second adapter 255 that is complementary to the capture primers 231, 241. One or more of the capture primers (e.g., orthogonal capture primers 232 and 242) may include excision moieties such as 8-oxo-G which may be cleaved in a manner such as described with reference to FIG. 2D.

Figure 2B:
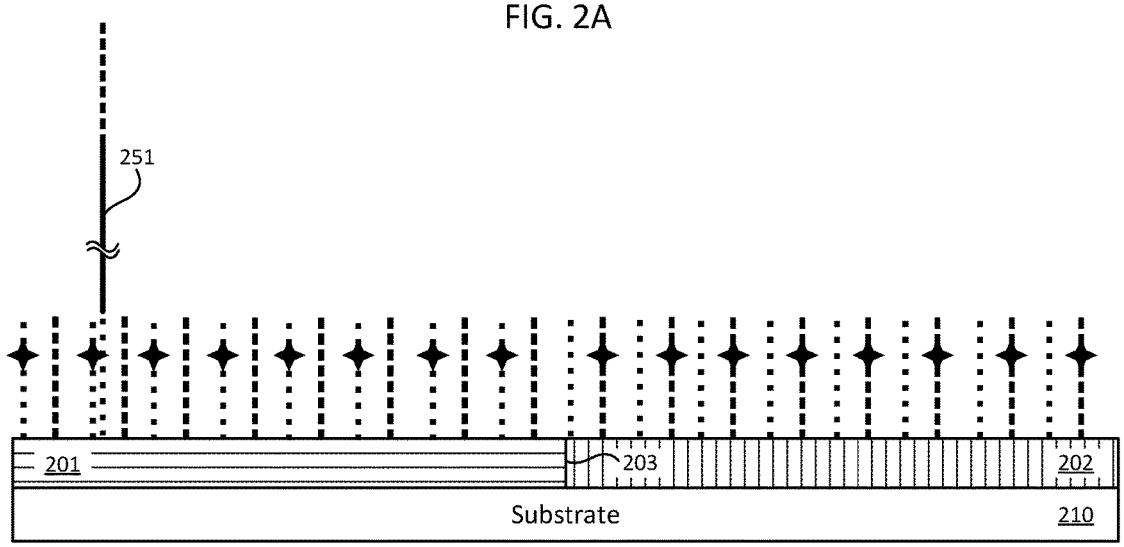
Figure 2C:
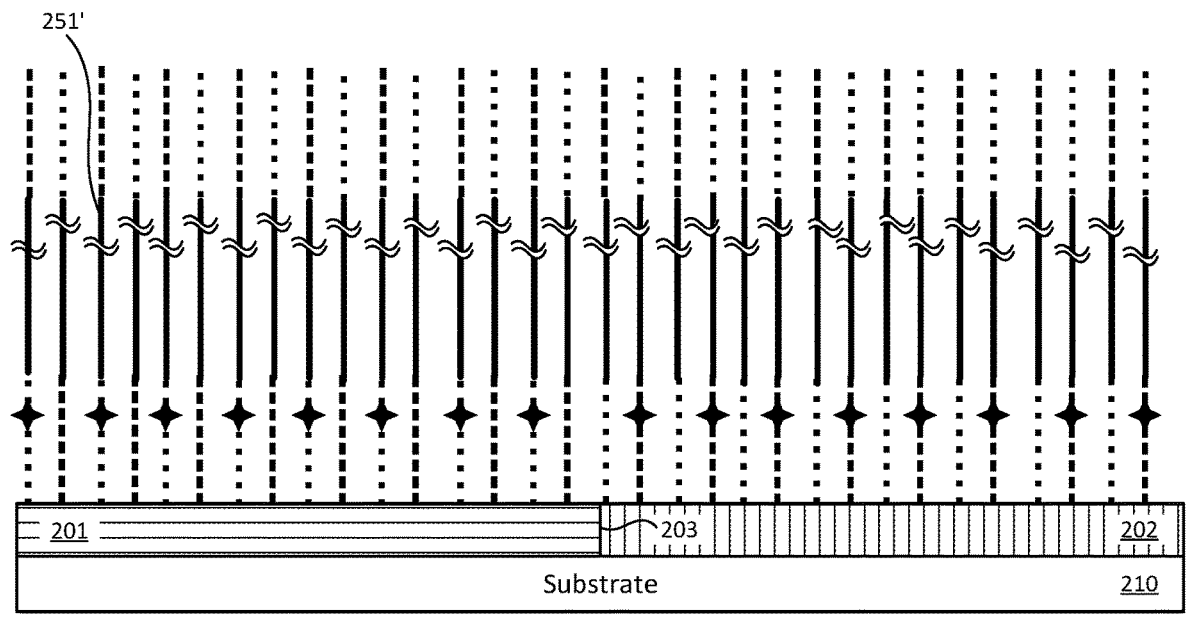
Figure 2D:
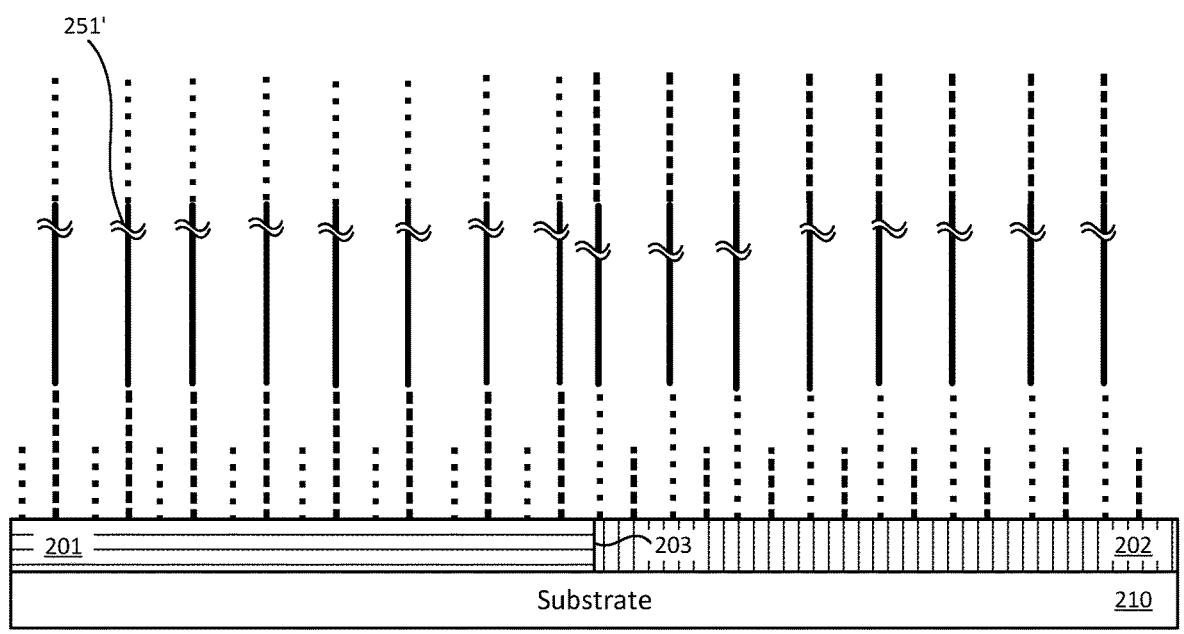

As illustrated in FIG. 2B, adapter 254 of target polynucleotide 251 may randomly hybridize to a capture primer 232 in region 201, but equivalently may hybridize to capture primer 242 in region 202. After such initial hybridization, first target polynucleotide 251 may be amplified using processes such as known in the art, e.g., using surface-bound polymerase chain reaction (PCR), bridge amplification, or a strand invasion process which may be referred to as ExAmp, forming amplicons 251' illustrated in FIG. 2C. If amplification operations are repeated until first and second substrate regions 201, 202 are substantially full, both adapters of the resulting amplicons may not necessarily be hybridized to corresponding capture primers or orthogonal capture primers, and as such the amplicons may extend linearly away from the substrate as illustrated in FIG. 2C. Portions of orthogonal capture primers 232 then may be removed by reacting a suitable enzyme or reagent with excision moieties 233, and portions of capture primers 241 may be removed by reacting a suitable enzyme or reagent with excision moieties 243. The enzyme or reagent used with excision moieties 233 may be the same as, or different than, the enzyme or reagent used with excision moieties 243. As illustrated in FIG. 2D, reaction of excision moieties 233 removes polynucleotides of one orientation in the first substrate region 201, and reaction of excision moieties 234 removes polynucleotides of the other orientation in the second substrate region 202, such that simultaneous paired-end reads may be performed in the two substrate regions.

The present application provides nonlimiting examples of methods of coupling different oligonucleotides (e.g., different primers) to different regions of a polymer than one another, e.g., for forming regions 101 and 102 described with reference to FIG. 1, or for forming regions 201 and 202 described with reference to FIG. 2, and also provides the polymers and methods for forming such polymers.

First, some terms used herein will be briefly explained. Then, some example methods for coupling oligonucleotides to polymers, and resulting compositions, will be described, followed by some example methods for forming polymers, and resulting polymers.

Terms

Unless defined otherwise, all technical and scientific terms used herein have the same meaning as is commonly understood by one of ordinary skill in the art. The use of the term "including" as well as other forms, such as "include," "includes," and "included," is not limiting. The use of the term "having" as well as other forms, such as "have," "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

The terms "substantially," "approximately," and "about" used throughout this specification are used to describe and account for small fluctuations, such as due to variations in processing. For example, they may refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

As used herein, "photoinitiator" is used to mean A photoinitiator is a molecule that creates reactive species (free radicals, cations or anions) when exposed to radiation. Non-limiting examples of photoinitiators include phenyl bis(2,4,6-trimethylbenzoyl) phosphine oxide, 2-hydroxy-2-methyl-1-phenyl-propan-1-one, 2-hydroxy-4'-(2-hydroxyethoxy)-2-methylpropiophenone, 2,2'-azobis[2-methyl-n-(2-hydroxyethyl) propionamide], 2,2-dimethoxy-2-phenylacetophenone, diphenyl(2,4,6-trimethylbenzoyl) phosphine oxide, lithium phenyl(2,4,6-trimethylbenzoyl) phosphinate, and ethyl (2,4,6-trimethylbenzoyl) phenylphosphonate.

As used herein, "hybridize" is intended to mean noncovalently associating a first polynucleotide to a second polynucleotide along the lengths of those polymers to form a doublestranded "duplex." For instance, two DNA polynucleotide strands may associate through complementary base pairing. The strength of the association between the first and second polynucleotides increases with the complementarity between the sequences of nucleotides within those polynucleotides. The strength of hybridization between polynucleotides may be characterized by a temperature of melting (Tm) at which 50% of the duplexes have polynucleotide strands that disassociate from one another. Polynucleotides that are "partially" hybridized to one another means that they have sequences that are complementary to one another, but such sequences are hybridized with one another along only a portion of their lengths to form a partial duplex. Polynucleotides with an "inability" to hybridize include those which are physically separated from one another such that an insufficient number of their bases may contact one another in a manner so as to hybridize with one another.

As used herein, the term "nucleotide" is intended to mean a molecule that includes a sugar and at least one phosphate group, and in some examples also includes a nucleobase. A nucleotide that lacks a nucleobase may be referred to as "abasic." Nucleotides include deoxyribonucleotides, modified deoxyribonucleotides, ribonucleotides, modified ribonucleotides, peptide nucleotides, modified peptide nucleotides, modified phosphate sugar backbone nucleotides, and mixtures thereof. Examples of nucleotides include adenosine monophosphate (AMP), adenosine diphosphate (ADP), adenosine triphosphate (ATP), thymidine monophosphate (TMP), thymidine diphosphate (TDP), thymidine triphosphate (TTP), cytidine monophosphate (CMP), cytidine diphosphate (CDP), cytidine triphosphate (CTP), guanosine monophosphate (GMP), guanosine diphosphate (GDP), guanosine triphosphate (GTP), uridine monophosphate (UMP), uridine diphosphate (UDP), uridine triphosphate (UTP), deoxyadenosine monophosphate (dAMP), deoxyadenosine diphosphate (dADP), deoxyadenosine triphosphate (dATP), deoxythymidine monophosphate (dTMP), deoxythymidine diphosphate (dTDP), deoxythymidine triphosphate (dTTP), deoxycytidine diphosphate (dCDP), deoxycytidine triphosphate (dCTP), deoxyguanosine monophosphate (dGMP), deoxyguanosine diphosphate (dGDP), deoxyguanosine triphosphate (dGTP), deoxyuridine monophosphate (dUMP), deoxyuridine diphosphate (dUDP), and deoxyuridine triphosphate (dUTP).

As used herein, the term "nucleotide" also is intended to encompass any nucleotide analogue which is a type of nucleotide that includes a modified nucleobase, sugar and/or phosphate moiety compared to naturally occurring nucleotides. Example modified nucleobases include inosine, xathanine, hypoxathanine, isocytosine, isoguanine, 2-aminopurine, 5-methylcytosine, 5-hydroxymethyl cytosine, 2-aminoadenine, 6-methyl adenine, 6-methyl guanine, 2-propyl guanine, 2-propyl adenine, 2-thiouracil, 2-thiothymine, 2-thiocytosine, 15-halouracil, 15-halocytosine, 5-propynyl uracil, 5-propynyl cytosine, 6-azo uracil, 6-azo cytosine, 6-azo thymine, 5-uracil, 4-thiouracil, 8-halo adenine or guanine, 8-amino adenine or guanine, 8-thiol adenine or guanine, 8-thioalkyl adenine or guanine, 8-hydroxyl adenine or guanine, 5-halo substituted uracil or cytosine, 7-methylguanine, 7-methyladenine, 8-azaguanine, 8-azaadenine, 7-deazaguanine, 7-deazaadenine, 3-deazaguanine, 3-deazaadenine or the like. As is known in the art, certain nucleotide analogues cannot become incorporated into a polynucleotide, for example, nucleotide analogues such as adenosine 5'-phosphosulfate. Nucleotides may include any suitable number of phosphates, e.g., three, four, five, six, or more than six phosphates.

As used herein, the term "polynucleotide" refers to a molecule that includes a sequence of nucleotides that are bonded to one another. A polynucleotide is one nonlimiting example of a polymer. Examples of polynucleotides include deoxyribonucleic acid (DNA), ribonucleic acid (RNA), and analogues thereof. A polynucleotide may be a single stranded sequence of nucleotides, such as RNA or single stranded DNA, a double stranded sequence of nucleotides, such as double stranded DNA, or may include a mixture of a single stranded and double stranded sequences of nucleotides. Double stranded DNA (dsDNA) includes genomic DNA, and PCR and amplification products. Single stranded DNA (ssDNA) can be converted to dsDNA and vice versa. Polynucleotides may include non-naturally occurring DNA, such as enantiomeric DNA. The precise sequence of nucleotides in a polynucleotide may be known or unknown. The following are examples of polynucleotides: a gene or gene fragment (for example, a probe, primer, expressed sequence tag (EST) or serial analysis of gene expression (SAGE) tag), genomic DNA, genomic DNA fragment, exon, intron, messenger RNA (mRNA), transfer RNA, ribosomal RNA, ribozyme, cDNA, recombinant polynucleotide, synthetic polynucleotide, branched polynucleotide, plasmid, vector, isolated DNA of any sequence, isolated RNA of any sequence, nucleic acid probe, primer or amplified copy of any of the foregoing.

As used herein, a "polymerase" is intended to mean an enzyme having an active site that assembles polynucleotides by polymerizing nucleotides into polynucleotides. A polymerase can bind a primed single stranded target polynucleotide, and can sequentially add nucleotides to the growing primer to form a "complementary copy" polynucleotide having a sequence that is complementary to that of the target polynucleotide. Another polymerase, or the same polymerase, then can form a copy of the target nucleotide by forming a complementary copy of that complementary copy polynucleotide. Any of such copies may be referred to herein as "amplicons." DNA polymerases may bind to the target polynucleotide and then move down the target polynucleotide sequentially adding nucleotides to the free hydroxyl group at the 3' end of a growing polynucleotide strand (growing amplicon). DNA polymerases may synthesize complementary DNA molecules from DNA templates and RNA polymerases may synthesize RNA molecules from DNA templates (transcription). Polymerases may use a short RNA or DNA strand (primer), to begin strand growth. Some polymerases may displace the strand upstream of the site where they are adding bases to a chain. Such polymerases may be said to be strand displacing, meaning they have an activity that removes a complementary strand from a template strand being read by the polymerase. Example polymerases having strand displacing activity include, without limitation, the large fragment of Bst (*Bacillus stearothermophilus*) polymerase, exo-Klenow polymerase or sequencing grade T7 exo-polymerase. Some polymerases degrade the strand in front of them, effectively replacing it with the growing chain behind (5' exonuclease activity). Some polymerases have an activity that degrades the strand behind them (3' exonuclease activity). Some useful polymerases have been modified, either by mutation or otherwise, to reduce or eliminate 3' and/or 5' exonuclease activity.

As used herein, the term "primer" is defined as a polynucleotide to which nucleotides may be added via a free 3' OH group. A primer may include a 3' block preventing polymerization until the block is removed. A primer may include a modification at the 5' terminus to allow a coupling reaction or to couple the primer to another moiety. A primer may include one or more moieties which may be cleaved under suitable conditions, such as UV light, chemistry, enzyme, or the like. The primer length may be any suitable number of bases long and may include any suitable combination of natural and non-natural nucleotides. A target polynucleotide may include an "adapter" that hybridizes to (has a sequence that is complementary to) a primer, and may be amplified so as to generate a complementary copy polynucleotide by adding nucleotides to the free 3' OH group of the primer. A "capture primer" is intended to mean a primer that is coupled to the substrate and may hybridize to a second adapter of the target polynucleotide, while an "orthogonal capture primer" is intended to mean a primer that is coupled to the substrate and may hybridize to a first adapter of that target polynucleotide. The first adapter may have a sequence that is complementary to that of the orthogonal capture primer, and the second adapter may have a sequence that is complementary to that of the capture primer. A capture primer and an orthogonal capture primer may have different and independent sequences than one another. Additionally, a capture primer and an orthogonal capture primer may differ from one another in at least one other property. For example, the capture primer and the orthogonal capture primer may have different lengths than one another; either the capture primer or the orthogonal capture primer may include a nonnucleic acid moiety (such as a blocking group or excision moiety) that the other of the capture primer or the orthogonal capture primer lacks; or any suitable combination of such properties.

As used herein, the term "substrate" refers to a material used as a support for compositions described herein. Example substrate materials may include glass, silica, plastic, quartz, metal; metal oxide, organo-silicate (e.g., polyhedral organic silsesquioxanes (POSS)), polyacrylates, tantalum oxide, complementary metal oxide semiconductor (CMOS), or combinations thereof. An example of POSS can be that described in Kehagias et al., Microelectronic Engineering 86 (2009), pp. 776-778, which is incorporated by reference in its entirety. In some examples, substrates used in the present application include silica-based substrates, such as glass, fused silica, or other silica-containing material. In some examples, substrates may include silicon, silicon nitride, or silicone hydride. In some examples, substrates used in the present application include plastic materials or components such as polyethylene, polystyrene, poly (vinyl chloride), polypropylene, nylons, polyesters, polycarbonates, and poly(methyl methacrylate). Example plastics materials include poly(methyl methacrylate), polystyrene, and cyclic olefin polymer substrates. In some examples, the substrate is or includes a silica-based material or plastic material or a combination thereof. In particular examples, the substrate has at least one surface comprising glass or a silicon-based polymer. In some examples, the substrates may include a metal. In some such examples, the metal is gold. In some examples, the substrate has at least one surface comprising a metal oxide. In one example, the surface comprises a tantalum oxide or tin oxide. Acrylamides, enones, or acrylates may also be utilized as a substrate material or component. Other substrate materials may include, but are not limited to gallium arsenide, indium phosphide, aluminum, ceramics, polyimide, quartz, resins, polymers and copolymers. In some examples, the substrate and/or the substrate surface may be, or include, quartz. In some other examples, the substrate and/or the substrate surface may be, or include, semiconductor, such as GaAs or ITO. The foregoing lists are intended to be illustrative of, but not limiting to the present application. Substrates may comprise a single material or a plurality of different materials. Substrates may be composites or laminates. In some examples, the substrate comprises an organo-silicate material. Substrates may be flat, round, spherical, rod-shaped, or any other suitable shape. Substrates may be rigid or flexible. In some examples, a substrate is a bead or a flow cell.

In some examples, a substrate includes a patterned surface. A "patterned surface" refers to an arrangement of different regions in or on an exposed layer of a substrate. For example, one or more of the regions may be features where one or more capture primers are present. The features can be separated by interstitial regions where capture primers are not present. In some examples, the pattern may be an x-y format of features that are in rows and columns. In some examples, the pattern may be a repeating arrangement of features and/or interstitial regions. In some examples, the pattern may be a random arrangement of features and/or interstitial regions. In some examples, substrate includes an array of wells (depressions) in a surface. The wells may be provided by substantially vertical sidewalls. Wells may be fabricated as is generally known in the art using a variety of techniques, including, but not limited to, photolithography, stamping techniques, molding techniques and microetching techniques. As will be appreciated by those in the art, the technique used will depend on the composition and shape of the array substrate.

The features in a patterned surface of a substrate may include wells in an array of wells (e.g., microwells or nanowells) on glass, silicon, plastic or other suitable material(s) with patterned polymers such as provided herein. In one example, the polymer includes covalently linked gel such as poly(N-(5-azidoacetamidylpentyl) acrylamide-co-acrylamide) (PAZAM). The patterning may provide polymer pads that may be used for sequencing, e.g., may be stable over sequencing runs with a large number of cycles. In some examples, covalent linking of the polymer to the wells may be helpful for maintaining the polymer in the structured features (e.g., wells) throughout the lifetime of the structured substrate during a variety of uses. However in some examples, the polymer need not be covalently linked to the wells.

In particular examples, a structured substrate may be made by patterning a substrate formed of suitable material with wells (e.g. microwells or nanowells), coating the substrate material with a polymer material, and polishing the surface of the polymer coated material, for example via chemical or mechanical polishing, thereby retaining polymer in the wells but removing or inactivating substantially all of the polymer from the interstitial regions on the surface of the structured substrate between the wells. Primers may be attached to polymer material, e.g., in a manner such as provided herein. A solution including a plurality of target polynucleotides (e.g., a fragmented human genome or portion thereof) may then be contacted with the polished substrate such that individual target polynucleotides will seed individual wells via interactions with primers attached to the polymer material; however, the target polynucleotides will not occupy the interstitial regions due to absence or inactivity there of the polymer material. Amplification of the target polynucleotides may be confined to the wells because absence or inactivity of polymer in the interstitial regions may inhibit outward migration of the growing cluster. The process is conveniently manufacturable, being scalable and utilizing conventional micro- or nano-fabrication methods.

A patterned substrate may include, for example, wells etched into a slide or chip. The pattern of the etchings and geometry of the wells may take on a variety of different shapes and sizes, and such features may be physically or functionally separable from each other. Particularly useful substrates having such structural features include patterned substrates that may select the size of solid particles such as microspheres. An example patterned substrate having these characteristics is the etched substrate used in connection with BEAD ARRAY technology (Illumina, Inc., San Diego, Calif.).

In some examples, a substrate described herein forms at least part of a flow cell or is located in or coupled to a flow cell. Flow cells may include a flow chamber that is divided into a plurality of lanes or a plurality of sectors. Example flow cells and substrates for manufacture of flow cells that may be used in methods and compositions set forth herein include, but are not limited to, those commercially available from Illumina, Inc. (San Diego, CA).

As used herein, the term "directly" when used in reference to a layer covering the surface of a substrate is intended to mean that the layer covers the substrate's surface without a significant intermediate layer, such as, e.g., an adhesive layer or a polymer layer. Layers directly covering a surface may be attached to this surface through any chemical or physical interaction, including covalent bonds or non-covalent adhesion.

As used herein, the term "immobilized" when used in reference to a polynucleotide is intended to mean direct or indirect attachment to a substrate via covalent or non-covalent bond(s). In certain examples, covalent attachment may be used, or any other suitable attachment in which the polynucleotides remain stationary or attached to a substrate under conditions in which it is intended to use the substrate, for example, in polynucleotide amplification or sequencing. Polynucleotides to be used as capture primers or as target polynucleotides may be immobilized such that a 3'-end is available for enzymatic extension and at least a portion of the sequence is capable of hybridizing to a complementary sequence. Immobilization may occur via hybridization to a surface attached oligonucleotide, in which case the immobilized oligonucleotide or polynucleotide may be in the 3'-5' orientation. Alternatively, immobilization may occur by means other than base-pairing hybridization, such as covalent attachment.

As used herein, the term "array" refers to a population of substrate regions that may be differentiated from each other according to relative location. Different molecules (such as polynucleotides) that are at different regions of an array may be differentiated from each other according to the locations of the regions in the array. An individual region of an array may include one or more molecules of a particular type. For example, a substrate region may include a single target polynucleotide having a particular sequence, or a substrate region may include several polynucleotides having the same sequence (or complementary sequences thereof). The regions of an array respectively may include different features than one another on the same substrate. Example features include without limitation, wells in a substrate, beads (or other particles) in or on a substrate, projections from a substrate, ridges on a substrate or channels in a substrate. The regions of an array respectively may include different regions on different substrates than each other. Different molecules attached to separate substrates may be identified according to the locations of the substrates on a surface to which the substrates are associated or according to the locations of the substrates in a liquid or gel. Example arrays in which separate substrates are located on a surface include, without limitation, those having beads in wells.

As used herein, the term "plurality" is intended to mean a population of two or more different members. Pluralities may range in size from small, medium, large, to very large. The size of small plurality may range, for example, from a few members to tens of members. Medium sized pluralities may range, for example, from tens of members to about 100 members or hundreds of members. Large pluralities may range, for example, from about hundreds of members to about 1000 members, to thousands of members and up to tens of thousands of members. Very large pluralities may range, for example, from tens of thousands of members to about hundreds of thousands, a million, millions, tens of millions and up to or greater than hundreds of millions of members. Therefore, a plurality may range in size from two to well over one hundred million members as well as all sizes, as measured by the number of members, in between and greater than the above example ranges. Example polynucleotide pluralities include, for example, populations of about $1 \times 10^5$ or more, $5 \times 10^5$ or more, or $1 \times 10^6$ or more different polynucleotides. Accordingly, the definition of the term is intended to include all integer values greater than two. An upper limit of a plurality may be set, for example, by the theoretical diversity of polynucleotide sequences in a sample.

As used herein, the term "double-stranded," when used in reference to a polynucleotide, is intended to mean that all or substantially all of the nucleotides in the polynucleotide are hydrogen bonded to respective nucleotides in a complementary polynucleotide.

As used herein, the term "single-stranded," when used in reference to a polynucleotide, means that essentially none of the nucleotides in the polynucleotide are hydrogen bonded to a respective nucleotide in a complementary polynucleotide.

As used herein, the term "target polynucleotide" is intended to mean a polynucleotide that is the object of an analysis or action. The analysis or action includes subjecting the polynucleotide to amplification, sequencing and/or other procedure. A target polynucleotide may include nucleotide sequences additional to a target sequence to be analyzed. For example, a target polynucleotide may include one or more adapters, including an adapter that functions as a primer binding site, that flank(s) a target polynucleotide sequence that is to be analyzed. A target polynucleotide hybridized to a capture primer may include nucleotides that extend beyond the 5' or 3' end of the capture oligonucleotide in such a way that not all of the target polynucleotide is amenable to extension. In particular examples, target polynucleotides may have different sequences than one another but may have first and second adapters that are the same as one another. The two adapters that may flank a particular target polynucleotide sequence may have the same sequence as one another, or complementary sequences to one another, or the two adapters may have different sequences. Thus, species in a plurality of target polynucleotides may include regions of known sequence that flank regions of unknown sequence that are to be evaluated by, for example, sequencing (e.g., SBS). In some examples, target polynucleotides carry an adapter at a single end, and such adapter may be located at either the 3' end or the 5' end the target polynucleotide. Target polynucleotides may be used without any adapter, in which case a primer binding sequence may come directly from a sequence found in the target polynucleotide.

The terms "polynucleotide" and "oligonucleotide" are used interchangeably herein. The different terms are not intended to denote any particular difference in size, sequence, or other property unless specifically indicated otherwise. For clarity of description the terms may be used to distinguish one species of polynucleotide from another when describing a particular method or composition that includes several polynucleotide species.

As used herein, the term "amplicon," when used in reference to a polynucleotide, is intended to means a product of copying the polynucleotide, wherein the product has a nucleotide sequence that is substantially the same as, or is substantially complementary to, at least a portion of the nucleotide sequence of the polynucleotide. "Amplification" and "amplifying" refer to the process of making an amplicon of a polynucleotide. A first amplicon of a target polynucleotide may be a complementary copy. Additional amplicons are copies that are created, after generation of the first amplicon, from the target polynucleotide or from the first amplicon. A subsequent amplicon may have a sequence that is substantially complementary to the target polynucleotide or is substantially identical to the target polynucleotide. It will be understood that a small number of mutations (e.g., due to amplification artifacts) of a polynucleotide may occur when generating an amplicon of that polynucleotide.

As used herein, the term "inactive moiety" is intended to mean a first chemical entity that is substantially unreactive with a second chemical entity under a specified set of conditions. As used herein, the term "active moiety" is intended to mean a third chemical entity that is reactive with the second chemical entity under the specified set of conditions. The first chemical entity may be converted to the third chemical entity, thus converting an inactive moiety to an active moiety.

As used herein, to "selectively irradiate" a portion of an element with light is intended to mean that substantially only that portion of the element is irradiated with the light, while other portions(s) of that element are not irradiated with the light. A non-limiting example of a way to selectively irradiate a portion of an element with light is to mask other portions of that element from being irradiated, and then irradiate the entire element or any suitable portion thereof that includes the portion being selectively irradiated. Another non-limiting example of a way to selectively irradiate a portion of an element with light is to use a light-focusing optic, optionally in combination with one or more other elements such as a light coupling grating in a manner such as described in PCT Publication No. WO 2021/028815 and entitled "System and Method for Patterning Flow Cell Substrates," the entire contents of which are incorporated by reference herein.

As used herein, the term "mask" is intended to mean an optical component that inhibits the transmission of light to an entity, while the term "unmask" is intended to mean removing such an optical component so as to permit the transmission of light to that entity.

As used herein, the term "light" refers to any wavelength of electromagnetic radiation within the electromagnetic spectrum, including electromagnetic radiation that is perceivable as well as not perceivable by the human eye. Types of light include, but are not limited to, visible light, infrared, and/or ultraviolet (UV).

Methods of Coupling Oligonucleotides to Primers

Some examples provided herein relate to providing capture primers with selected characteristics in region(s) of a polymer in which clusters are to be generated. The examples herein are particularly well suited to generating clusters for use in simultaneous paired-end reads in which an amplified polynucleotide's sequence is read using SBS in a first region of a polymer, and that polynucleotide's complementary sequence is read using SBS in a second region of a polymer, in parallel with one another, but it should be understood that the examples are generally applicable to any type of cluster, and indeed to any polymer to which it may be desired to couple any type of oligonucleotide.

Figure 3A:
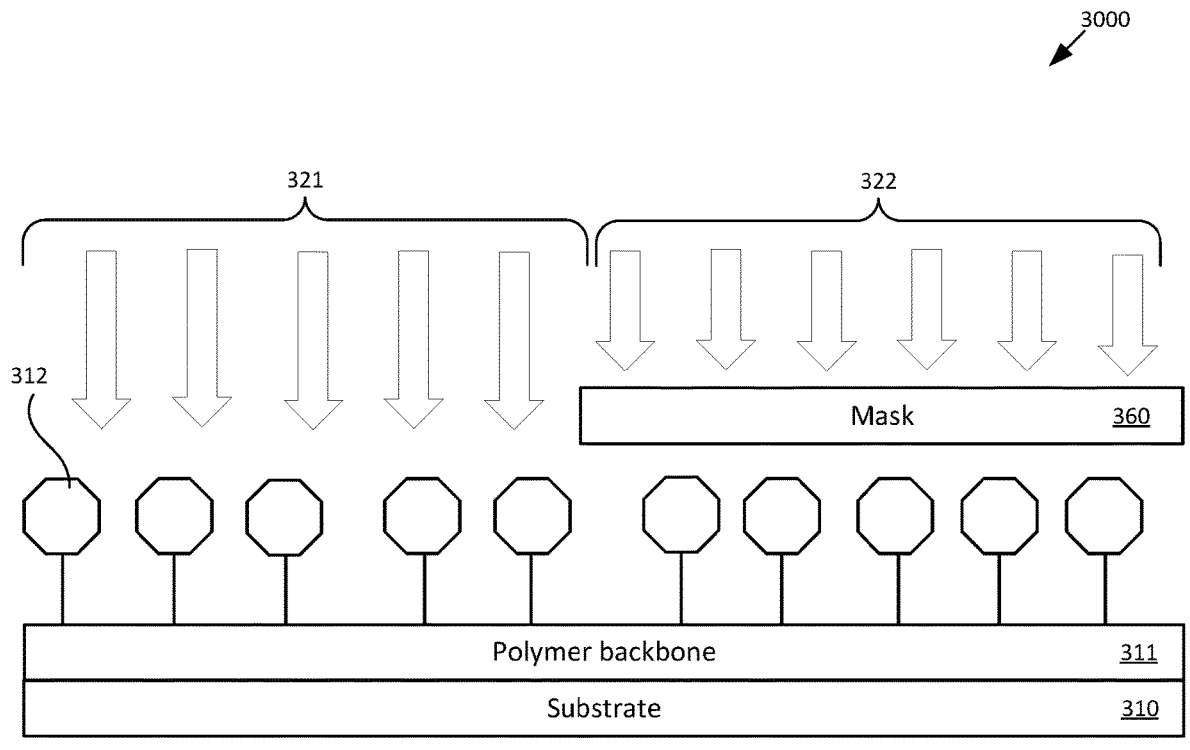
Figure 3B:
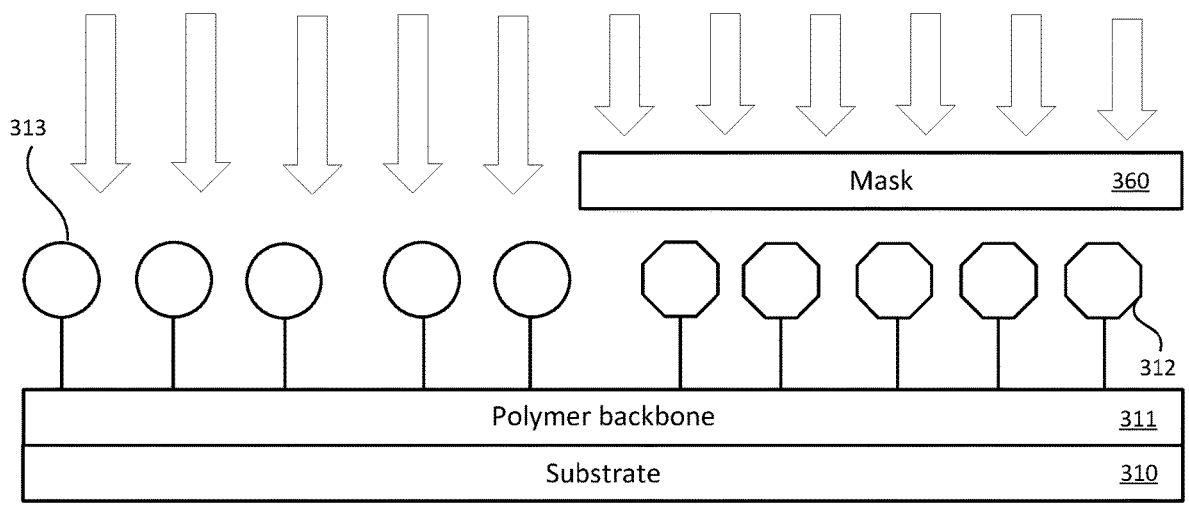

For example, FIGS. 3A-3M schematically illustrate example compositions and operations in a process flow for coupling different oligonucleotides to first and second regions of a polymer disposed on a substrate. In an example, composition 3000 illustrated in FIG. 3A includes substrate 310 and a polymer including backbone 311 disposed on (e.g., immobilized on) substrate 310, and inactive moieties 312 coupled to backbone 311. In a manner such as illustrated in FIG. 3A, inactive moieties 312 in first region 321 of the polymer may be selectively irradiated with light (as indicated by the downward-pointing arrows), while inactive moieties 312 in second region 322 of the polymer are not irradiated. For example, second region 322 may be masked using mask 360 (as indicated by the mask blocking the downward-pointing arrows). In a manner such as illustrated in FIG. 3B, the light may generate first active moieties 313 in the first region of the polymer, e.g., may convert inactive moieties 312 in the first region of the polymer to active moieties. In this regard, the light may have a wavelength and an intensity suitable for performing such conversion, e.g., may be in the range of about 365 nm to about 450 nm so as to have sufficiently high frequency to perform the conversion while substantially not damaging the oligonucleotides. Nonlimiting examples of polymer backbones coupled to inactive moieties that may be converted to active moieties, using light, are provided elsewhere herein. Optionally, before selectively irradiating region 321 with light, a photoresist may be deposited over such regions and may increase the accuracy with which region 321 is irradiated while maintaining region 233 is not irradiated. The photoresist then may be removed, e.g., using a suitable solvent, before contacting the polymer with fluid 320. In some examples, the irradiated photoresist is removed from first region 321 and the non-irradiated photoresist is removed from second region 322 in different steps than one another, or in a common step as one another.

Figure 3C:
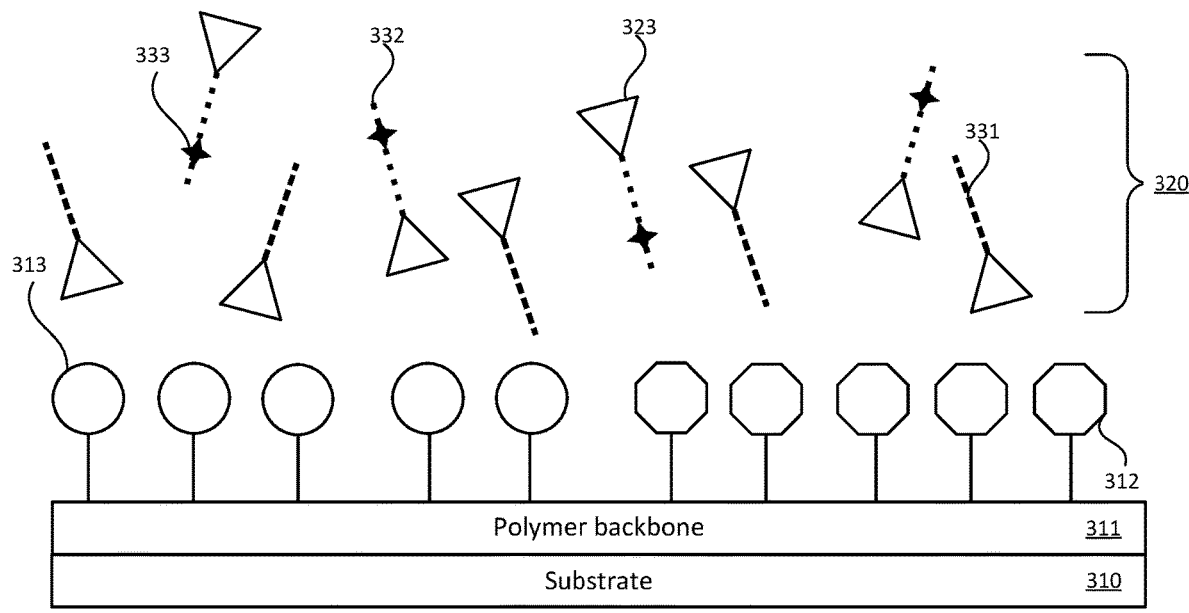
Figure 3D:
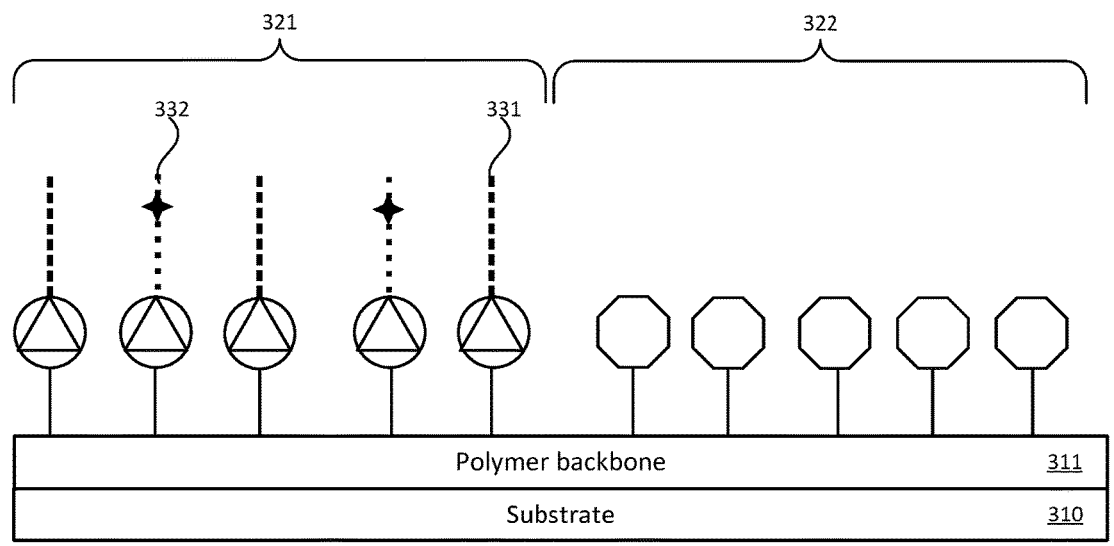

The first active moieties 313 then may be coupled to first oligonucleotides. For example, in a manner such as illustrated in FIG. 3C, first active moieties 313 and inactive moieties 312 may be contacted with fluid 320. In the illustrated example, fluid 320 includes a mixture of oligonucleotides 331 corresponding to oligonucleotides 231 described with reference to FIG. 2A, and oligonucleotides 332 corresponding to oligonucleotides 232 described with reference to FIG. 2A. Oligonucleotides 332 may include excision moieties 333, while oligonucleotides 331 may lack excision moieties. Each oligonucleotide 331, 332 may include reactive group 323 with which first active moieties 313 may react, and with which inactive moieties 312 substantially may not react. As such, in a manner such as illustrated in FIG. 3D, a mixture of oligonucleotides 331, 332 may become coupled to the polymer within region 321, while oligonucleotides may not become coupled to the polymer within region 322. Nonlimiting examples of reactive groups that may be used to react with active moieties, and that substantially do not react with inactive moieties, are provided elsewhere herein.

Although it may be expected that substantially all of the first active groups 313 within region 321 fully react with reactive groups 323 and thus become unavailable for any subsequent reactions, an additional "capping" reaction optionally may be performed in which any remaining first active groups 313 are contacted with an additional reagent with which such first active groups react and as such become unavailable for any subsequent reactions. Illustratively, a "capping" reaction may include the addition of monofunctional azide molecules, such as polyethylene glycol-azide (PEG-azide), 1-azidohexane, 3-azidopropanoic acid, 3-azidopropan-1-ol, or the like, or the addition of active groups which react with olefins, such as 1-hexen-6-ol or 5-hexenoic acid.

Figure 3E:
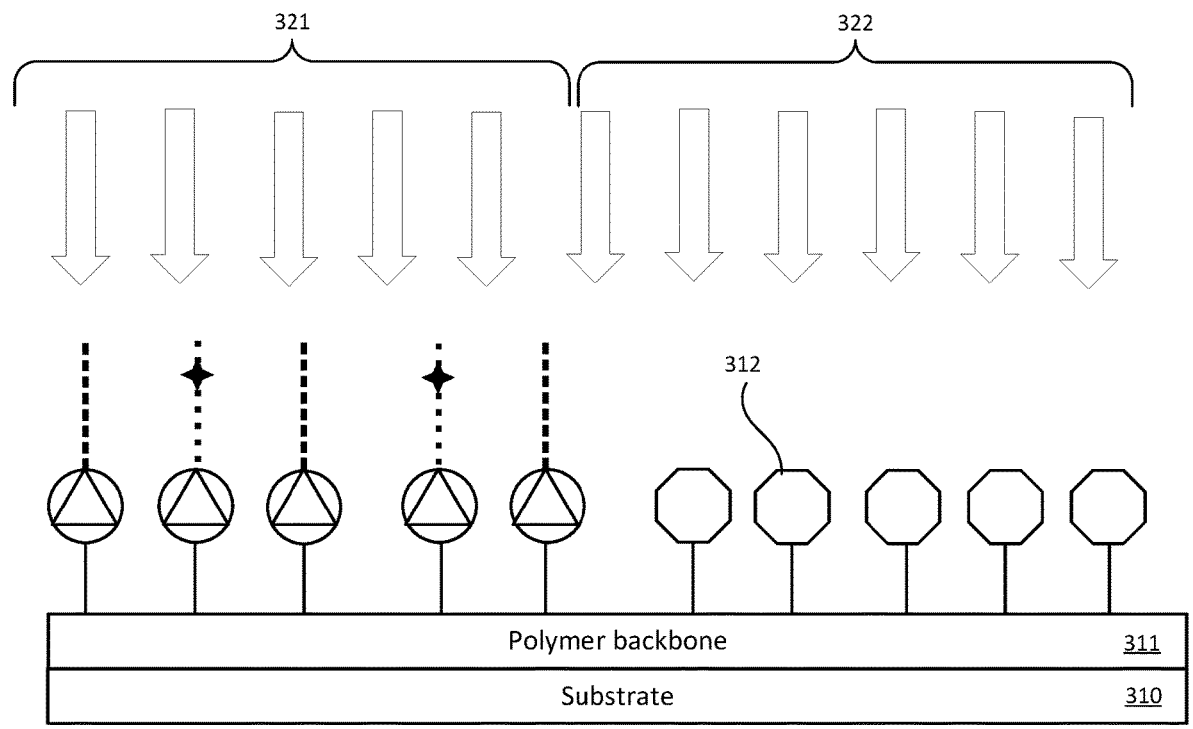
Figure 3F:
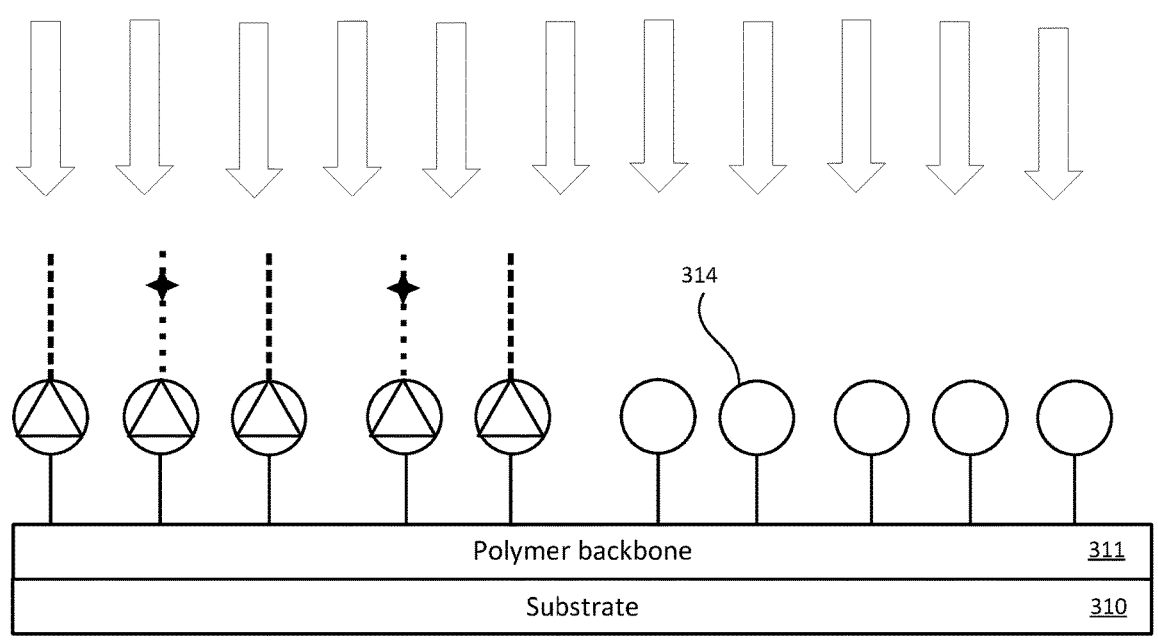
Figure 3G:
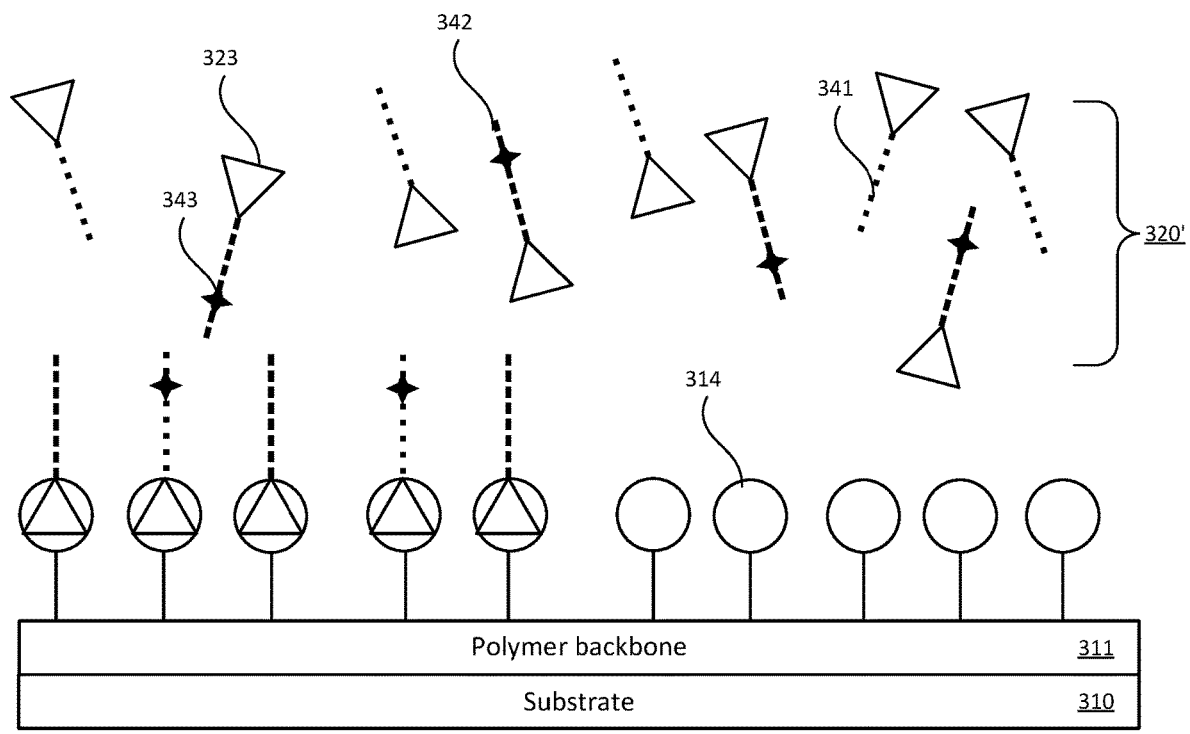

Second region 322 of the polymer then may be irradiated. For example, in a manner such as illustrated in FIG. 3E, second region 322 of the polymer may be unmasked, and inactive moieties 312 in the second region of the polymer may be irradiated with light to generate second active moieties 314 in the second region of the polymer, such as illustrated in FIG. 3F. The second active moieties 314 may be chemically identical to first active moieties 313, but in a different region 322 of the polymer. In some examples, region 321 may be irradiated with light at the same time as region 322, for example because any inactive moieties 312 in region 321 already would have been converted to active moieties 313 and substantially completely reacted with reactive group 323 or an optional capping reagent. However, it will be appreciated that region 322 may be selectively irradiated, e.g., region 321 optionally may be masked while region 322 is irradiated with light, for example to inhibit the light from degrading oligonucleotides 331, 332. Additionally, or alternatively, the wavelength of the light may be selected so as to inhibit light-induced degradation of the oligonucleotides, e.g., may be in the range of about 365 nm to about 450 nm.

Figure 3H:
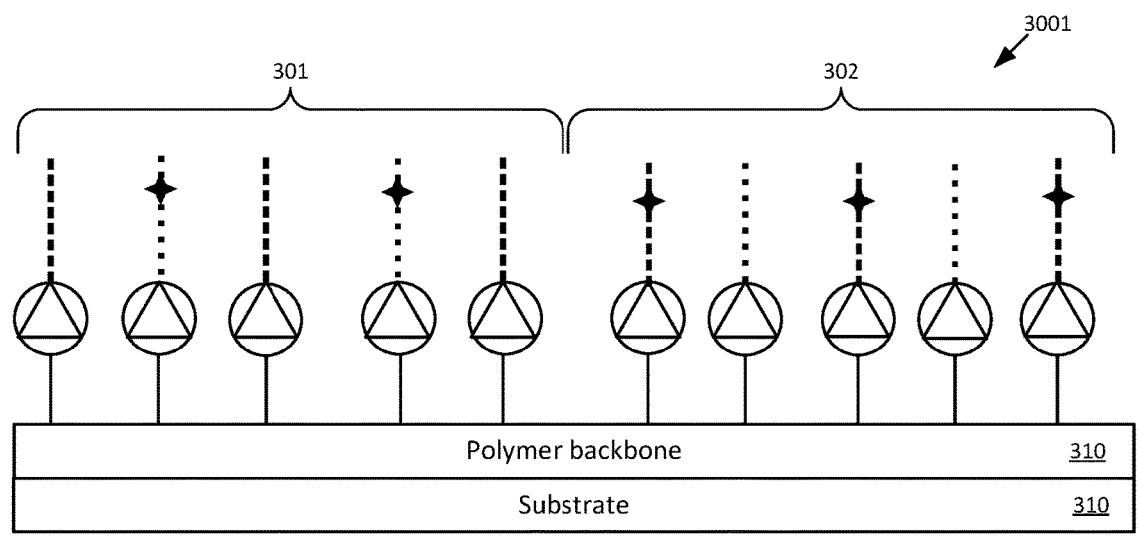

The second active moieties 314 then may be coupled to second oligonucleotides. For example, in a manner such as illustrated in FIG. 3C, second active moieties 314, as well as oligonucleotides 331, 332, may be contacted with fluid 320'. In the illustrated example, fluid 320' includes a mixture of oligonucleotides 341 corresponding to oligonucleotides 241 described with reference to FIG. 2A, and oligonucleotides 342 corresponding to oligonucleotides 242 described with reference to FIG. 2A. Oligonucleotides 342 may include excision moieties 343, while oligonucleotides 341 may lack excision moieties. Each oligonucleotide 341, 342 may include reactive group 323 with which second active moieties 314 may react, and which may be the same type of reactive group as used during the operation illustrated in FIG. 3C. As such, in a manner such as illustrated in FIG. 3H, a mixture of oligonucleotides 341, 342 may become coupled to the polymer within region 322, while oligonucleotides 331, 332 may remain coupled to the polymer within region 321. The resulting composition 3001 illustrated in FIG. 3H may include polymer region 301 corresponding to polymer region 101 described with reference to FIG. 1 and polymer region 201 described with reference to FIG. 2A, and polymer region 302 corresponding to polymer region 102 described with reference to FIG. 1 and polymer region 202 described with reference to FIG. 2A, and may be used to amplify a target polynucleotide in a similar manner as described with reference to FIGS. 1 and 2A-2D.

Figure 3J:
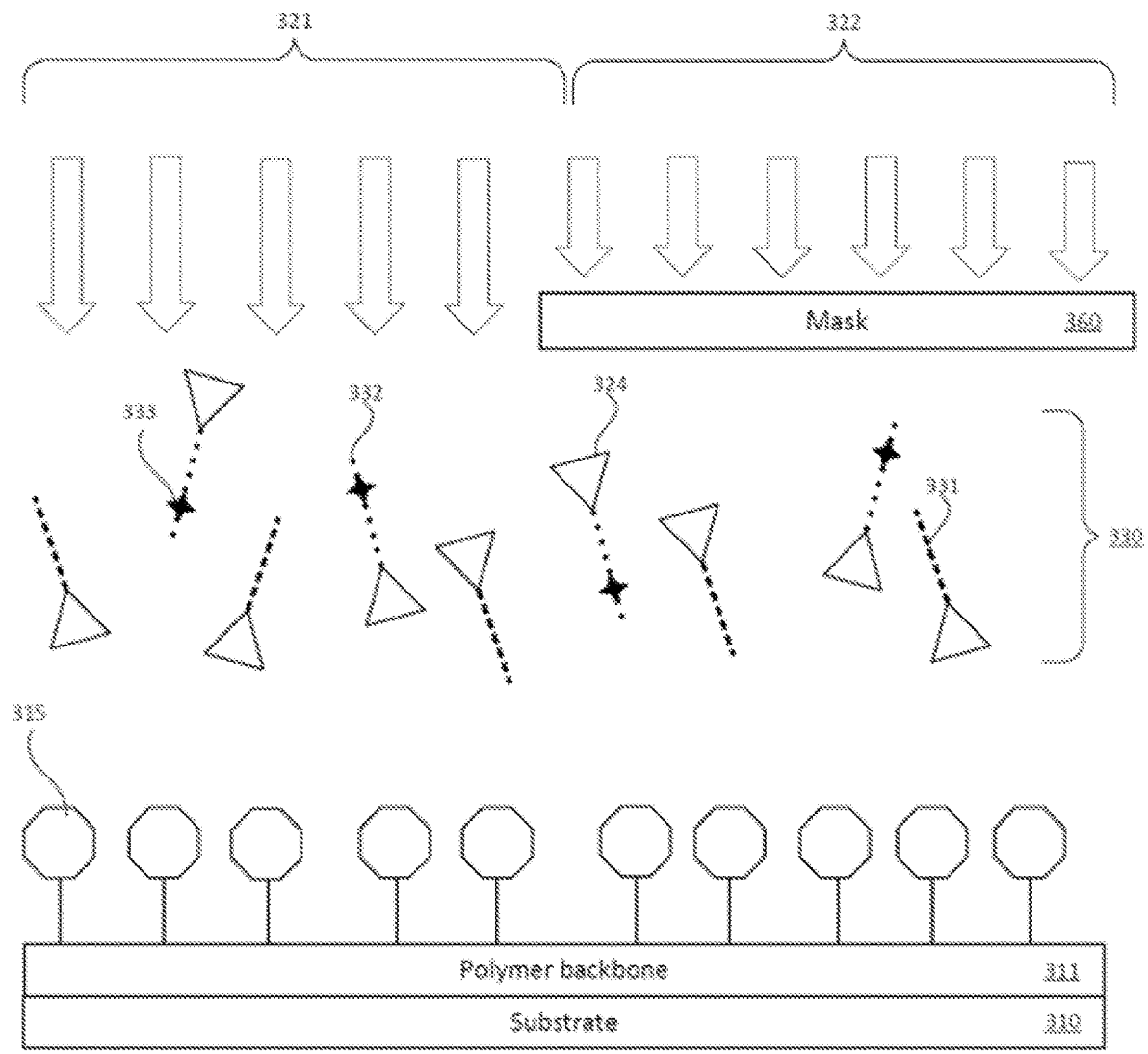

In another example, composition 3000 illustrated in FIG. 3J includes substrate 310 and a polymer including backbone 311 disposed on (e.g., immobilized on) substrate 310, and moieties 315 coupled to backbone 311. In a manner such as illustrated in FIG. 3J, moieties 315 in first region 321 of the polymer may be selectively irradiated with light (as indicated by the downward-pointing arrows), while moieties 315 in second region 322 of the polymer are not irradiated. For example, second region 322 may be masked using mask 360 (as indicated by the mask blocking the downward-pointing arrows). During irradiation, moieties 315 in the first region 321 of the polymer and in the second region 322 of the polymer may be contacted with fluid 330. In the illustrated example, fluid 330 includes a mixture of oligonucleotides 331 corresponding to oligonucleotides 231 described with reference to FIG. 2A, and oligonucleotides 332 corresponding to oligonucleotides 232 described with reference to FIG. 2A. Oligonucleotides 332 may include excision moieties 333, while oligonucleotides 331 may lack excision moieties. Fluid 330 also includes a photoinitiator. Each oligonucleotide 331, 332 may include reactive group 324 with which moieties 315 may react, in the presence of the photoinitiator and irradiation of the appropriate wavelength and intensity, such as in active region 321 of the polymer when irradiated but not substantially in inactive region 322 of the polymer when inactive region 322 of the polymer is not irradiated, such as when masked.

Figure 3K:
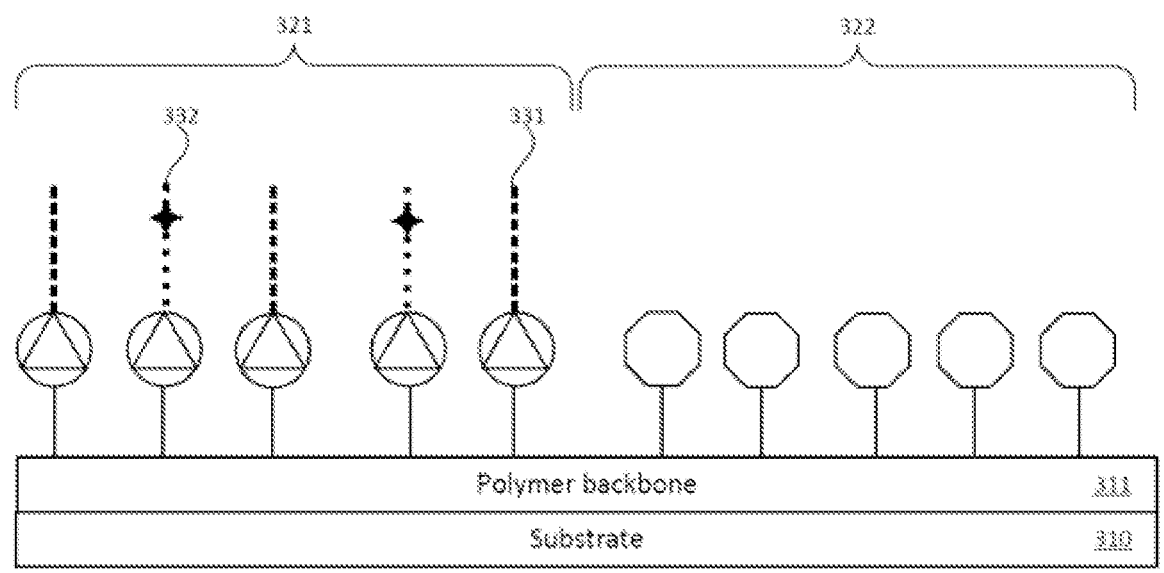

In this regard, the light may have a wavelength and an intensity suitable for performing such conversion, e.g., may be in the range of about 245 nm to about 400 nm so as to have sufficiently high frequency to cause reaction between reactive group 324 of oligonucleotides 332 with active region 321 of the polymer but substantially not to cause reaction between reactive group 324 of oligonucleotides 332 with active region 322 of the polymer. Nonlimiting examples of polymer backbones coupled to moieties 315 that may reach with reactive groups 324 in the presence of a photoinitiator, in the presence of light, and of such photoinitiator, are provided elsewhere herein. Optionally, before selectively irradiating region 321 with light, a photoresist may be deposited over such regions and may increase the accuracy with which region 321 is irradiated while inactive region 322 is not irradiated. The photoresist then may be removed, e.g., using a suitable solvent, before contacting the polymer with fluid 330. In some examples, the irradiated photoresist is removed from first region 321 and the non-irradiated photoresist is removed from second region 322 in different steps than one another, or in a common step as one another. As such, in a manner such as illustrated in FIG. 3K, a mixture of oligonucleotides 331, 332 may become coupled to the polymer within region 321, while oligonucleotides may not become coupled to the polymer within region 322.

Figure 3L:
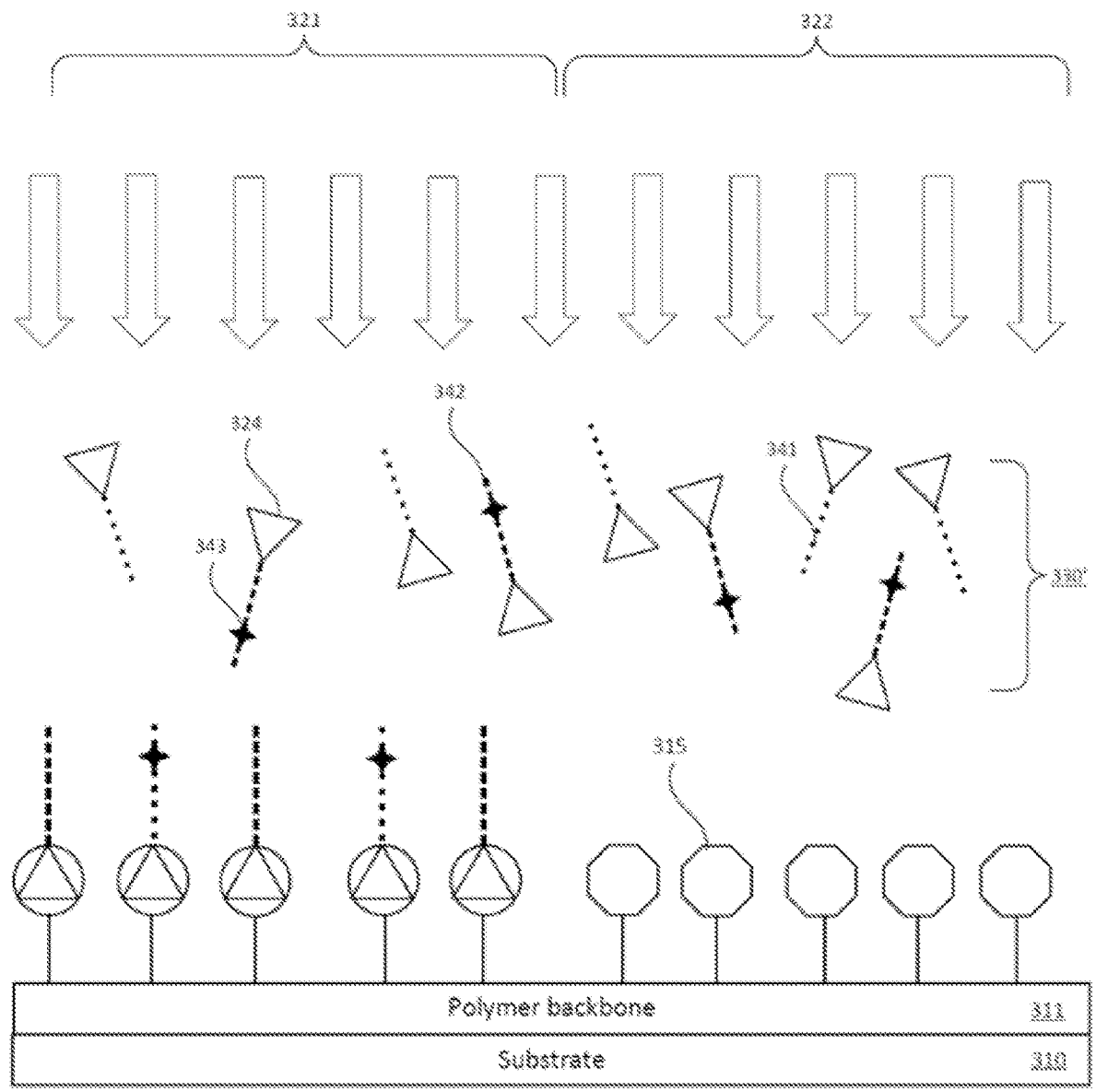

Second region 322 of the polymer then may be irradiated. For example, in a manner such as illustrated in FIG. 3L, second region 322 of the polymer may be unmasked, and moieties 315 in the second region 322 of the polymer may be irradiated with light. During irradiation, moieties 315 in the first region 322 of the polymer and in the second region 322 of the polymer may be contacted with fluid 330'. In the illustrated example, fluid 330' includes a mixture of oligonucleotides 341 corresponding to oligonucleotides 241 described with reference to FIG. 2A, and oligonucleotides 342 corresponding to oligonucleotides 232 described with reference to FIG. 2A. Oligonucleotides 342 may include excision moieties 343, while oligonucleotides 341 may lack excision moieties. Fluid 330' also includes a photoinitiator. Each oligonucleotide 341, 342 may include reactive group 324 with which moieties 315 may react, in the presence of the photoinitiator and irradiation of the appropriate wavelength and intensity, such as in region 322 of the polymer when irradiated in accordance with FIG. 3L.

A photoinitiator included in fluid 330 may be the same as a photoinitiator included in fluid 330', or the each fluids 330, 330' may include a photoinitiator that is not included in the other fluid 330, 330'. In some examples, moieties 315' (not shown) in second region 322 of the polymer may differ from moieties 315 in a first region 321 of the polymer. In some examples, reactive group 324 of oligonucleotides 331 and 332 of fluid 330 may differ from reactive group 324' (not shown) of oligonucleotides 341 and 342 of fluid 330'. In some examples, reactive group 324 of oligonucleotides 331 and 332 of fluid 330 may react with moieties 315 of the polymer in the presence of a photoinitiator of fluid 330 when irradiated, but substantially not when exposed to a photoinitiator of fluid 330'. In some examples, reactive group 324' (not shown) of oligonucleotides 341 and 342 of fluid 330' may react with moieties 315' (not shown) of the polymer in the presence of a photoinitiator of fluid 330' when irradiated, but substantially not when exposed to a photoinitiator of fluid 330.

Figure 3M:
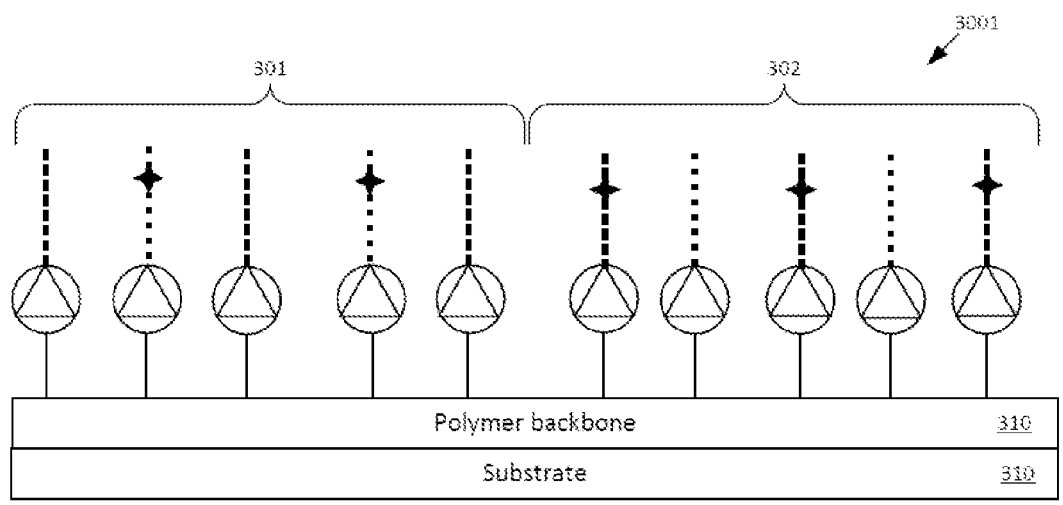

In some examples, region 321 may be irradiated with light at the same time as region 322, for example because any moieties 315 in region 321 already would have substantially completely reacted with reactive group 324. However, it will be appreciated that region 322 may be selectively irradiated, e.g., region 321 optionally may be masked while region 322 is irradiated with light, for example to inhibit the light from degrading oligonucleotides 331, 332. Additionally, or alternatively, the wavelength of the light may be selected so as to inhibit light-induced degradation of the oligonucleotides, e.g., may be in the range of about 245 nm to about 400 nm. As such, in a manner such as illustrated in FIG. 3M, a mixture of oligonucleotides 341, 342 may become coupled to the polymer within region 322, while oligonucleotides 331, 332 may remain coupled to the polymer within region 321. The resulting composition 3001 illustrated in FIG. 3H may include polymer region 301 corresponding to polymer region 101 described with reference to FIG. 1 and polymer region 201 described with reference to FIG. 2A, and polymer region 302 corresponding to polymer region 102 described with reference to FIG. 1 and polymer region 202 described with reference to FIG. 2A, and may be used to amplify a target polynucleotide in a similar manner as described with reference to FIGS. 1 and 2A-2D.

Any suitable moieties 315 may be used that may react with reactive groups 324 in the presence of a photoinitiator in a manner such as described with reference to FIG. 3A-3B and to active moieties 314 in a manner such as described with reference to FIGS. 3E-3F. Illustratively, inactive moieties 312 may include an o-nitrobenzyl having the structure:

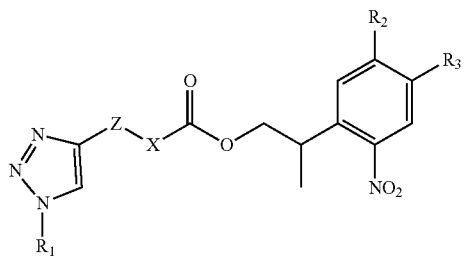

wherein $R_2$ and $R_3$ are each independently selected from —H and —O—$CH_3$, Z includes an alkane comprising one or more of —$CH_2$—, (—$CH_2$)$_m$, and (—$CH_2$—O—)$_n$, wherein m and n are independently an integer from 0 to 50, and X is selected from —S— and —N(H)— and $R_1$ is a linkage to a backbone of the polymer. Irradiation with ultraviolet (UV) light, (e.g., at about 365 nm and a suitable intensity) causes loss of the o-nitrobenzyl group to form the active moiety, a trizole:

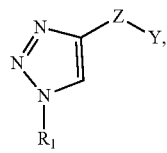

wherein Y includes a backbone reactive group selected from an amine an a thiol.

In an example Y includes an amine. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an N-Hydroxysuccinimide ester (NHS), such as having a structure

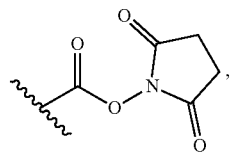 [SMILES: *C(=O)ON1C(=O)CCC1=O]

or a carboxylic acid, or a carboxylic acid reacted with a carbodoimide, such as for example 1-ethyl-3-(-3-dimethylaminopropyl) carbodiimide hydrochloride (EDC), to form an o-acylisourea, such as with a structure

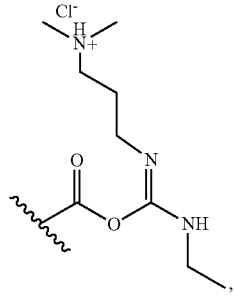 [SMILES: [Cl-] ; *C(=O)O/C(=N\CCCN(C)C)NCC]

The NHS or carboxylic acid or o-acylisourea may react with the amine to form a structure:

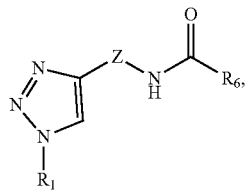

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a vinylsulfone.

The vinylsulfone may react with the amine to form a structure:

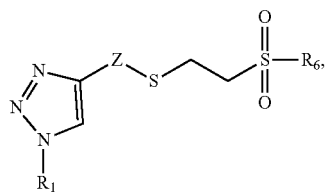

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a maleimide.

The maleimide may react with the amine to form a structure:

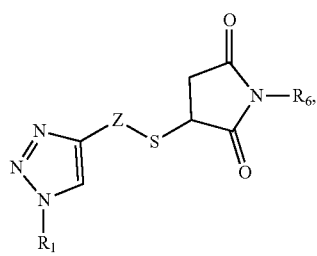

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an acrylamide.

The acrylamide may react with the amine to form a structure:

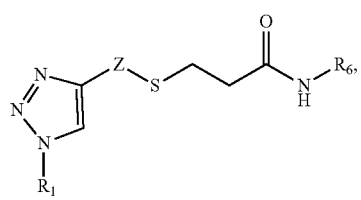

thus coupling the oligonucleotide to the polymer.

Illustratively, inactive moieties 312 may include an o-nitrobenzyl having the structure:

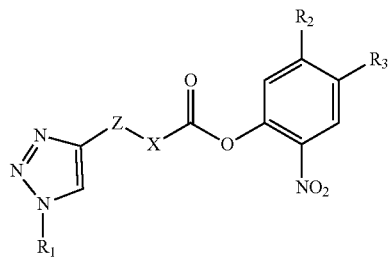

wherein $R_2$ and $R_3$ are each independently selected from —H and —O—$CH_3$, Z includes an alkane comprising one or more of —$CH_2$—, (—$CH_2$—$)_m$, and (—$CH_2$—O—$)_n$, wherein m and n are independently an integer from 0 to 50, and X is selected from —S and —N(H)— and $R_1$ is a linkage to a backbone of the polymer. Irradiation with ultraviolet (UV) light, (e.g., at about 365 nm and a suitable intensity) causes loss of the o-nitrobenzyl group to form the active moiety, a trizole:

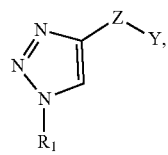

wherein Y includes a backbone reactive group selected from an amine and a thiol.

In an example Y includes an amine. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an N-Hydroxysuccinimide ester (NHS), such as having a structure

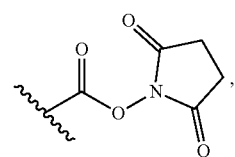 [SMILES: *C(=O)ON1C(=O)CCC1=O]

or a carboxylic acid, or a carboxylic acid reacted with a carbodoimide, such as for example 1-ethyl-3-(-3-dimethylaminopropyl) carbodiimide hydrochloride (EDC), to form an o-acylisourea, such as with a structure

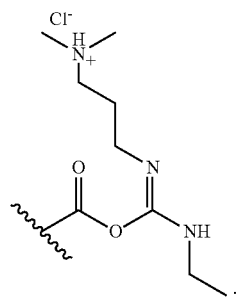 [SMILES: [Cl-] ; *C(=O)O/C(=N\CCCN(C)C)NCC]

The NHS or carboxylic acid or o-acylisourea may react with the amine to form a structure:

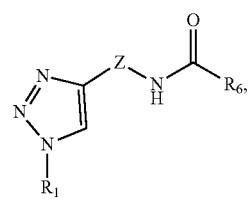

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a vinylsulfone.

The vinylsulfone may react with the amine to form a structure:

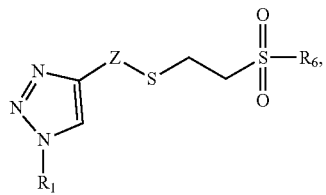

where R$_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a maleimide.

The maleimide may react with the amine to form a structure:

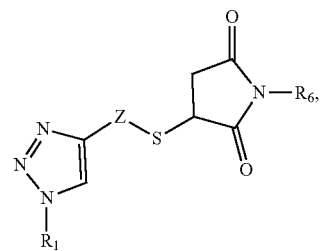

where R$_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an acrylamide.

The acrylamide may react with the amine to form a structure:

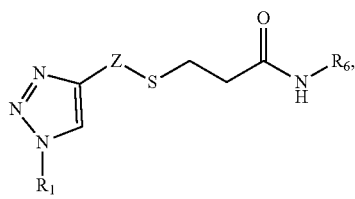

wherein R$_6$ represents the oligonucleotide, thus coupling the oligonucleotide to the polymer.

Illustratively, inactive moieties 312 may include benzopyrone having the structure:

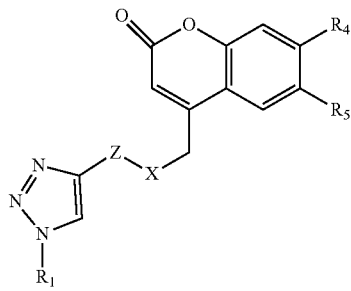

wherein R$_4$ is selected from —H, —O—CH$_3$, and —N—(CH$_3$)$_2$, and R$_5$ is selected from —H and —Br, Z includes an alkane comprising one or more of —CH$_2$—, (—CH$_2$)$_m$, and (—CH$_2$—O—)$_n$, wherein m and n are independently an integer from 0 to 50, and X is selected from —S and —N(H)— and R$_1$ is a linkage to a backbone of the polymer. Irradiation with ultraviolet (UV) light, (e.g., at about 365 nm and a suitable intensity) causes loss of the benzopyrone group to form the active moiety, a trizole:

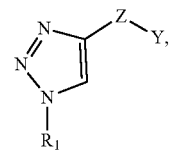

wherein Y includes a backbone reactive group selected from an amine and a thiol.

In an example Y includes an amine. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an N-Hydroxysuccinimide ester (NHS), such as having a structure

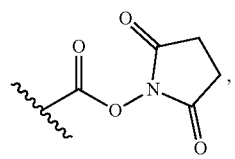 [SMILES: *C(=O)ON1C(=O)CCC1=O]

or a carboxylic acid, or a carboxylic acid reacted with a carbodoimide, such as for example 1-ethyl-3-(-3-dimethyl-aminopropyl) carbodiimide hydrochloride (EDC), to form an o-acylisourea, such as with a structure

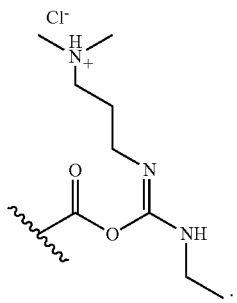 [SMILES: [Cl-] ; *C(=O)O/C(=N\CCCN(C)C)NCC]

The NHS or carboxylic acid or o-acylisourea may react with the amine to form a structure:

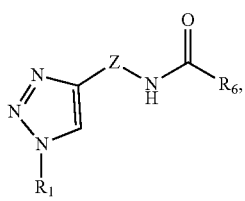

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a vinylsulfone.

The vinylsulfone may react with the amine to form a structure:

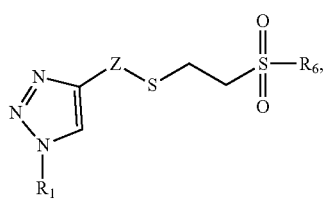

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be a maleimide.

The maleimide may react with the amine to form a structure:

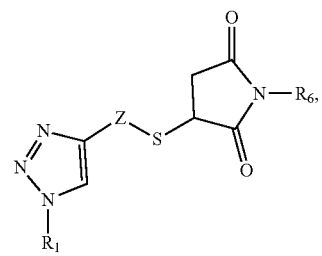

where $R_6$ represents the oligonucleotide, thus coupling the oligonucleotide to the polymer.

In an example Y includes a thiol. In a manner such as described above with reference to FIG. 3C, the reactive groups 323 to which oligonucleotides 331, 332 in fluid 320 are coupled, and also in a manner such as described with reference to FIG. 3G the reactive groups 323 to which oligonucleotides 341, 342 in fluid 320' are coupled, may be an acrylamide.

The acrylamide may react with the amine to form a structure:

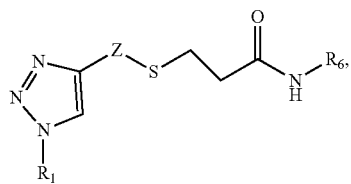

where $R_6$ represents the oligonecueotide thus coupling the oligonucleotide to the polymer.

Illustratively, moieties 315 may include an alkene having the structure:

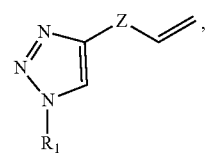

wherein Z includes an alkane including one or more of $-CH_2-$, $(-CH_2-)_m$, and $(-CH_2-O-)_n$, wherein m and n are independently an integer from 0 to 50, and $R_1$ is a linkage to a backbone of the polymer, and a reactive group 324 may include a thiol. In a manner such as described above with reference to FIG. 3J, the reactive groups to which oligonucleotides 331, 332 in fluid 330 are coupled, and also in a manner such as described with reference to FIG. 3L the reactive groups 324 to which oligonucleotides 341, 342 in fluid 330' are coupled, may be a thiol group. Irradiation with ultraviolet light, (e.g., at from about 245 nm to about 400 nm at a suitable intensity) in the presence of a photoinitiator may cause the reactive thiol group 324 to reach with the alkene of active moiety 315 to form a structure:

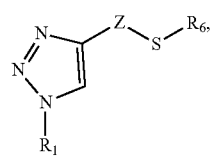

wherein R₆ represents the oligonucleotide, thus coupling the oligonucleotide to the polymer.

In an example, the photoinitiator may be selected from one or more of the photoinitiator is selected from one or more of phenyl bis(2,4,6-trimethylbenzoyl) phosphine oxide, 2-hydroxy-2-methyl-1-phenyl-propan-1-one, 2-hydroxy-4'-(2-hydroxyethoxy)-2-methylpropiophenone, 2,2'-azobis[2-methyl-n-(2-hydroxyethyl) propionamide], 2,2-dimethoxy-2-phenylacetophenone, diphenyl(2,4,6-trimethylbenzoyl)phosphine oxide, lithium phenyl(2,4,6-trimethylbenzoyl)phosphinate, and ethyl (2,4,6-trimethylbenzoyl)phenylphosphonate.

The foregoing examples illustrate irradiating a top side of a substrate. As further disclosed herein, in some examples, a bottom side of a substrate may be irradiated. The foregoing examples illustrate masking a region of a polymer. As further disclosed herein, in some examples, a bottom side of a substrate may be irradiated and a portion of the substrate may reduce or prevent irradiation of a portion of a polymer. As further disclosed herein, examples of irradiating a bottom side of a substrate may be suitable in some examples for substituting for irradiating from a top surface of a substrate while masking a region of a polymer.

Nonlimiting examples of polymers that may include inactive moieties that may be converted to active moieties such as exemplified above using light, and methods of making such polymers, are provided in greater detail elsewhere herein.

Although the examples described with reference to FIGS. 3A-3M may suggest the use of a flat substrate with first and second regions that are adjacent to one another, it should be apparent that more complex substrates may be used. For example, FIGS. 4A-4E schematically illustrate example compositions and operations in a process flow for coupling different oligonucleotides to an array of first and second regions of a polymer disposed on a substrate. Compositions such as described with reference to FIGS. 4A-4E may be prepared and used in a manner similar to those described with reference to FIGS. 3A-3M.

Figure 4A:
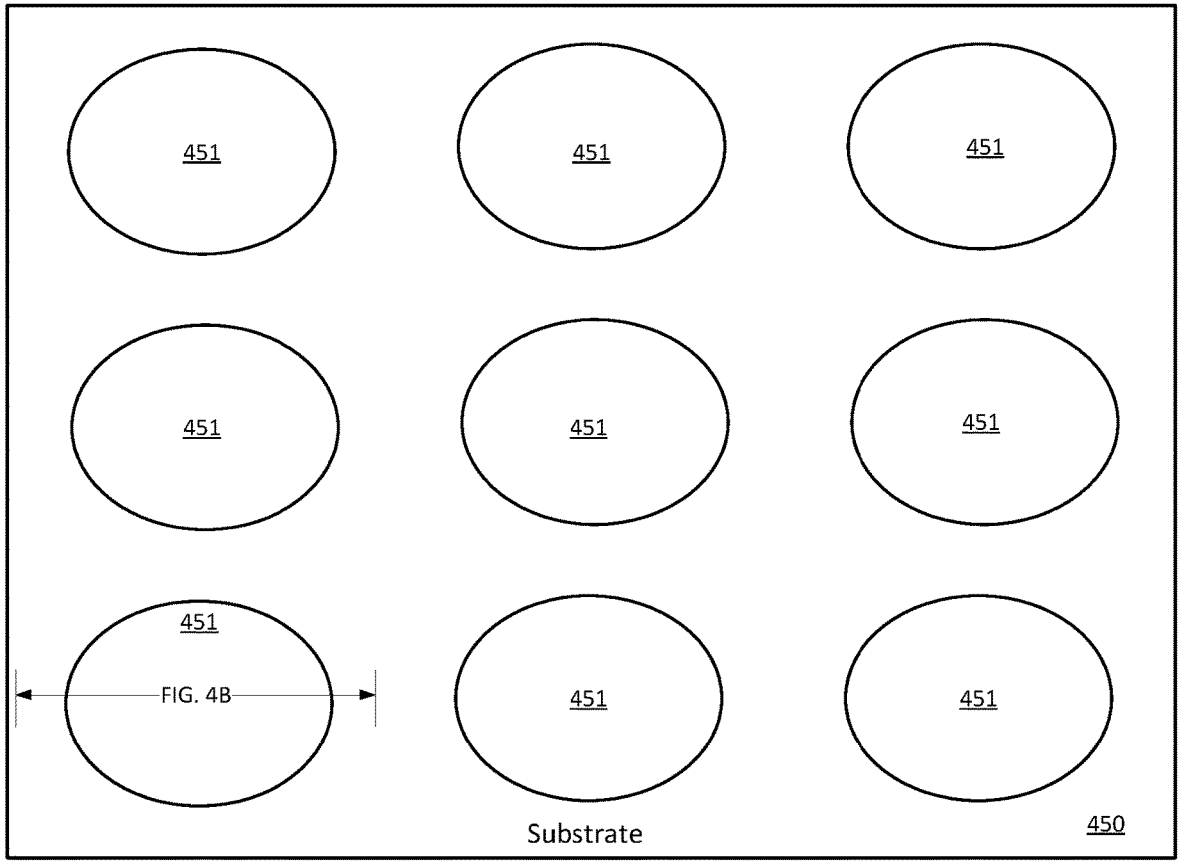
FIGS. 4A-4E schematically illustrate example compositions and operations in a process flow for coupling different oligonucleotides to an array of first and second regions of a polymer disposed on a substrate.
Figure 4B:
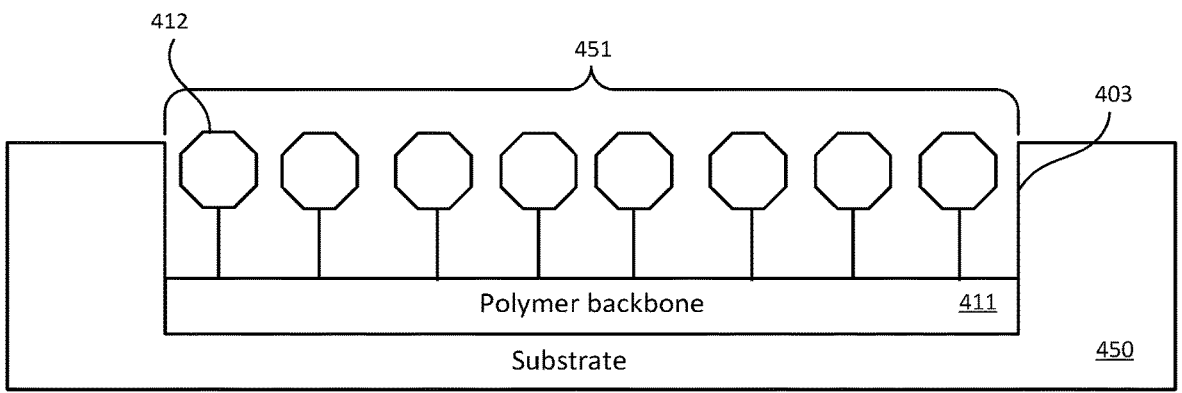
Figure 4C:
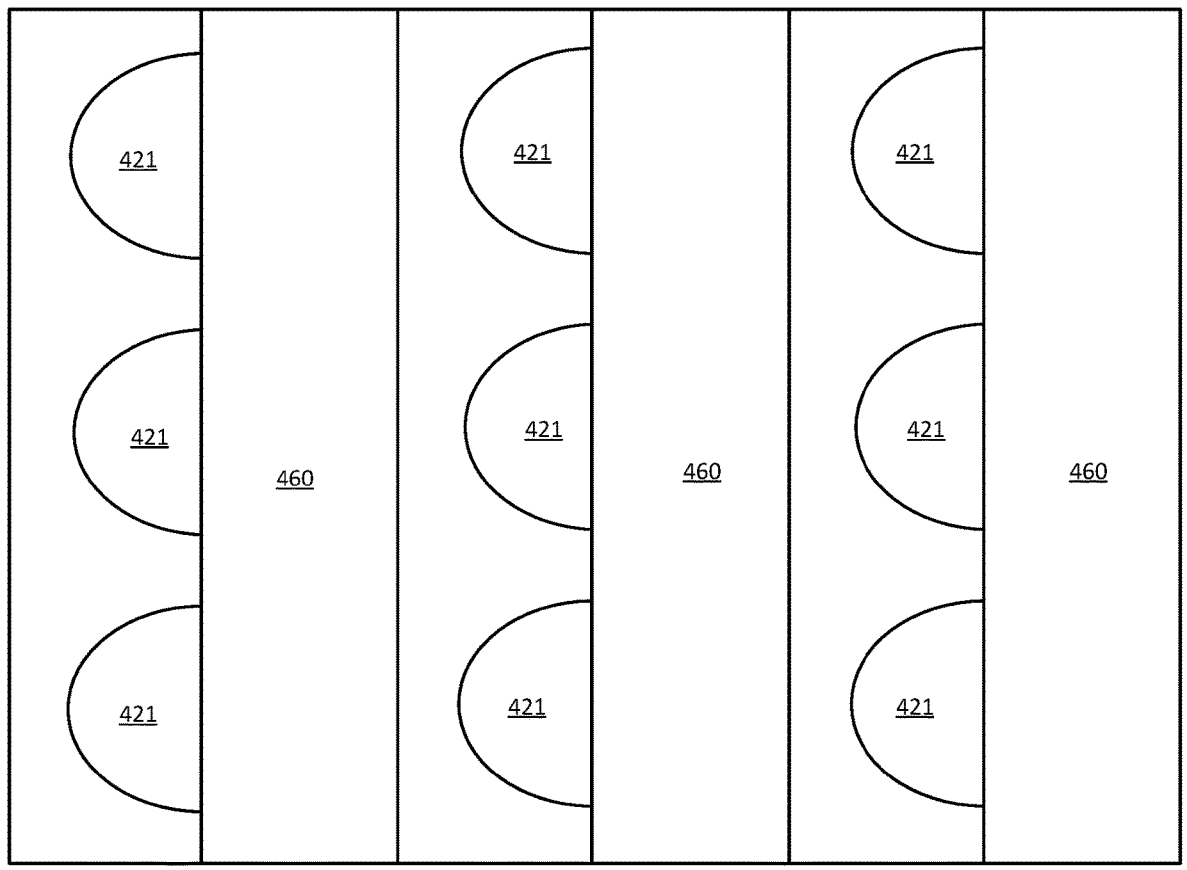
Figure 4D:
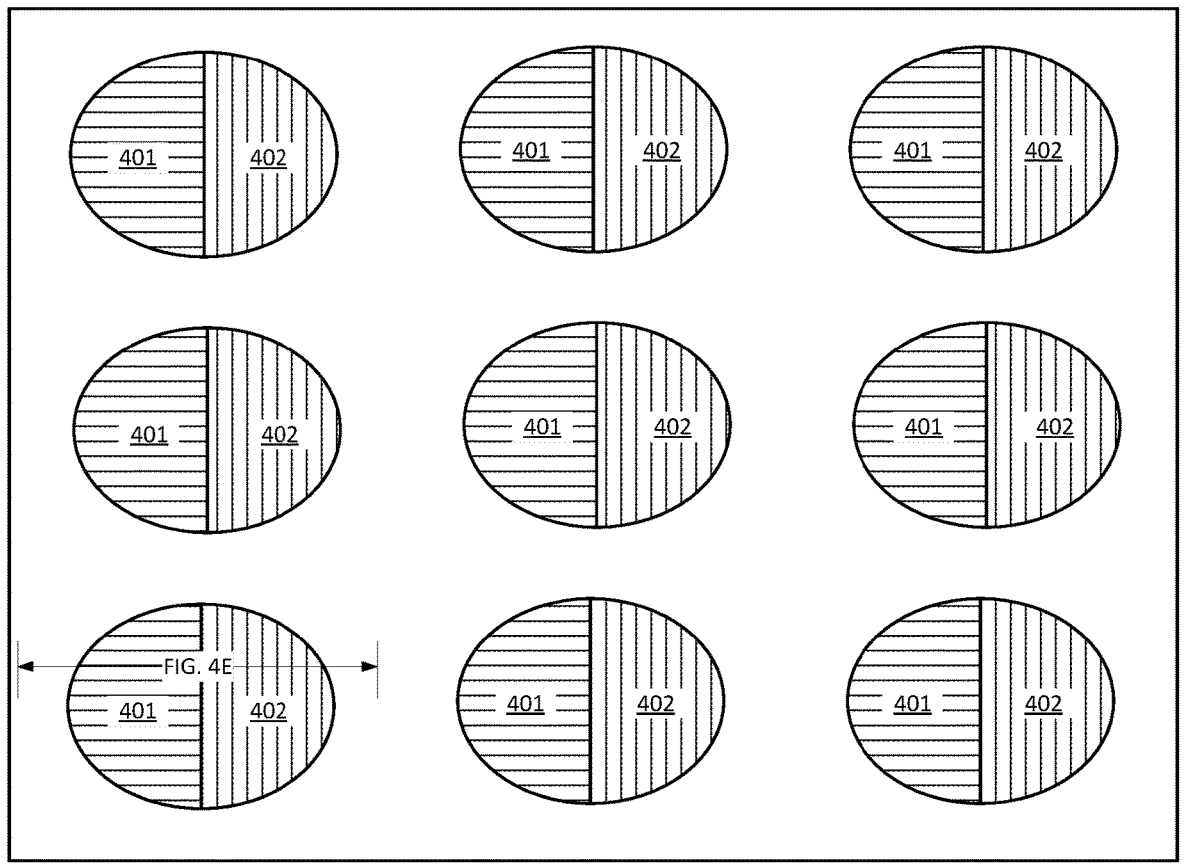
Figure 4E:
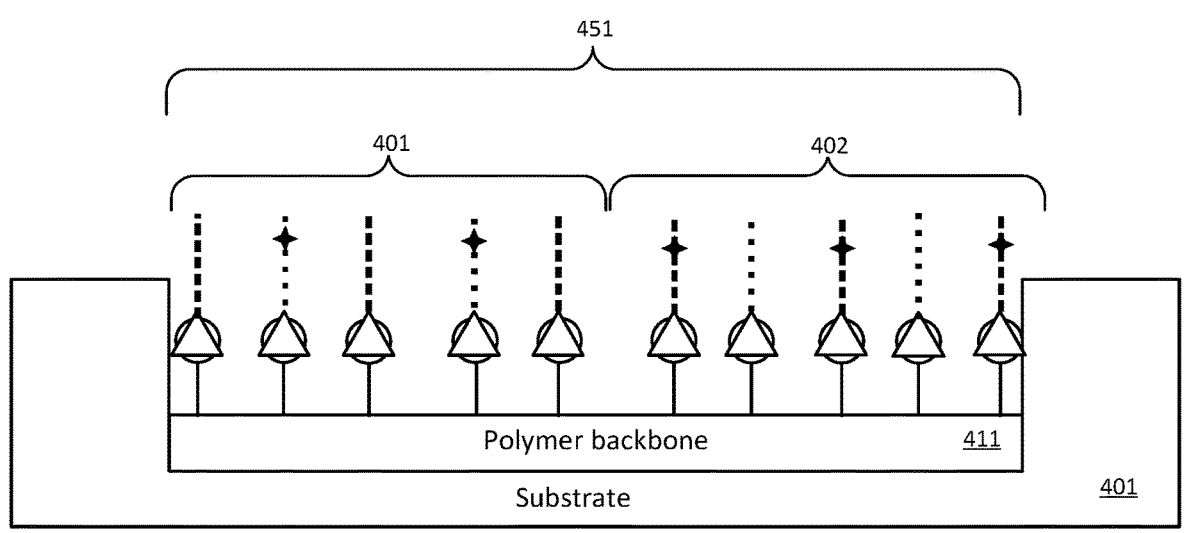

In the example shown in plan view in FIG. 4A, a portion of which is shown in cross sectional view in FIG. 4B, substrate 450 may include a plurality of vertical sidewalls 403 providing an array of wells 451 within each of which a polymer may be disposed, e.g., including backbone 411 and inactive moieties 412 such as described with reference to FIGS. 3A-3M and as exemplified elsewhere herein. The polymer within the array of wells 451 may be masked, or otherwise selectively irradiated, in any suitable manner so as to irradiate only a portion of the polymer within each well. For example, a plurality of parallel, elongated masks 460 may extend across and thus mask regions of multiple wells 451, while leaving regions 421 exposed for irradiation in a manner such as illustrated in FIG. 4C. Processes such as described with reference to FIGS. 3A-3M then may be performed so as to obtain an array of wells 451 such as illustrated in plan view in FIG. 4D, a portion of which is shown in cross sectional view in FIG. 4E. Within each of wells 451 may be disposed a first polymer region 401 which may be configured similarly as polymer regions 101, 201, and 301 respectively described with reference to FIGS. 1, 2A-2D, and 3H, and polymer region 402 which may be configured and used similarly as polymer regions 102, 202, and 302 respectively described with reference to FIGS. 1, 2A-2D, and 3H. Accordingly, a first region of the polymer may be considered to include a plurality of first subregions 401, and a second region of the polymer may be considered to include a plurality of second subregions 402. In a manner such as illustrated in FIG. 4D, each of the first subregions 401 may be contiguous with a corresponding one of the second subregions 402. Additionally, in a manner such as illustrated in FIG. 4D, Each of the first subregions 401, and the corresponding one of the second subregions 402 within which that first subregion is continuous, is located within a well 451.

Figure 5:
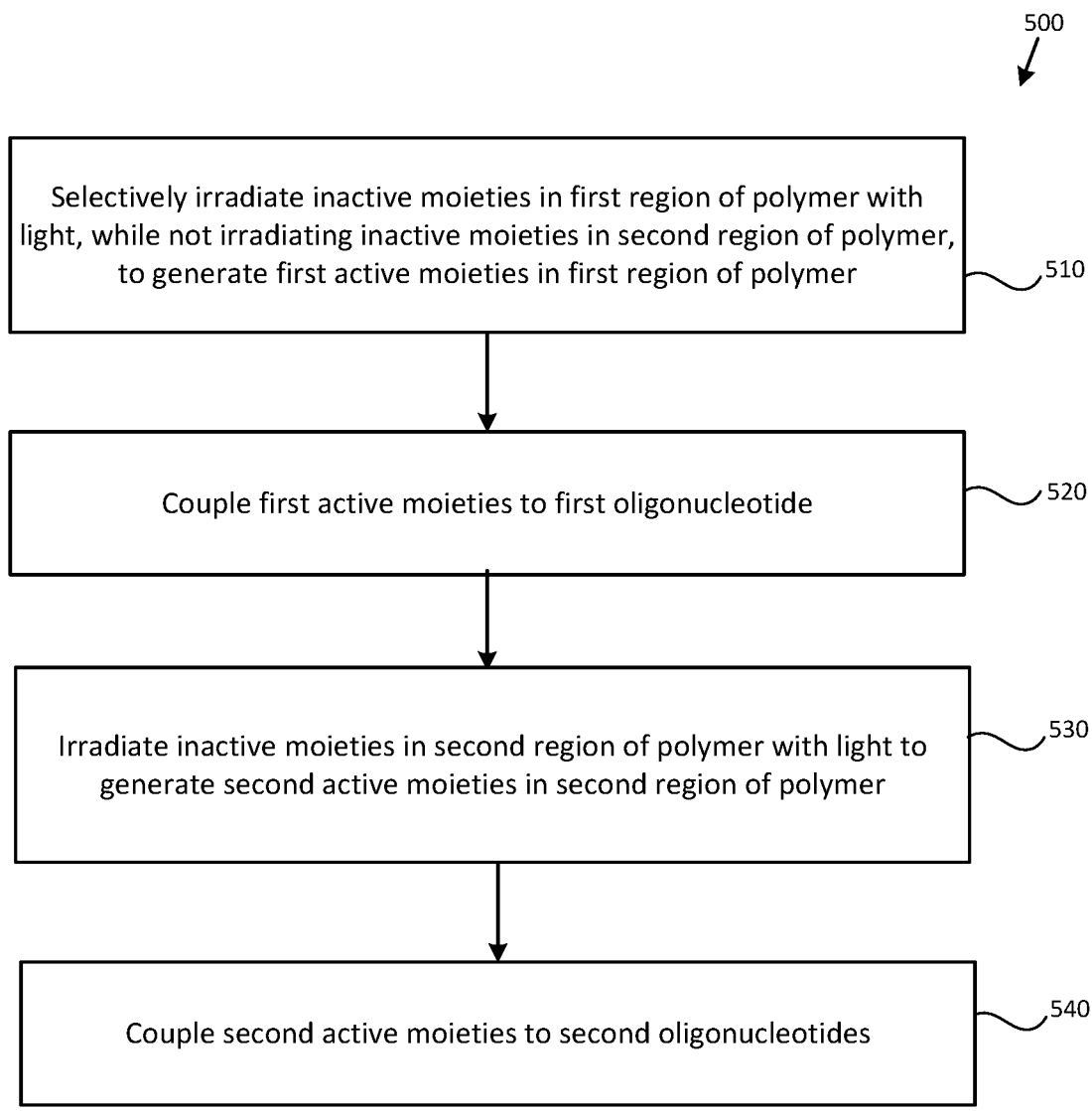
FIG. 5 illustrates an example flow of operations in a method for coupling different oligonucleotides to first and second regions of a polymer.

FIG. 5 illustrates an example flow of operations in a method for coupling different oligonucleotides to first and second regions of a polymer. Method 500 illustrated in FIG. 5 may include selectively irradiating inactive moieties in a first region of a polymer with light, while not irradiating inactive moieties in a second region of the polymer, to generate first active moieties in the first region of the polymer (operation 510). Nonlimiting examples of such selective irradiation are described with reference to FIGS. 3A-3M and 4C. Method 500 illustrated in FIG. 5 also may include coupling the first active moieties to first oligonucleotides (operation 520). Method 500 illustrated in FIG. 5 also may include irradiating the inactive moieties in the second region of the polymer with light to generate second active moieties in the second region of the polymer (operation 530). Nonlimiting examples of such irradiating are described with reference to FIGS. 3E-3F. Method 500 illustrated in FIG. 5 also may include coupling the second active moieties to second oligonucleotides (operation 540). As described, other examples may include selective irradiation for spatially selective coupling of oligonucleotides to regions of a polymer in the presence of a photoinitiator.

Polymers, and Methods of Making Polymers

Nonlimiting examples of inactive moieties that may be converted to active moieties using light, and reactive groups that may be reacted with such active moieties to couple oligonucleotides to polymers, or with moieties in the presence of a photoinitiator with light to couple oligonucleotides to polymers, are provided above with reference to FIGS. 3A-3M. Some nonlimiting examples of methods of forming polymers including such moieties, including inactive moieties, and the resulting polymers, now will be described.

In some examples, a polymer includes a poly(o-nitrobenzyl-masked acrylamide-co-acrylamide) copolymer having a structure:

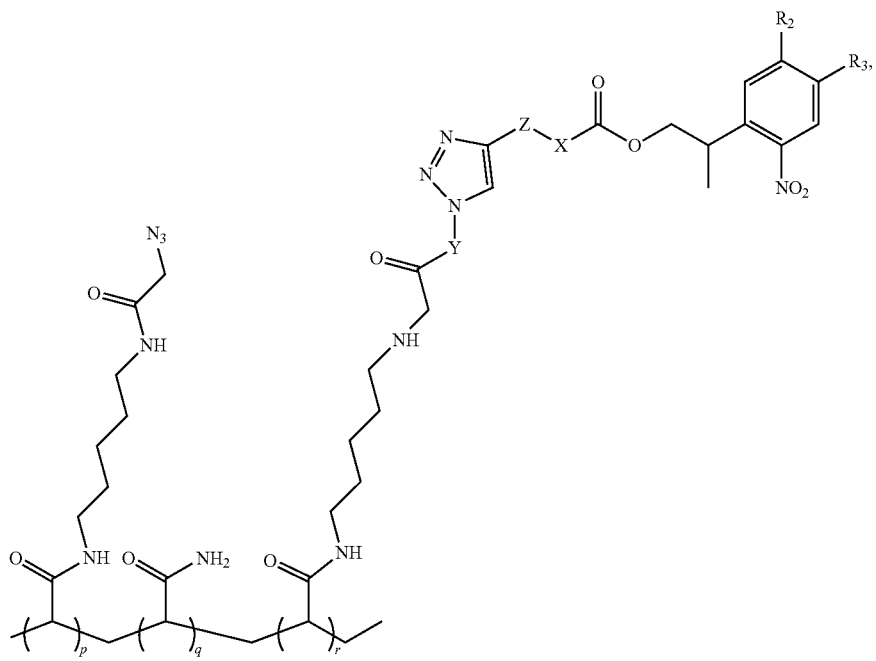

wherein $R_2$ and $R_3$ are each independently selected from —H and —O—$CH_3$, X is selected from —S and —N(H)—, Y is selected from —C($H_2$)—, —C($H_2$)—C($H_2$)—O—$)_s$ wherein s is an integer from 1 to 10, and

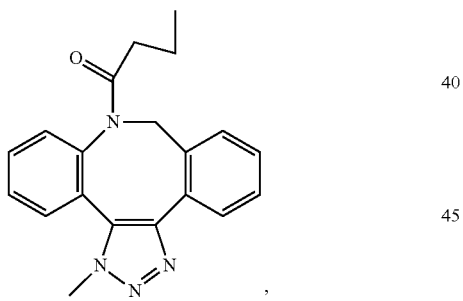

Z comprises an alkane comprising one or more of —$CH_2$—, (—$CH_2$—$)_m$, and (—$CH_2$—O—$)_n$, wherein m and n are independently an integer from 0 to 50, and p is an integer from 50 to 100,000, q is an integer from 5 to 10,000, and r is an integer from 5 to 10,000. Note that the o-nitrobenzyl-masked triazole may have any suitable structure such as described further above to form any suitable copolymer of o-nitrobenzyl-masked triazole functional monomers, and is not limited to this particular example.

In some examples, a polymer includes a poly(benzopyrone-masked acrylamide-co-acrylamide) copolymer having a structure:

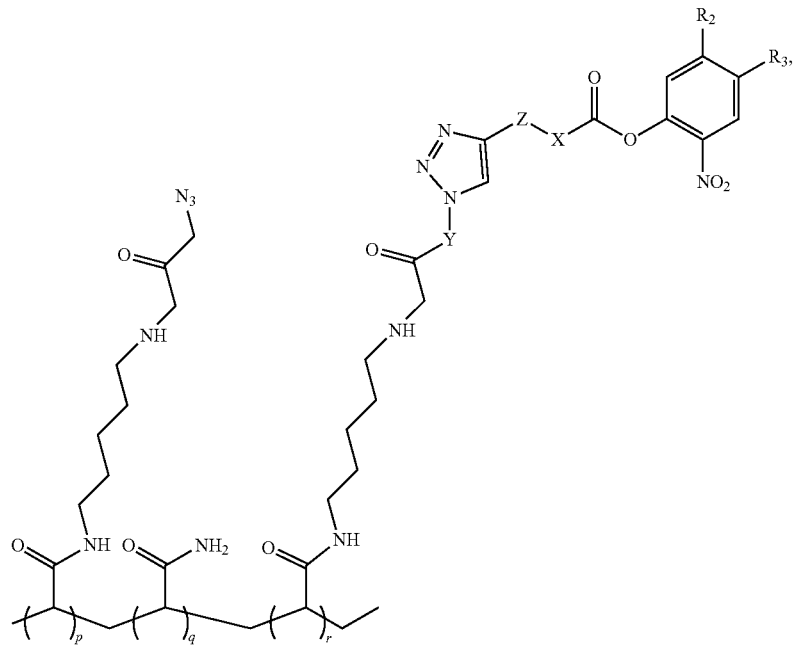

wherein $R_2$ and $R_3$ are each independently selected from —H and —O—$CH_3$, X is selected from —S and —N(H)—, Y is selected from —C($H_2$)—, —(C($H_2$)—C($H_2$)—O)$_s$ wherein s is an integer from 1 to 10, and Z comprises an alkane comprising one or more of —$CH_2$—, (—$CH_2$—)$_m$, and (—$CH_2$—O—)$_n$, wherein m and n are independently an integer from 0 to 50, and p is an integer from 50 to 100,000, q is an integer from 5 to 10,000, and r is an integer from 5 to 10,000. Note that the o-nitrobenzyl-masked triazole may have any suitable structure such as described further above to form any suitable copolymer of o-nitrobenzyl-masked triazole functional monomers, and is not limited to this particular example.

In some examples, a polymer includes a poly(benzopyrone-masked acrylamide-co-acrylamide) copolymer having a structure:

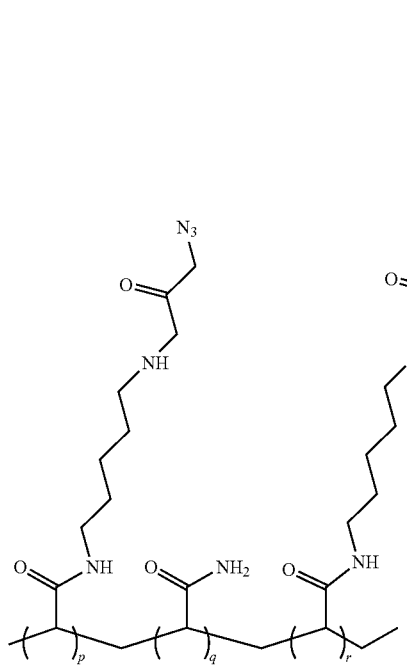
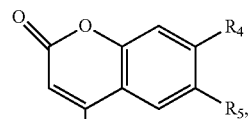

wherein $R_4$ is selected from —H, —O—CH$_3$, and —N—(CH$_3$)$_2$, and $R_5$ is selected from —H and —Br, X is selected from —S and —N(H)—, Y is selected from —C(H$_2$)—, —(C(H$_2$)—C(H$_2$)—O)$_s$ wherein s is an integer from 1 to 10, and

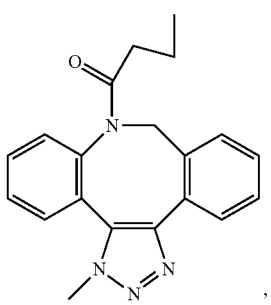 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000. Note that the benzopyrone-masked triazole may have any suitable structure such as described further above to form any suitable copolymer of benzopyrone-masked triazole functional monomers, and is not limited to this particular example.

In some examples, a polymer includes a poly(aminotriazole-acrylamide-co-acrylamide) copolymer having a structure:

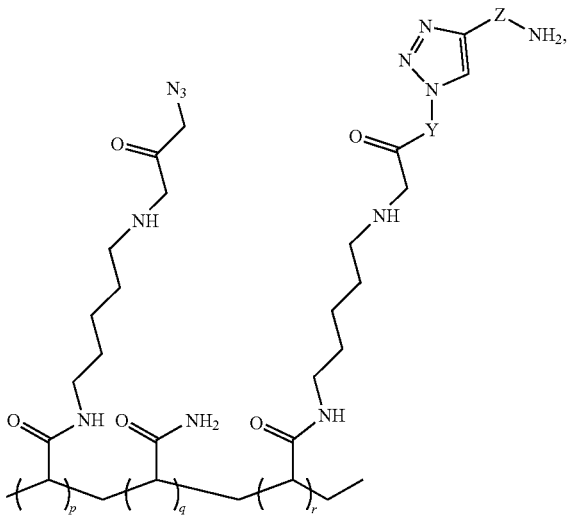

Y is selected from —C(H$_2$)—, —(C(H$_2$)—C(H$_2$)—O)$_s$ wherein s is an integer from 1 to 10, and

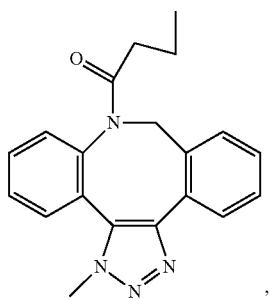 [SMILES: CCCC(=O)N1Cc2ccccc2-c2nnn(C)c2-c2ccccc21]

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples, a polymer includes a poly(thiotriazole-acrylamide-co-acrylamide) copolymer having a structure:

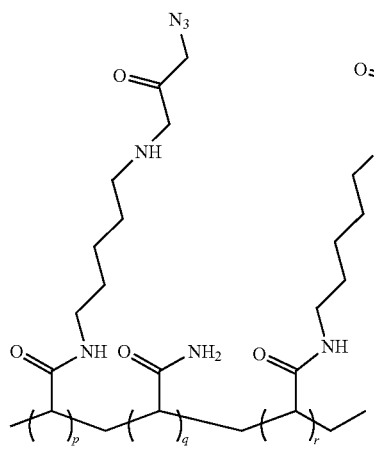

Y is selected from —C(H$_2$)—, —(C(H$_2$)—C(H$_2$)—O)$_s$, wherein s is an integer from 1 to 10, and

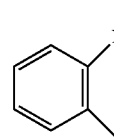

Z comprises an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples, a method of making a polymer includes a light-induced reaction:

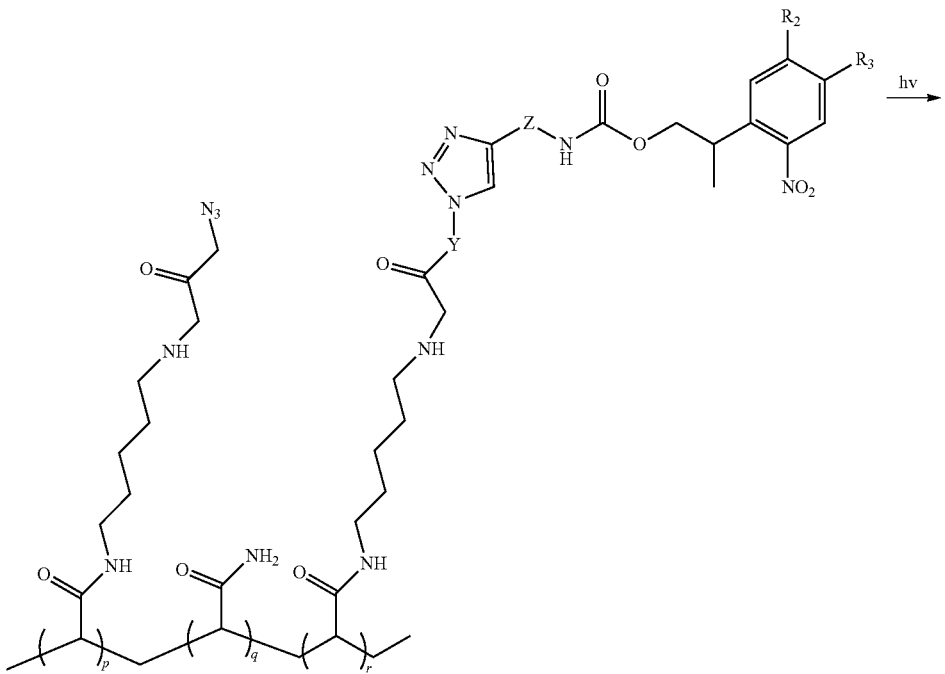

-continued

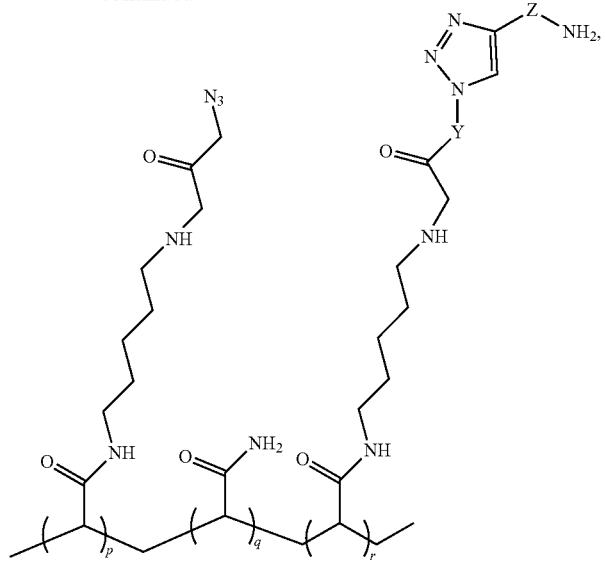

wherein Y is selected from —C(H$_2$)—, —(C(H$_2$)—C(H$_2$)—O)$_s$ wherein s is an integer from 1 to 10, and

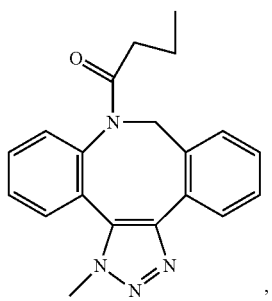 [SMILES: CCCC(=O)N1Cc2ccccc2-c2nnn(C)c2-c2ccccc21]

Z includes an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples, a method of making a polymer includes a light-induced reaction:

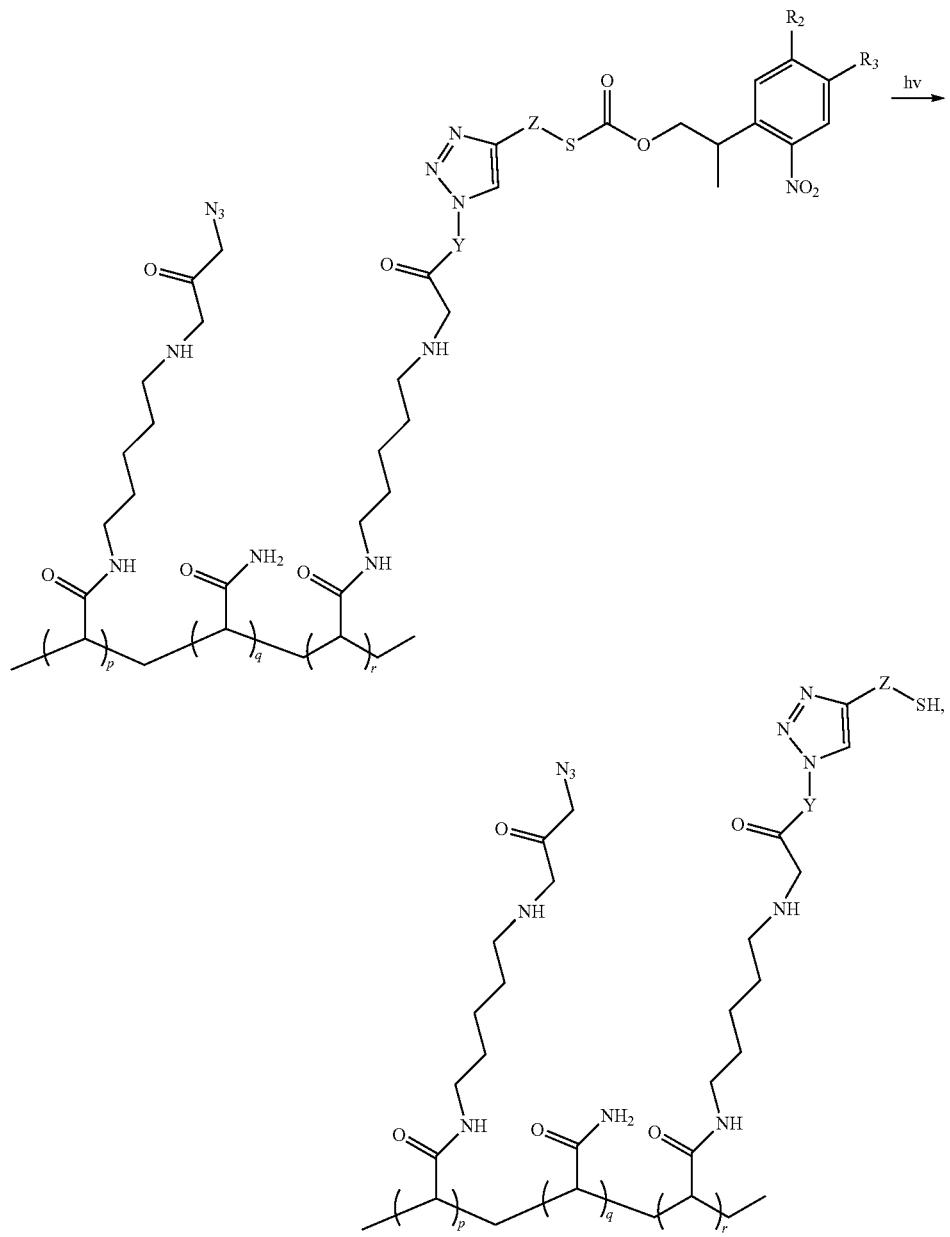
wherein Y is selected from —C(H$_2$)—, —(C(H$_2$)—C(H$_2$)—O)$_s$ wherein s is an integer from 1 to 10, and
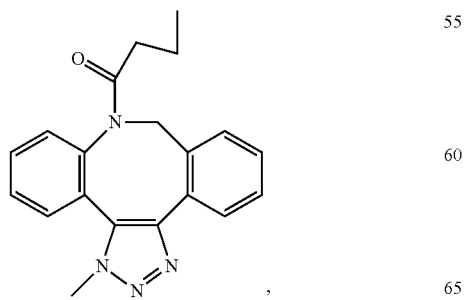

Z includes an alkane comprising one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.
In some examples, a method of making a polymer includes a light-induced reaction:
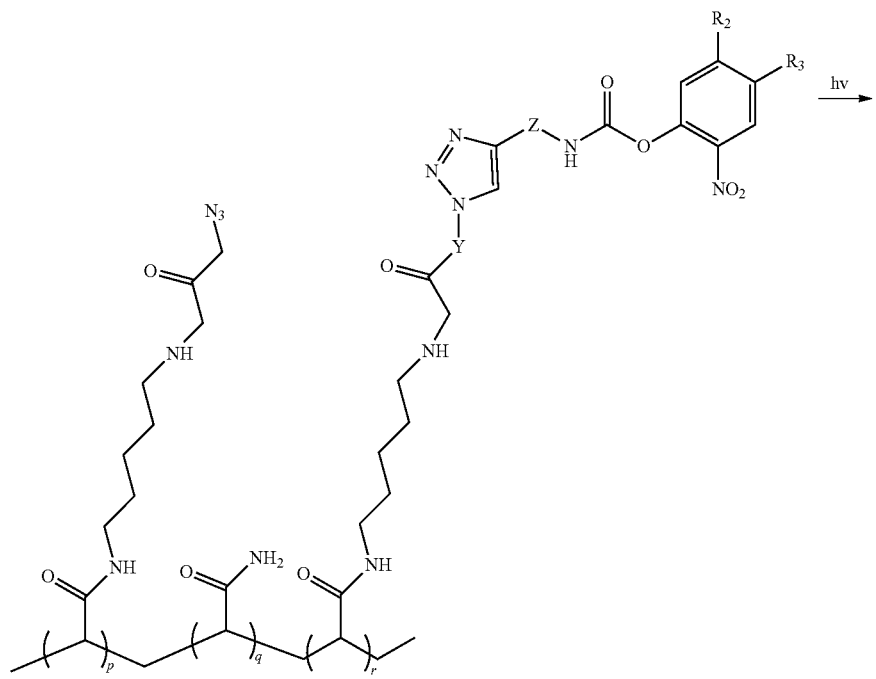
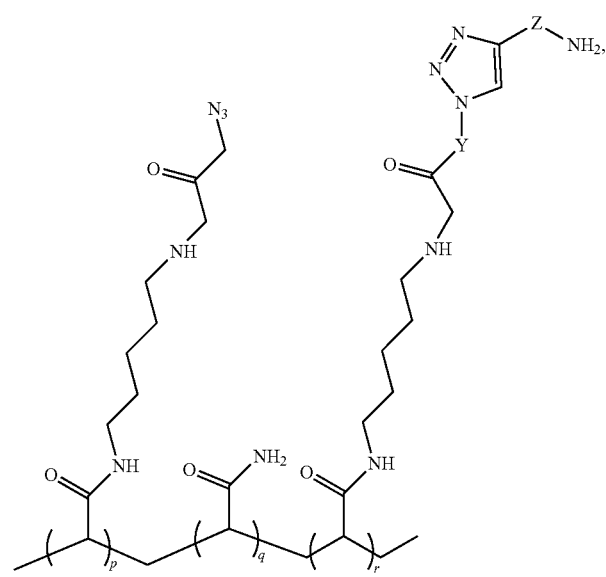
wherein Y is selected from —C(H$_2$)—, —(C(H$_2$)—C(H$_2$)—O)$_s$, wherein s is an integer from 1 to 10, and

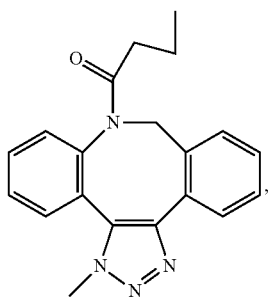 [SMILES: CCCC(=O)N1Cc2ccccc2-c2nnn(C)c2-c2ccccc21]

Z includes an alkane including one or more of —CH$_2$—, (—CH$_2$)$_m$, and (—CH$_2$—O—)$_m$, wherein m and n are independently an integer from 0 to 50, and p is an integer from 50 to 100,000, q is an integer from 5 to 10,000, and r is an integer from 5 to 10,000.

In some examples, a method of making a polymer includes a light-induced reaction:

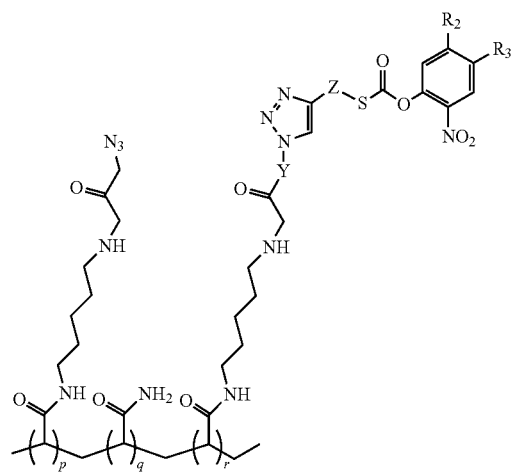

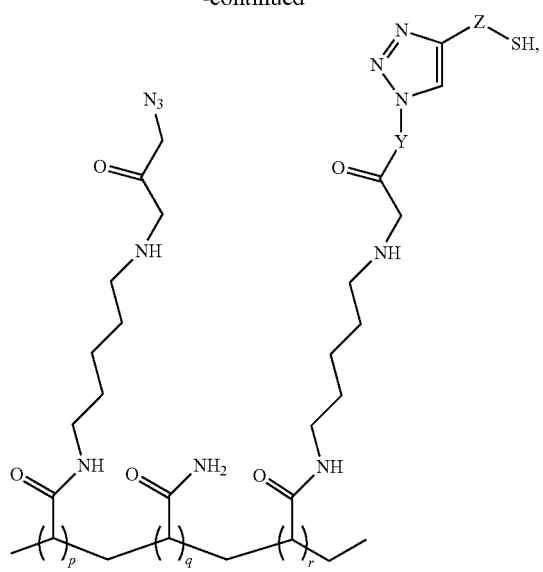

wherein Y is selected from —C(H$_2$)—, —(C(H$_2$)—C(H$_2$—O)$_s$ wherein s is an integer from 1 to 10, and

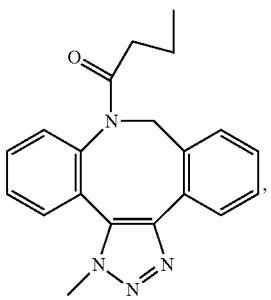 [SMILES: CCCC(=O)N1Cc2ccccc2-c2nnn(C)c2-c2ccccc21]

Z includes an alkane including one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples, a method of making a polymer includes a light-induced reaction:

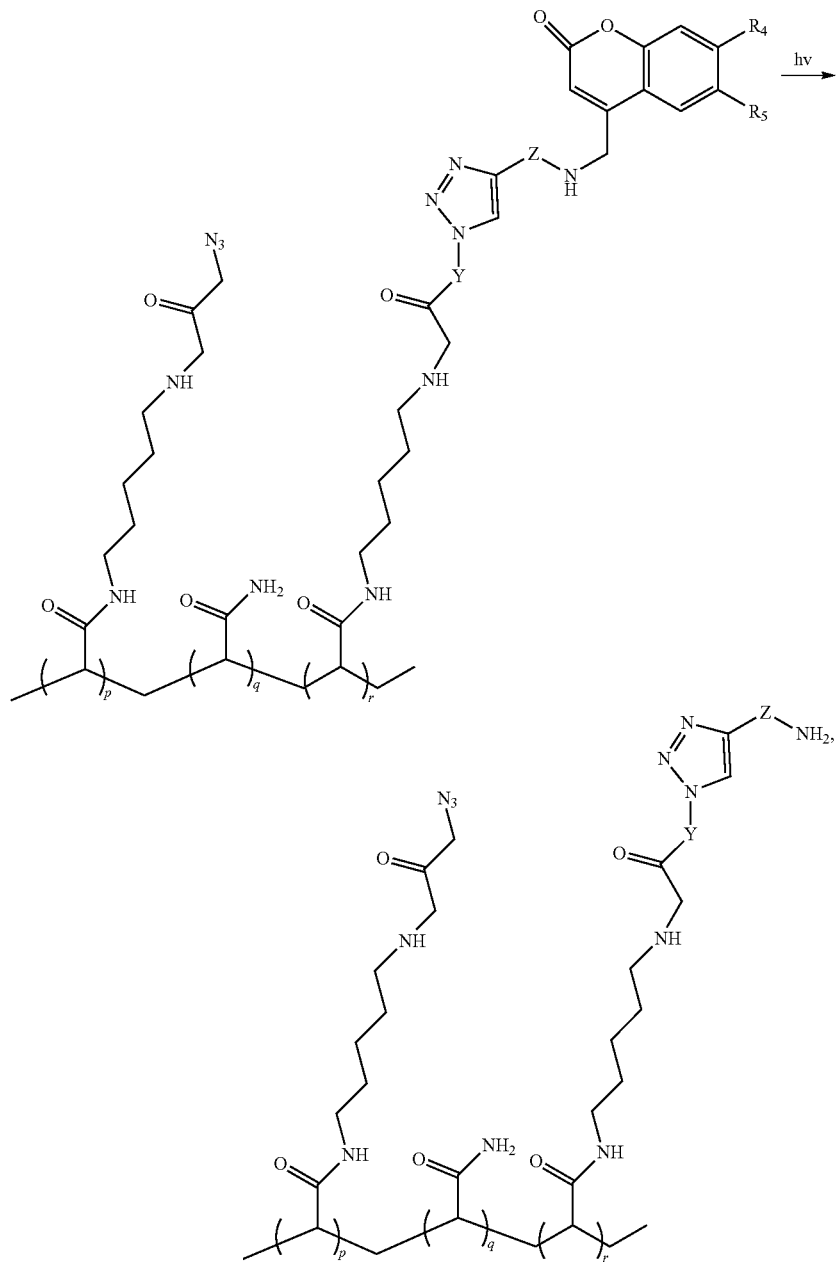
wherein Y is selected from —C(H$_2$)—, —(C(H$_2$)—C(H$_2$)—O)$_s$, wherein s is an integer from 1 to 10, and
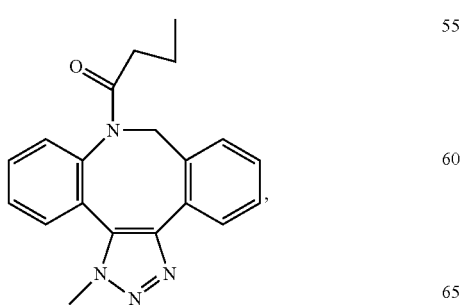

Z includes an alkane including one or more of $-CH_2-$, $(-CH_2-)_m$, and $(-CH_2-O-)_n$, wherein m and n are independently an integer from 0 to 50, and p is an integer from 50 to 100,000, q is an integer from 5 to 10,000, and r is an integer from 5 to 10,000.
In some examples, a method of making a polymer includes a light-induced
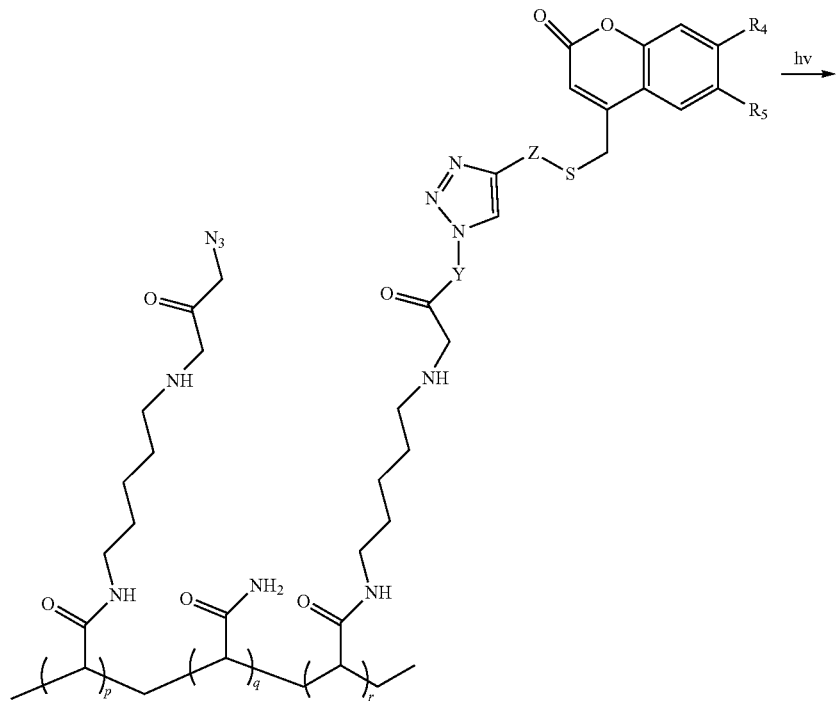
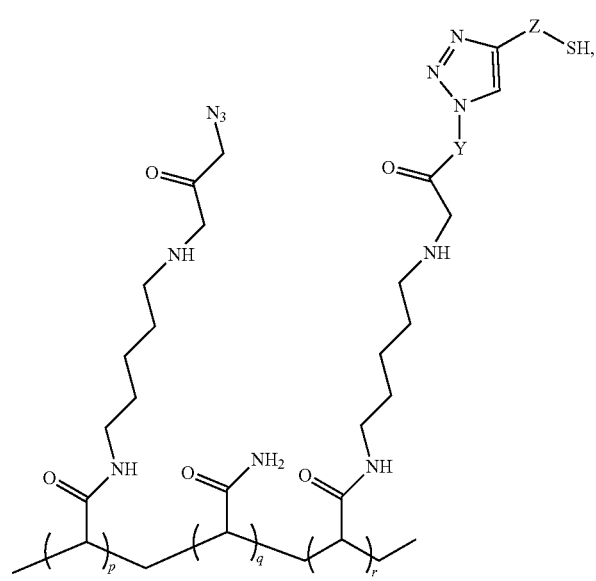
wherein Y is selected from $-C(H_2)-$, $-(C(H_2)-C(H_2)-O)_s$ wherein s is an integer from 1 to 10, and

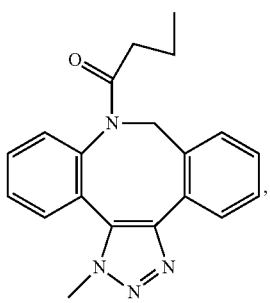 [SMILES: CCCC(=O)N1Cc2ccccc2-c2nnn(C)c2-c2ccccc21]

Z includes an alkane including one or more of —CH$_2$—, (—CH$_2$)$_m$, and (—CH$_2$—O—)$_n$, wherein m and n are independently an integer from 0 to 50, and p is an integer from 50 to 100,000, q is an integer from 5 to 10,000, and r is an integer from 5 to 10,000.

In some examples, a polymer includes a poly(alkenyltriazole-acrylamide-co-acrylamide) copolymer having a structure:

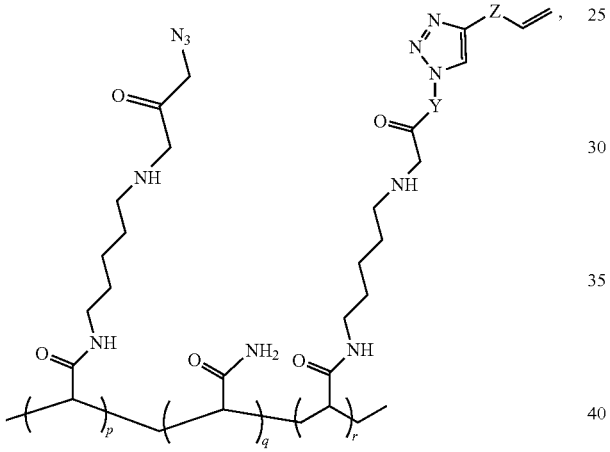

wherein Y is selected from —C(H$_2$)—, —(C(H$_2$)—C(H$_2$)—O)$_s$ wherein s is an integer from 1 to 10, and

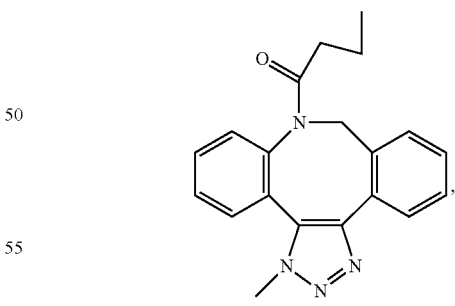

Z includes an alkane including one or more of —CH$_2$—, (—CH$_2$)$_m$, and (—CH$_2$—O—)$_n$, wherein m and n are independently an integer from 0 to 50, p is an integer from 50 to 100,000, q is an integer from 5 to 10,000, and r is an integer from 5 to 10,000.

In all of the examples included in this disclosure including Z including an alkane including one or more of —CH$_2$—, (—CH$_2$)$_m$, and (—CH$_2$—O—)$_n$, wherein m and n are independently an integer from 0 to 50, independently, m may be an integer from 0 to 50, such as 0, 1, 2, 3, 4, 5, 6, 7, 8, 9, 10, 11, 1, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In all of the examples included in this disclosure including Z including an alkane including one or more of —CH$_2$—, (—CH$_2$)$_m$, and (—CH$_2$—O—)$_n$, wherein m and n are independently an integer from 0 to 50, independently, n may be an integer from 0 to 50, such as 0, 1, 2, 3, 4, 5, 6, 7, 8, 9, 10, 11, 1, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. All of the foregoing examples of Z, independently, may include more than one of (—CH$_2$—)$_n$, (—CH$_2$—O—)$_n$, or both. For example, Z may include (—CH$_2$—O—)$_n$ between two (—CH$_2$—)$_n$, or (—CH$_2$—)$_n$ between two (—CH$_2$—O—)$_n$, or other combinations of one or more (—CH$_2$—)$_n$ and one or more (—CH$_2$—O—)$_n$. All permutations of the foregoing examples are contemplated and explicitly included in the present disclosure.

In some examples, a polymer includes a copolymer having the structure:

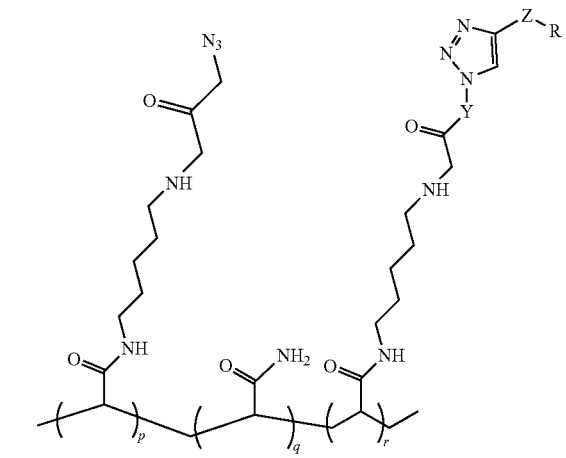

wherein Y is selected from —C(H$_2$)—, —(C(H$_2$)—C(H$_2$)—O)$_s$ wherein s is an integer from 1 to 10, and Z includes an alkane including one or more of —CH$_2$—, (—CH$_2$)$_m$, and (—CH$_2$—O—)$_n$, wherein m and n are independently an integer from 0 to 50, p is an integer from 50 to 100,000, q is an integer from 5 to 10,000, and r is an integer from 5 to 10,000, and R includes a moiety selected from an o-nitrobenzyl, a benzopyrone, or an alkene.

Such a polymer may be made in a method including the click chemistry reaction of an acrylamide-co-acrylamide with a functionalized alkyne (

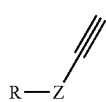

):

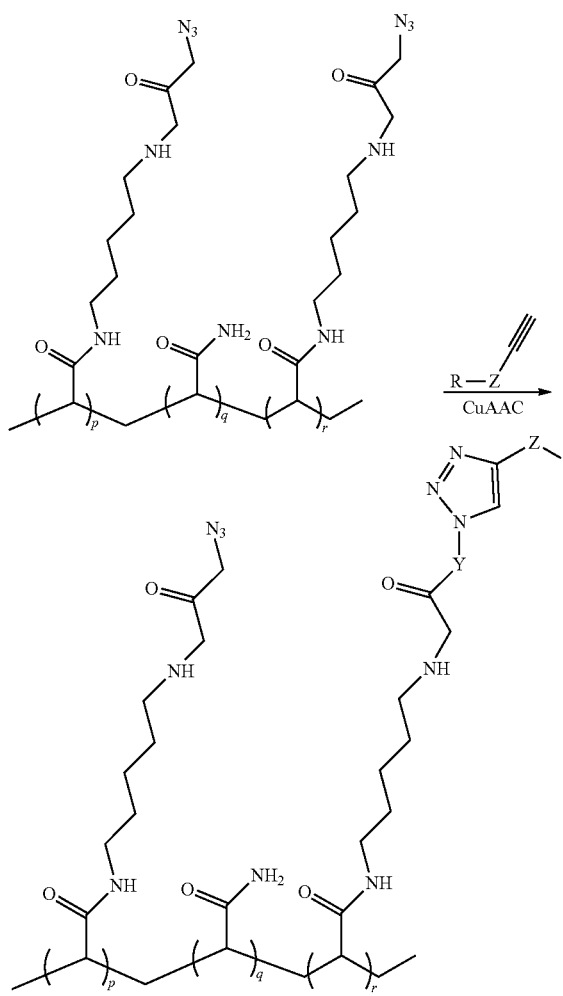

where

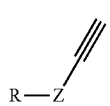

is selected from

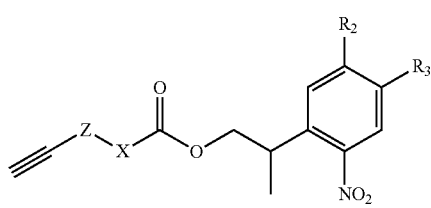

wherein $R_2$ and $R_3$ are each independently selected from —H and —O—$CH_3$, Z includes an alkane comprising one or more of —$CH_2$—, (—$CH_2$—)$_m$, and (—$CH_2$—O—)$_n$, wherein m and n are independently an integer from 0 to 50, and X is selected from —S and —N(H)—,

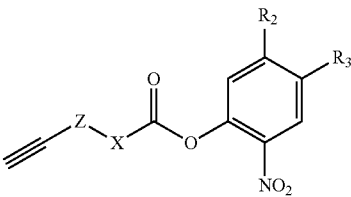

wherein $R_2$ and $R_3$ are each independently selected from —H and —O—$CH_3$, Z includes an alkane comprising one or more of —$CH_2$—, (—$CH_2$—)$_m$, and (—$CH_2$—O—)$_n$, wherein m and n are independently an integer from 0 to 50, and X is selected from —S and —N(H)—,

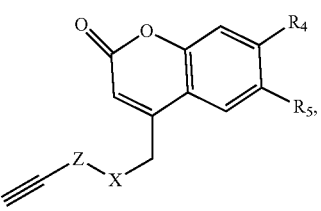

wherein $R_4$ is selected from —H, —O—$CH_3$, and —N—$(C_3)_2$, and $R_5$ selected rom —H an —Br, Z includes an alkane comprising one or more of —$CH_2$—, (—$CH_2$—)$_m$, and (—$CH_2$—O—)$_n$, wherein m and n are independently an integer from 0 to 50, and X is selected from —S and —N(H)—, and

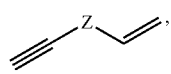

wherein Z includes an alkane including one or more of —$CH_2$—, (—$CH_2$—)$_m$, and (—$CH_2$—O—)$_n$, wherein m and n are independently an integer from 0 to 50.

The polymer on the left side of the above click chemistry reaction may be prepared using a radical-induced polymerization similar to that described elsewhere herein. Light may be used to convert the o-nitrobenzyl- or benzopyrone-masked triazole of the polymer to an active moiety, or couple an alkene to an oligonucleotide in the presence of a photoinitiator, in accordance with the present disclosure.

An alkyne may be added to an o-nitrobenzyl, benzopyrone, or alkene for attachment to an azide of a polymer backbone in accordance with aspects of the present disclosure. As a non-limiting example, an alkene (or, for example, alkyne terminated coumarin, or an alkene termined alkyne) may be added to an o-nitrobenzyl for attaching to a polymer backbone according to a reaction:

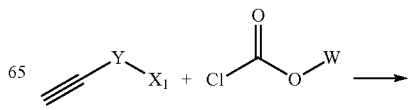

-continued

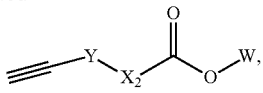

where Y is selected from —C(H₂)—, —(C(H₂)—C(H₂)—O)ₛ wherein s is an integer from 1 to 10, and

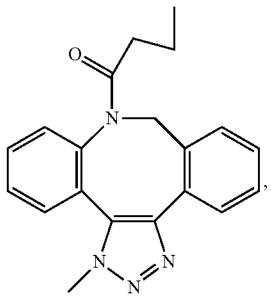 [SMILES: CCCC(=O)N1Cc2ccccc2-c2nnn(C)c2-c2ccccc21]

X₁ and X₂ are selected from —NH₂ and —N(H)—, respectively, or —SH and —S—, respectively, and W is selected from

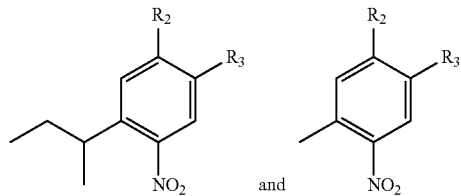

wherein R₂ and R₃ are each independently selected from —H and —O—CH₃. Non-limiting examples of

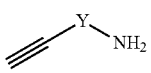

include, without limitation,

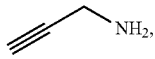

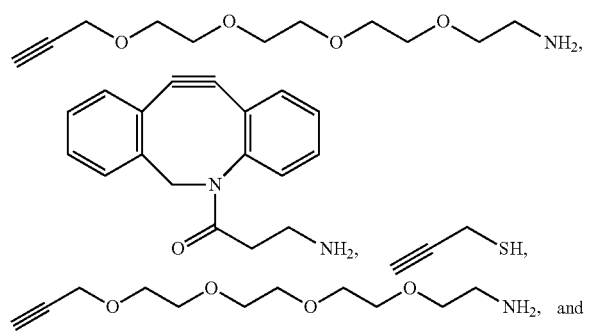

-continued

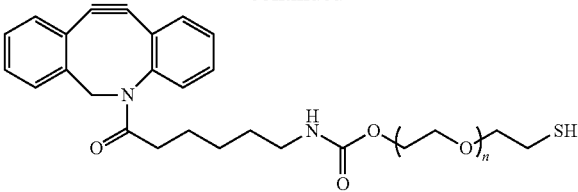

wherein n is an integer from 1 to 50.

In all of the examples included in this disclosure including Z including an alkane including one or more of —CH₂—, (—CH₂)ₘ, and (—CH₂—O—)ₙ, wherein m and n are independently an integer from 0 to 50, independently, m may be an integer from 0 to 50, such as 0, 1, 2, 3, 4, 5, 6, 7, 8, 9, 10, 11, 1, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In all of the examples included in this disclosure including Z including an alkane including one or more of —CH₂—, (—CH₂)ₘ, and (—CH₂—O—)ₙ, wherein m and n are independently an integer from 0 to 50, independently, n may be an integer from 0 to 50, such as 0, 1, 2, 3, 4, 5, 6, 7, 8, 9, 10, 11, 1, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. All of the foregoing examples of Z, independently, may include more than one of (—CH₂—)ₙ, (—CH₂—O—)ₙ, or both. For example, Z may include (—CH₂—O—)ₙ between two (—CH₂—)ₙ, or (—CH₂—)ₙ between two (—CH₂—O—)ₙ, or other combinations of one or more (—CH₂—)ₙ and one or more (—CH₂—O—)ₙ. All permutations of the foregoing examples are contemplated and explicitly included in the present disclosure.

In some examples, a polymer includes a polymer network having a first oligonucleotide or a second oligonucleotide. First oligonucleotides may correspond to oligonucleotides 231 described with reference to FIG. 2A, and second oligonucleotides may correspond to oligonucleotides 232 described with reference to FIG. 2A. First oligonucleotides may include excision moieties, while second oligonucleotides. A polymer network may be polymerized on a substrate as disclosed herein by a light-induced reaction:

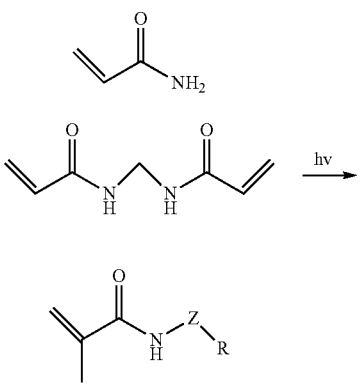

in the presence of a photoinitiator, wherein Z includes an alkane including one or more of —CH₂—, (—CH₂)ₘ, and (—CH₂—O—)ₙ, wherein m and n are independently an integer from 0 to 50. A method may include selectively irradiating first co-monomers with light in the presence of a photoinitiator, wherein one or more of the first co-monomers includes first nucleotides, while not irradiating second co-monomers wherein one or more of the second co-monomers includes second nucleotides, to polymerize the first co-monomers forming a one or more first region of the polymer; and irradiating the second co-monomers in the presence of the photoinitiator to polymerize the second co-monomers forming a one or more second region of the polymer.

A the photoinitiator may be selected from one or more of phenyl bis(2,4,6-trimethylbenzoyl) phosphine oxide, 2-hydroxy-2-methyl-1-phenyl-propan-1-one, 2-hydroxy-4'-(2-hydroxyethoxy)-2-methylpropiophenone, 2,2'-azobis[2-methyl-n-(2-hydroxyethyl) propionamide], 2,2-dimethoxy-2-phenylacetophenone, diphenyl(2,4,6-trimethylbenzoyl) phosphine oxide, lithium phenyl(2,4,6-trimethylbenzoyl) phosphinate, and ethyl (2,4,6-trimethylbenzoyl) phenylphosphonate.

A polymer network may be of different structures. As a non-limiting example, a polymer network may include a structure:

"exclusion amplification," or ExAmp. Exclusion amplification methods may allow for the amplification of a single target polynucleotide per substrate region and the production of a substantially monoclonal population of amplicons in a substrate region. For example, the rate of amplification of the first captured target polynucleotide within a substrate region may be more rapid relative to much slower rates of transport and capture of target polynucleotides at the substrate region. As such, the first target polynucleotide captured in a substrate region may be amplified rapidly and fill the entire substrate region, thus inhibiting the capture of additional target polynucleotide(s) in the same substrate region. Alternatively, if a second target polynucleotide attaches to same substrate region after the first polynucleotide, the relatively rapid amplification of the first target polynucleotide may fill enough of the substrate region to result in a signal that is sufficiently strong to perform sequencing by synthesis (e.g., the substrate region may be at least functionally monoclonal). The use of exclusion ampli-

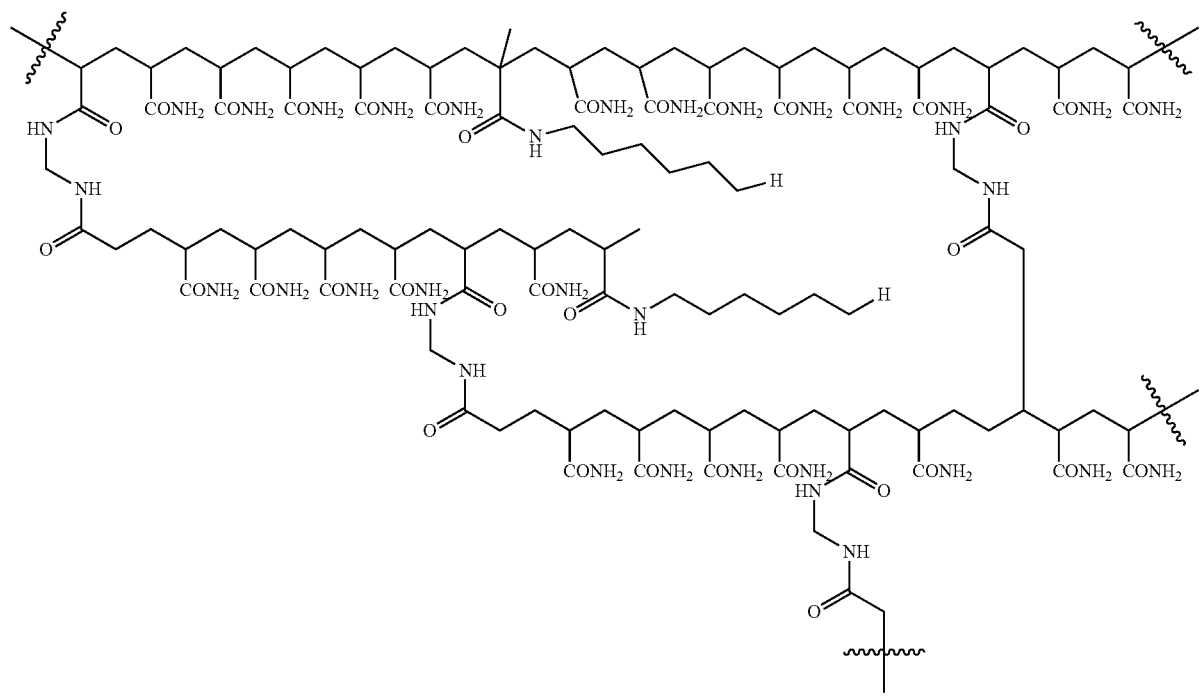 [SMILES: *CC(=O)NCNC(=O)C1CC(C(N)=O)CCC(C(CC(*)C(N)=O)C(N)=O)CC(=O)NCNC(=O)C(CC(CC(*)C(N)=O)C(N)=O)CC(C(N)=O)CC(C(N)=O)CC(C(N)=O)CC(C(N)=O)CC(C(N)=O)CC(C(N)=O)CC(C)(C(=O)NCCCCCC)CC(C(N)=O)CC(C(N)=O)CC(C(N)=O)CC(C(N)=O)CC(C(N)=O)CC(*)C(=O)NCNC(=O)CCC(C(N)=O)CC(C(N)=O)CC(C(N)=O)CC(C(N)=O)CC(CC(CC(C)C(=O)NCCCCCC)C(N)=O)C(=O)NCNC(=O)CCC(C(N)=O)CC(C(N)=O)CC(C(N)=O)CC(C(N)=O)C1]

It will be appreciated that many different polymers, having many different types of light activatable moieties and other moieties, may be envisioned based on the teachings herein. Any of the present polymers may be block co-polymers, may be randomly distributed co-polymers, or any suitable combination of the two. Additionally, it will be appreciated that any suitable reactive group, including but not limited to alkyne, may be coupled to the moiety or inactive moiety so as to couple the moiety or inactive moiety to the polymer.

It will be appreciated that the present polymers, compositions, and methods may be used in any suitable application, such as amplifying a template polynucleotide. For example, although the present compositions may be used to perform "bridge amplification" or "surface-bound polymerase chain reaction," it will be appreciated that the present compositions readily may be adapted for use with other amplification modalities. One such amplification modality is fication may also result in super-Poisson distributions of monoclonal substrate regions; that is, the fraction of substrate regions in an array that are functionally monoclonal may exceed the fraction predicted by the Poisson distribution.

Increasing super-Poisson distributions of useful clusters is useful because more functionally monoclonal substrate regions may result in higher quality signal, and thus improved SBS; however, the seeding of target polynucleotides into substrate regions may follow a spatial Poisson distribution, where the trade-off for increasing the number of occupied substrate regions is increasing the number of polyclonal substrate regions. One method of obtaining higher super-Poisson distributions is to have seeding occur quickly, followed by a delay among the seeded target polynucleotide. The delay, termed "kinetic delay" because it is thought to arise through the biochemical reaction kinetics, gives one seeded target polynucleotide an earlier start over the other seeded targets. Exclusion amplification works by using recombinase to facilitate the invasion of primers (e.g., primers attached to a substrate region) into double-stranded DNA (e.g., a target polynucleotide) when the recombinase mediates a sequence match. The present compositions and methods may be adapted for use with recombinase to facilitate the invasion of the present capture primers and orthogonal capture primers into the present target polynucleotides when the recombinase mediates a sequence match. Indeed, the present compositions and methods may be adapted for use with any surface-based polynucleotide amplification methods such as thermal PCR, chemically denatured PCR, and enzymatically mediated methods (which may also be referred to as recombinase polymerase amplification (RPA) or ExAmp).

Methods of grafting active moieties to substrates

Figure 6:
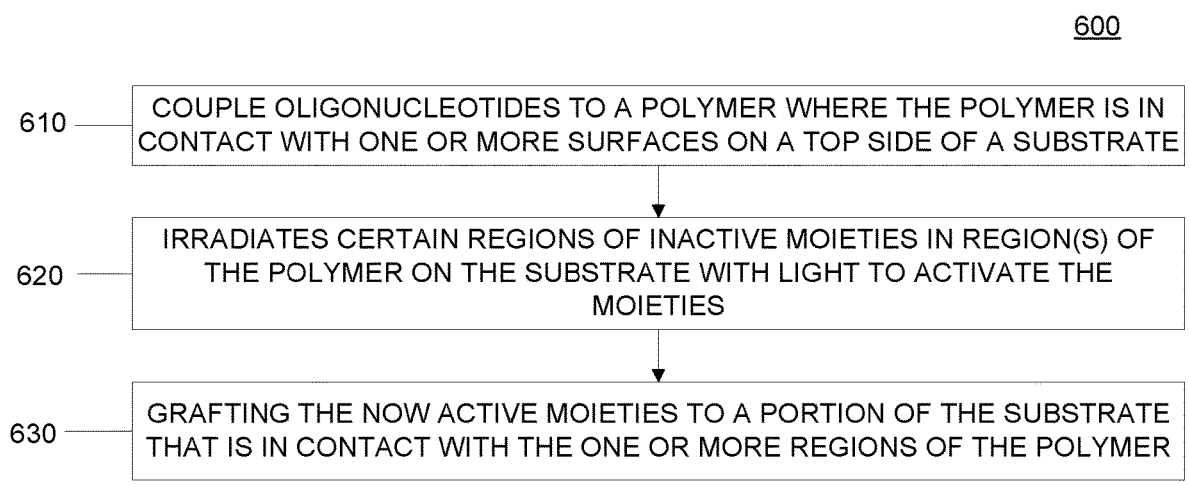
FIG. 6 is a workflow that illustrates, generally, irradiating certain regions of a polymer, where the polymer is in contact with at least one surface on a frontside of a substrate.

As discussed herein, in some examples herein, oligonucleotides are coupled to a polymer, at least in part, by irradiating inactive moieties in a region of the polymer with light while not irradiating certain other inactive moieties outside of this region with light. During this process, in the region that is irradiated, the moieties will become active. Although a single region is used as an example, one or more regions can be irradiated while certain other one or more regions are not irradiated, thus producing active moieties in the one or more irradiated regions. In some examples, the polymer contacts at least one surface on a frontside of a substrate so the regions in which moieties are either active or not active, based on whether they were irradiated, are parts of this polymer in contact with portions of the frontside of the substrate. The substrate may or may not include nanowells. FIG. 6 is a workflow 600 that illustrates, generally, irradiating certain regions of a polymer, where the polymer is in contact with at least one surface on a frontside of a substrate. FIGS. 7-13 depict certain more specific but non-exclusive examples to illustrate different types of substrates that can be utilized with the method of FIG. 6. As will be illustrated in FIG. 6, the irradiation process as well as the placement of certain regions may or may not vary based upon various characteristics of the substrate, including but not limited to, the shape of the substrate and/or material characteristics of the substrate. Aspects of the method illustrated in FIG. 6 can be utilized to selectively photoactivate moieties in regions of a polymer in contact with a substrate in substrates that includes one or more nanowells, including when the nanowells includes wells of varied depths. Thus, FIGS. 7-11B illustrate aspects of this method as applied to examples of substrates with nanowells of a uniform depth, while FIGS. 12-13 illustrate aspects of this method as applied to examples of substrates with multi-depth nanowells.

Referring to FIG. 6, in some embodiments of the present invention, the workflow 600 includes coupling oligonucleotides to a polymer where the polymer is in contact with one or more surfaces on a frontside of a substrate (610). As will be discussed in greater detail in FIGS. 7-13, the materials that comprise the substrate can vary and the techniques utilized to irradiate various regions of the polymer, to generate active moieties in those regions, while not generating active moieties in other regions. As noted above, in some examples, these one or more surfaces are surfaces of nanowells. For example, the substrate may or may not be comprised of one or more of transparent materials with ultraviolet (UV) light transparency properties (e.g., fused silica, glass, etc.), materials that block UV radiation (e.g., one or more metal, metal oxide (e.g., titanium dioxide (TiO2), zinc oxide (ZnO), etc.), boron nitride (BN), etc.), and/or materials to which one can adhere poly(N-(10-azidoacetamidylpentyl)acrylamide-co-acrylamide) (PAZAM). As illustrated herein, some substrates utilized in the workflow 600 of FIG. 6 may or may not include a waveguide (e.g., titanium oxide (TaOx)).

Returning to FIG. 6, in some examples, the workflow 600 includes irradiating certain regions of inactive moieties in one or more regions of the polymer on the substrate with light to activate the moieties in the one or more regions of the polymer (620). For example, the polymer on the top surface of the substrate can include at least two distinct regions. This irradiating can include irradiating one or more of these regions such that the irradiated one or more regions of the polymer, upon being irradiated, the light generates active moieties in the irradiated one or more regions. In some examples, because certain regions of the polymer are not irradiated, active moieties are not generated in these regions of the polymer. To irradiate select regions of the polymer, and thus, to selectively generate-active moieties in the regions of the polymer that are irradiated, the light source to which the irradiated regions are exposed can be in varied locations relative to the substrate. For example, the light source can be positioned to irradiate the frontside surface(s) directly or indirectly from a location above this surface. Alternatively, and/or additionally, the light source can be positioned to irradiate the frontside surface(s) through a portion of the substrate, i.e., from a location below a bottom side of the substrate (also referred to as a backside of the substrate). In some examples, alternatively or additionally, a waveguide in the substrate can be utilized to guide the light from a location exterior to the substrate to a desired one or more regions. Additionally, as illustrated in FIGS. 7-13, the irradiating portion (620) of the workflow 600, may or may not vary based on the structure of the substrate with which the polymer is in contact. In at least some of the illustrated examples, UV radiation is utilized to irradiate the one or more regions of the polymer to generate the active moieties.

Returning to FIG. 6, based on being activated, the now-active moieties in the one or more regions of the polymer are grafted to a portion of the substrate that is in contact with the one or more regions of the polymer (630). As will be illustrated to FIGS. 7 and 9-13, the light is utilized to selectively graft both a substrate with single depth and/or a substrate with multi-depth nanowells, with light activated molecules.

Figure 7:
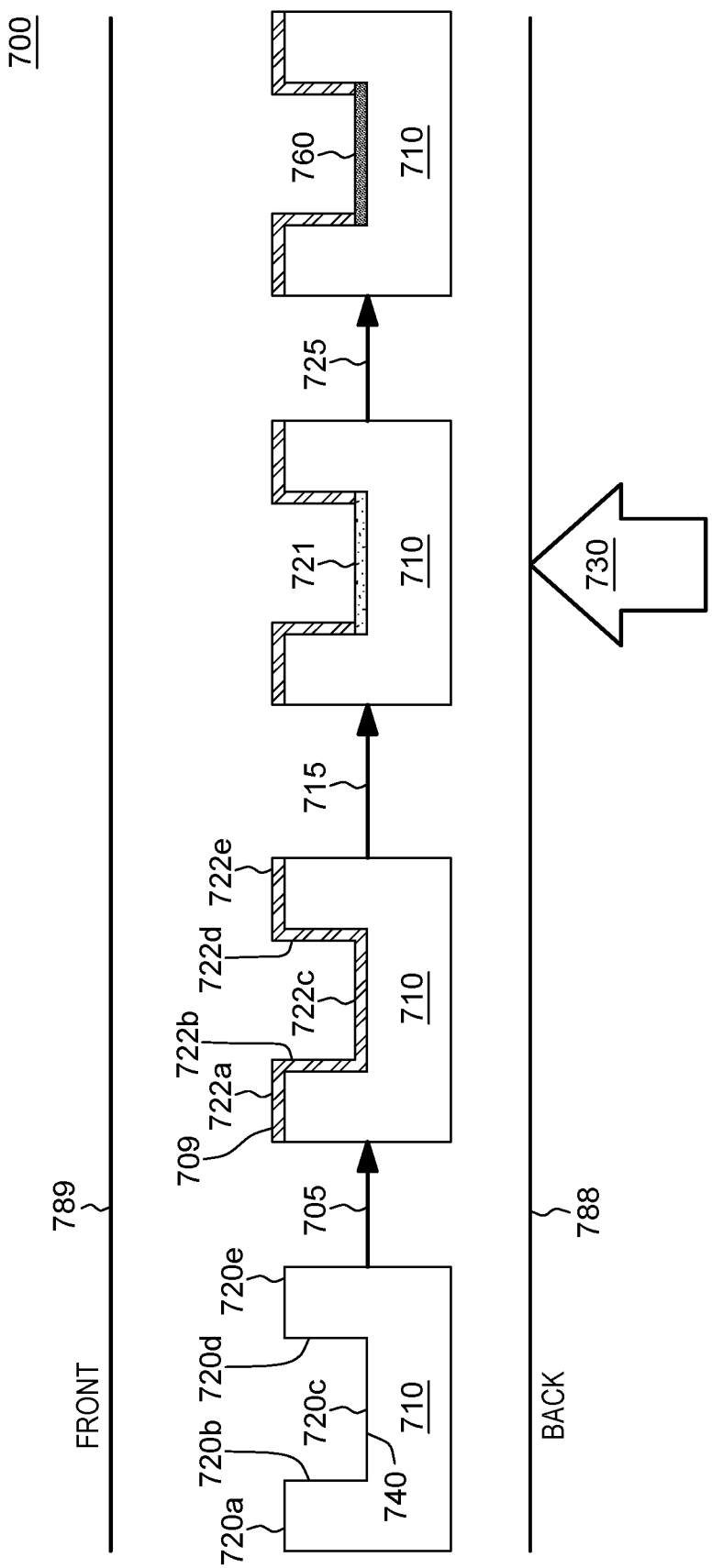
FIG. 7 illustrates an example that includes a workflow illustrating selective photoactivation of polymer regions on a substrate that includes a UV radiation-absorbing nanowell pattern.
Figure 8:
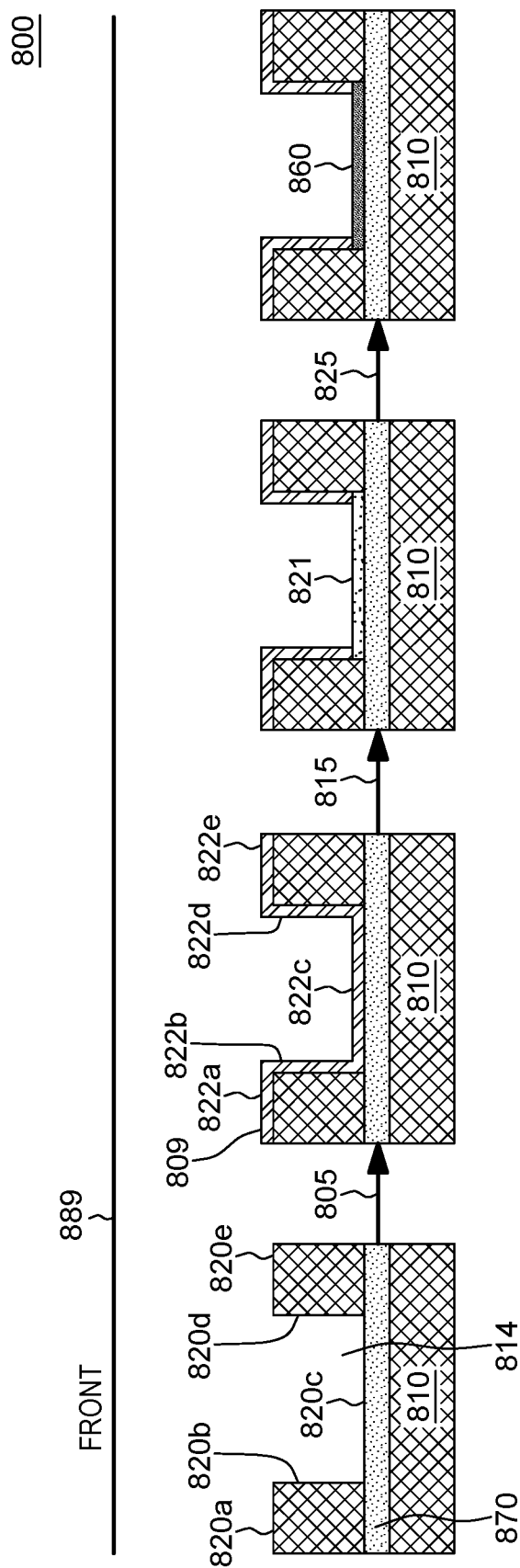
FIG. 8 depicts an example of selective photoactivation of polymer regions on a substrate using a waveguide.
Figure 9:
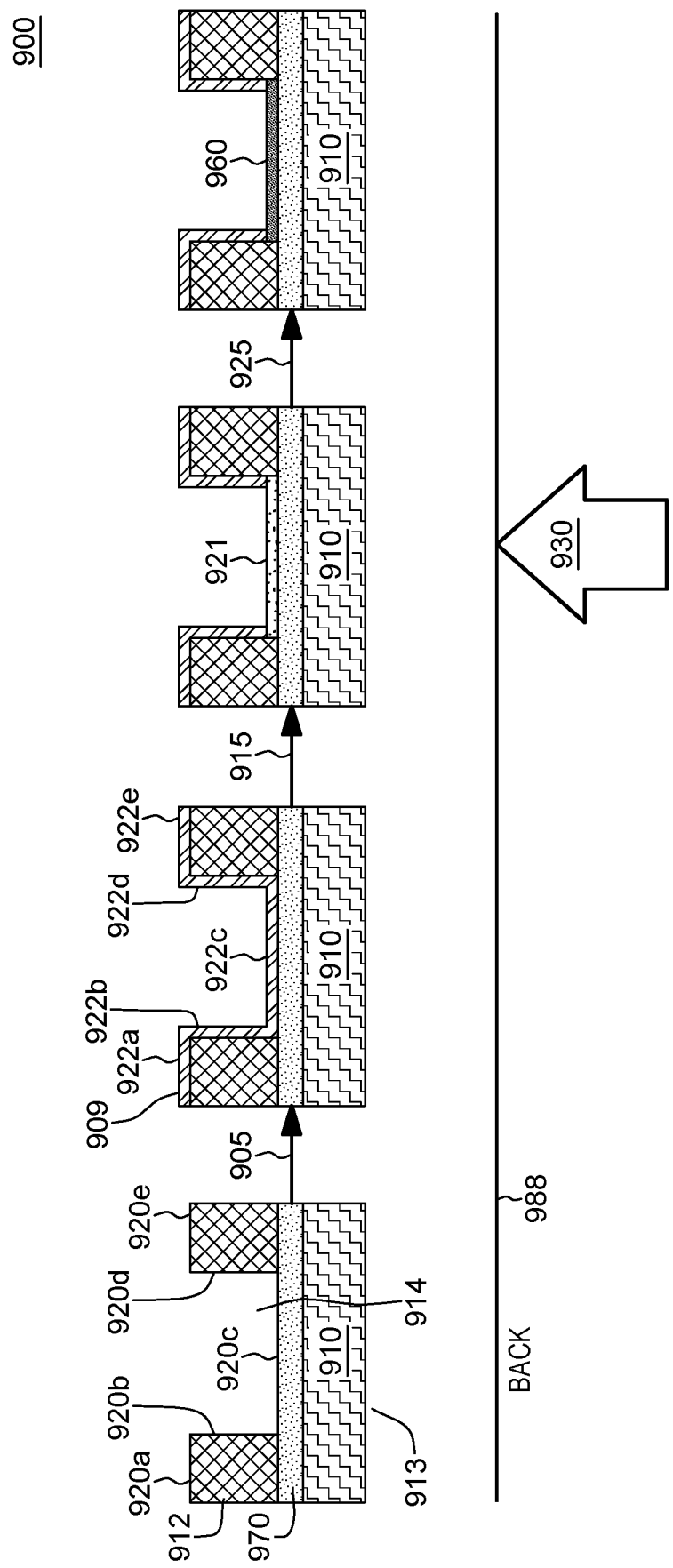
FIG. 9 depicts an example of selective photoactivation of polymer regions on a substrate using a waveguide.
Figure 10:
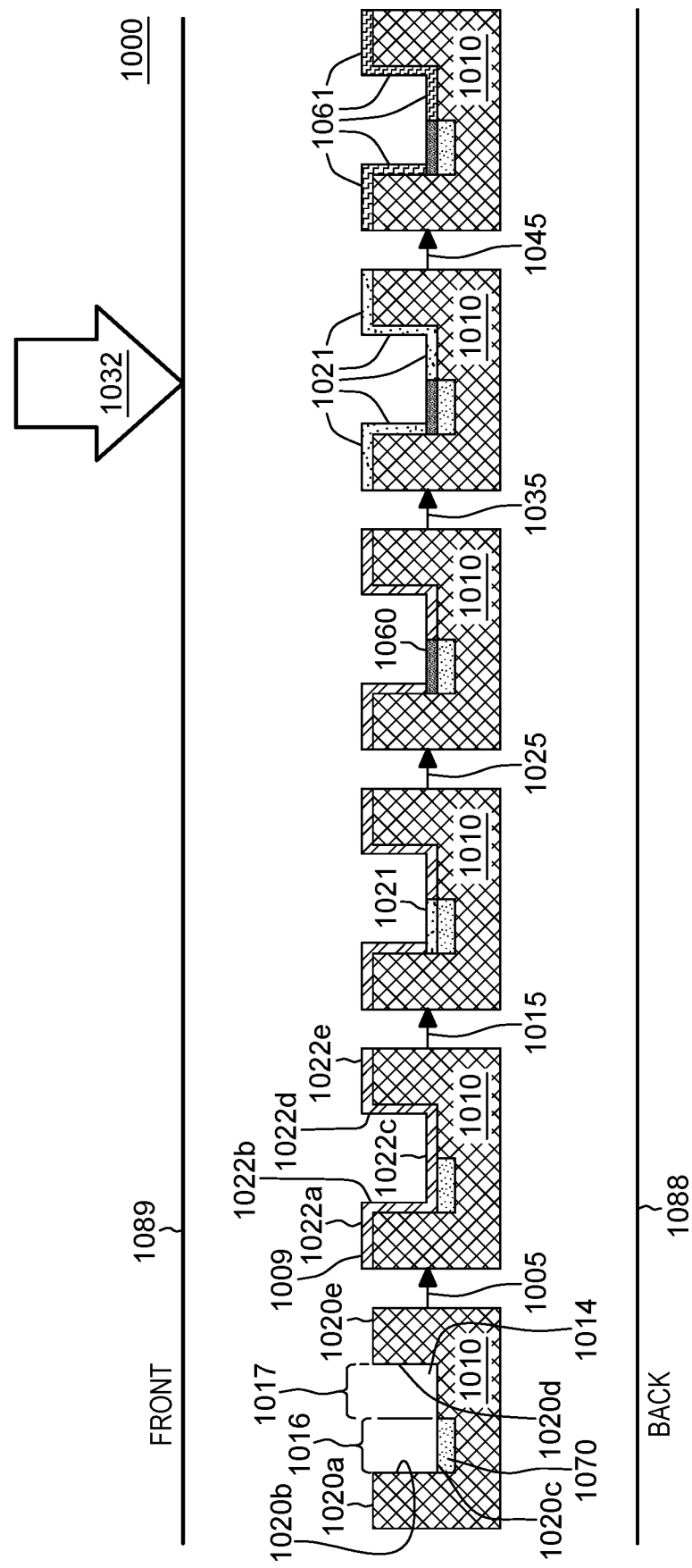
FIG. 10 illustrates a workflow performed on a substrate with nanowells of a uniform depths, where molecules in different regions of a polymer that is in contact with the substrate are activated individually.
Figure 11A:
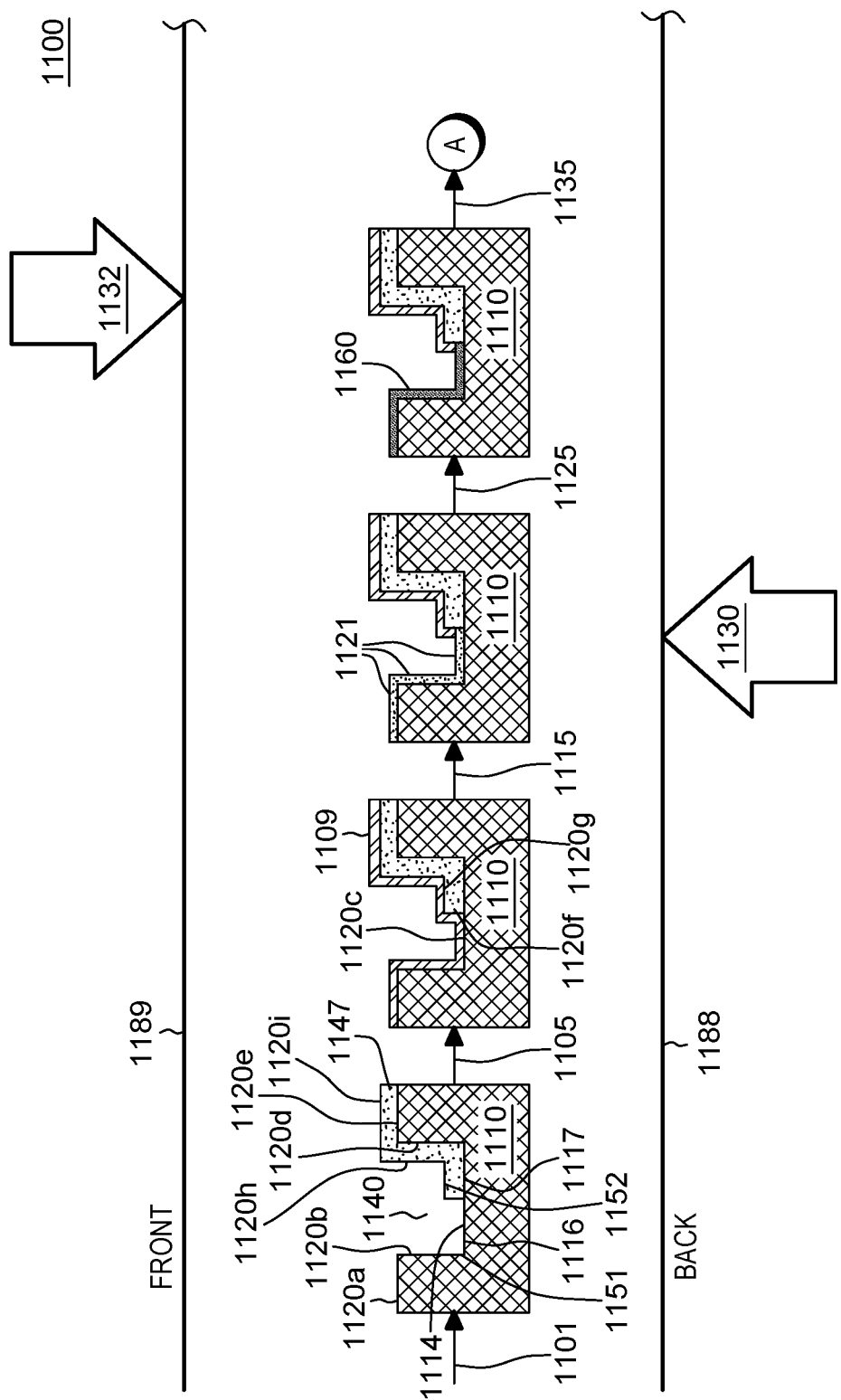
FIGS. 11A-11B illustrate a workflow performed on a substrate with nanowells of a uniform depths, where molecules in different regions of a polymer that is in contact with the substrate are activated individually.
Figure 11B:
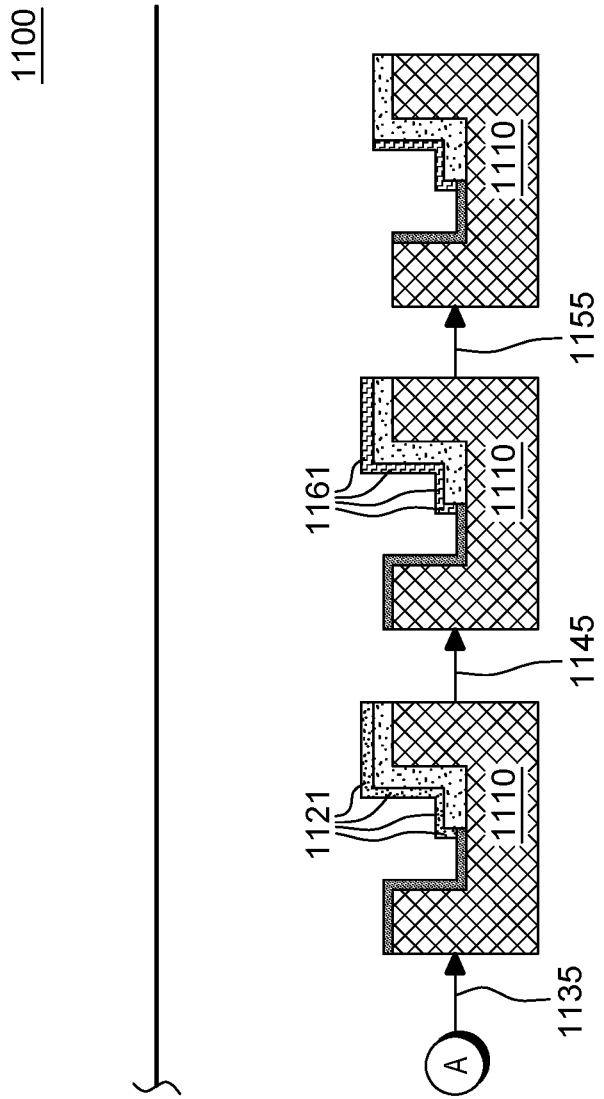
Figure 12:
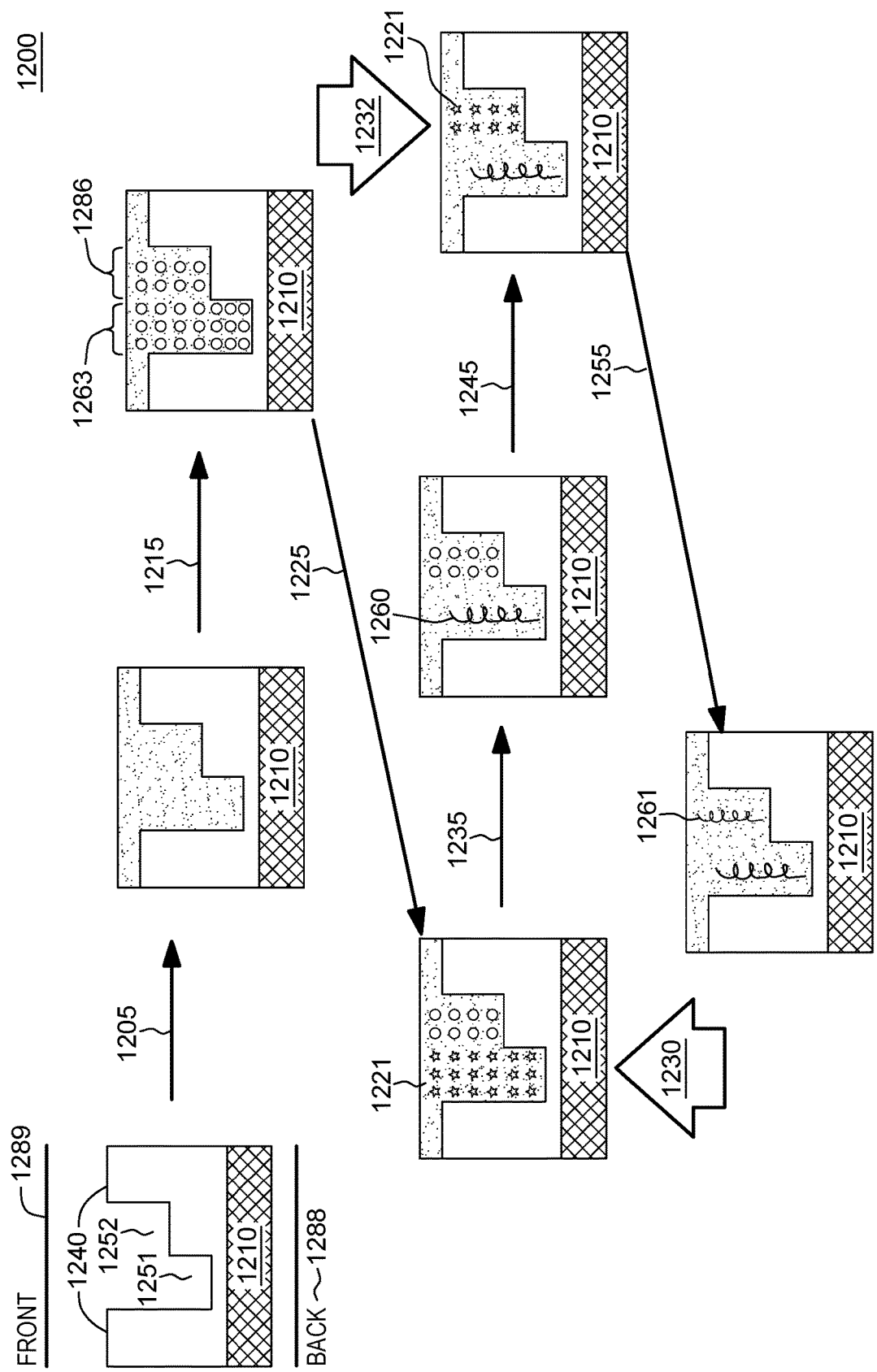
FIG. 12 illustrates a workflow performed on a substrate with multi-depth wells and includes both backside and frontside exposure of the substrate to light.

Although FIGS. 7-11B are all examples of aspect of the method described herein as applied to a substate with one or more nanowells of a uniform depth, FIGS. 7-9 are examples in which all or nearly all of a surface at a bottom of a nanowell is irradiated to active moieties in the polymer coating all or nearly all of the surface, while in FIGS. 10-11B, a first portion of this surface is coated with a polymer with a first type of light-activated molecule, while a second portion of this surface is coated with a polymer with a second type of light-activated molecule. As a result, in FIGS. 10-11B, the resultant substrate includes nanowells that are grafted with different kinds of light-activated molecules.

FIG. 7 illustrates an example that includes a workflow 700 illustrating selective photoactivation of polymer regions 709 on a substrate 710 that includes a UV radiation-absorbing nanowell pattern. In this example, the substrate 710 is subjected to light via a backside 788 exposure and the substrate comprises 710 one or more nanowells of a uniform or mostly uniform depth. Referring to FIG. 7, a workflow 700 is provided that includes illustrates of a substrate 710 throughout various stages in the workflow 700. In this example, the substrate 710 is a nanowell. As illustrated in FIG. 7, a polymer (to which oligonucleotides have been coupled) 709 is used to coat part of the substrate 710 so that portions of the polymer 709 are in contact with one or more surfaces 720a-720e on a frontside 789 of a substrate 710 (705). The backside 788 of the substrate 710 is exposed to light 730 to generate active moieties on certain of the surfaces (e.g., surface 720c) (715). In this example, the substrate 710 is comprised of a material with UV radiation transparency (e.g., fused silica, glass, etc.), so that irradiating the substrate with light 730 from a light source (not depicted) positioned at the backside 788 of the substrate (i.e., providing a backside 788 exposure to the substrate), generates active moieties 721 in the region of the polymer 722c on a surface 720c subject to a higher exposure and does not generate active moieties in the regions of the polymer 722a-722b, 722d-722e in contact with surfaces with lower exposure 720a-720b, 720d-720e to the light source.

As illustrated in FIG. 7, the polymer 722c in contact with surface 720c at the bottom of the well 740 of the nanowell would experience a higher level of exposure (e.g., a higher dose of UV radiation) than the other polymer-coated surfaces 722a-722b, 722d-722e, based on the exposure being more direct and through a thinner portion 750 of the substrate 710. In a non-limiting example, provided for illustrative purposes only, a nanoimprint lithography (NIL) polymer approximately 1000 nm thick layer absorbs ~30% of radiation (i.e., wavelength=365 nm). In some examples, this approximate thickness prevents the formation of active moieties. In other examples, thicknesses of greater than approximately 1000 nm prevent the formation of active moieties, while, in some examples, thicknesses less than this approximate thickness enable active moieties to be formed. The polymer 722b, 722d in contact with certain of the surfaces 720b, 720d, those along the sidewalls of the nanowell, are not directly irradiated by the light source. Portion of the polymer 722a, 722e in contact with certain of the top surfaces atop the walls of the nanowell 720a, 720e, are not sufficiently irradiated by the light source to generate active moieties in these portions 722a, 722e because the substrate is thicker between the light source and these surfaces 720a, 720e, so the dose of UV radiation that reaches these surfaces 720a, 720e is smaller and hence, insufficient to generate active moieties in the polymer coat 722a, 722e on these surfaces 720a, 720e. Upon being activated, the activated moieties are grafted 760 to the substrate 710 (725).

Referring now to FIG. 8, as discussed above, in some examples, one or more regions of the polymer can be activated utilizing a waveguide 870 that is patterned on (e.g., utilizing lithography) or otherwise integrated into the substrate 810. To that end, FIG. 8, like FIG. 7, is a workflow 800 with illustrations, but FIG. 8 depicts an example of selective photoactivation of polymer regions on a substrate using a waveguide 870. Like in FIG. 7, and the substrate 810 of FIG. 8 comprises one or more nanowells of a uniform or mostly uniform depth. In this example, the substrate 810 in FIG. 8 is comprised of material that blocks UV radiation (e.g., one or more metal, metal oxide (e.g., TiO2, ZnO, BN, etc.), etc.). As will be illustrated in FIG. 9, selective photoactivation of polymer regions on a substrate using a waveguide can be accomplished utilizing substrates that both block UV radiation and are transparent to it, but FIG. 8 illustrates the generation of active moieties in polymer regions of a substrate that is not transparent to UV radiation, for illustrative purposes. As a contrasting example, FIG. 9, which will also be discussed herein, depicts a substrate that is partially transparent to UV radiation.

As illustrated in FIG. 8, one or more surfaces 820a-820e on a frontside 889 of a substrate 810 are coated with a polymer (to which oligonucleotides have been coupled) 809 so that the polymer 809 is in contact with the one or more surfaces 820a-820e (805). As aforementioned, the substrate 810 in FIG. 8 is comprised of material that at least partially blocks UV radiation (e.g., TiO2, ZnO, etc.), etc.). A surface 820c at the bottom of the nanowell 814 in the substrate 810 is coated by the polymer 809. Thus, a region 822c of the polymer 809 is proximate to a waveguide 870, which was patterned (e.g., utilizing lithography) or otherwise integrated into the substrate 810. The waveguide 870 is exposed to a light source (not pictured) such that the waveguide 870 can conduct the light and expose the region 822c of the polymer 809 to radiation to generate active moieties 821 in the region 822c of the polymer 809 in contact with the waveguide 870 (815). Molecule in other regions of the polymer 822a-822b, 822d-822e, which are in contact with certain of the other surfaces 820a-820b, 820d-820e of the substrate, are not activated because the waveguide 870 is not directly or indirectly in contact with these regions 822a-822b, 822d-822e and radiation from the waveguide 870 is blocked by the material comprising the substrate 810. As with the example in FIG. 7, the activated moieties are grafted 860 to the substrate 810 (825).

Referring to FIG. 9, another illustrated workflow 900, like in FIG. 8, the substrate 910 includes a waveguide 970, but in contrast to FIG. 8, the substrate 910 is partially transparent to UV radiation (e.g., comprised of fused silica, glass, etc.). As was the case with the substates 710, 810 of FIGS. 7-8, the substrate 910 of FIG. 9 also comprises nanowells of a uniform or mostly uniform depth. Additionally, this substrate 910 includes a region that blocks and/or substantially blocks UV radiation 912 and a portion that is transparent and/or predominantly transparent to UV radiation 913. A surface 920c coated by the polymer 909 at the bottom of the nanowell 914 in the substrate 910, is proximate to a waveguide 970, which was patterned (e.g., utilizing lithography) or otherwise integrated into the substrate 910. In some examples, the polymer coating is in contact with the waveguide 970.

In the workflow 900 illustrated in FIG. 9, one or more surfaces 920a-920e on a frontside of a substrate 910 are coated with a polymer (to which oligonucleotides have been coupled) 909 such that the polymer 909 is in contact with the one or more surfaces 920a-920e (905). The waveguide 970 is exposed to a light source (not pictured) such that the waveguide can conduct the light and expose a region of polymer 922c in contact with a proximate surface 920c to radiation to generate active moieties 921 in the region of the polymer 922c (915). Because a portion of the substrate 910 is comprised of material that is transparent and/or predominantly transparent to UV radiation 913, in this example, the waveguide can be exposed to a light source and it will guide the light 930 to activate moieties from a source at the backside 988 of the substrate 910. However, the portion of the substrate that blocks or substantially blocks UV radiation 912, prevents the waveguide 970 from activating moieties polymer regions 922a-922b, 922d-922e in contact with the remaining coated surfaces 920a-920b, 920d-920e. The activated moieties are grafted 960 to the substrate 910 (925).

FIG. 10 and FIGS. 11A-11B illustrate workflows 1000, 1100 performed on substrates 1010, 1110 with nanowells of a uniform depths, but where molecules in different regions of a polymer that is in contact with the substrate 1010, 1110 are activated individually. To illustrate this aspect, in FIG. 10 and FIGS. 11A-11B, the bottoms 1014, 1114 of these nanowells 1010, 1110 include distinct regions (e.g., a first region 1016, 1116, and a second region 1017, 1117). Thus, different chemistry can be patterned in different areas of the nanowell, such as in these regions, with this process, without alignment. The term "alignment," as utilized herein, refers to a process by which a substrate is irradiated with UV in a geometrically defined pattern. For example, a geometrically defined pattern is present on a photomask (e.g., an external hardware). When utilizing an alignment process, the photomask is physically aligned with the features on the substrate within a specified tolerance. The example in FIGS. 11A-11B avoids this alignment process because the substrate 1110 has a photomask built into it and therefore does not require alignment. In FIGS. 11A-11B, the shallow well portion 1152 (i.e., a portion with an opaque material patterned on the surface) acts as a photomask. The example in FIG. 10 also avoids the alignment process because the substrate 1010 is opaque and has a waveguide 1070 (i.e., a light conduit) built into it. Hence, in FIG. 10, a geometrical pattern is defined by the waveguide 1070 so no external photomask is utilized and hence, alignment does not occur.

The separately activated regions on a given substrate can be grafted with the same or with different light-activated molecules. In some examples, the first region 1016, 1116 of the bottom of the nanowell 1014, 1114 and the second region 1017, 1117 of the bottom of the nanowell 1014, 1114 each constitute half of the full surface at the bottom of the nanowell 1014, 1114. In these examples, the moieties of the polymer coating the first region 1016, 1116 and the second region 1017, 1117 are each irradiated by a different light source. The sources, can include, but are not limited to, a backside light source (relative to the substrate), a frontside light source (relative to the substrate), and/or a waveguide patterned on or otherwise embedded in the substrate.

In FIG. 10, the light sources utilized to activate moieties of a polymer on different portions of the substrate include a waveguide 1070 and light 1032 from a light source (not pictured) from a direction of a frontside 1089 of the substrate 1010. As in FIG. 8, the substrate 1010 of FIG. 10 includes a waveguide 1070 that is patterned on (e.g., utilizing lithography) or otherwise integrated into the substrate 1010. But in this example, the waveguide 1070 is only patterned or otherwise integrated into a first region 1016 of the bottom of the well 1014 of the nanowell in the substrate 1010. Molecules in polymers in contact with the second region 1017 of the bottom of the nanowell 1014 are not activated by this waveguide 1070. The waveguide 1070 is not in direct or indirect contact with other regions of the polymer 1009 sufficient to activate molecules in these regions because the substrate 1010 in FIG. 10 is comprised of material that blocks UV radiation (e.g., one or more metal, metal oxide (e.g., TiO2, ZnO, BN, etc.), etc.).

In this workflow 1000, one or more surfaces 1020a-1020e on a frontside of a substrate 1010 are coated with a polymer (to which oligonucleotides have been coupled) 1009 such that the polymer 1009 is in contact with the one or more surfaces 1020a-1020e (1005). The waveguide 1070 is exposed to light such that the waveguide exposes a proximate region of polymer 1022c in contact with a portion of the surface 1020c, i.e., a first region 1016 of the bottom of the nanowell 1014, to radiation to generate active moieties 1021 in the portion of the polymer 1022c in contact with the first region 1016 of the bottom of the nanowell 1014 (1015). The activated moieties in this portion of the polymer 1022c in contact with the first region 1016 are grafted 1060 to the substrate 1010 (1025). After this initial portion of the polymer 1022c has been grafted 1060 in the first region 1016, the portions of the polymer 1022a-1022e in which the molecules have not been activated and are in contact with one or more surfaces 1020a-1020e on a frontside of the substrate 1010 are exposed, via a frontside 1089 exposure (a backside 1088 exposure would be ineffective because of the material comprising the substrate) to light (e.g., UV radiation) (1035). Active moieties 1021 are generated in these portions of the polymer 1022a-1022e which were not previously activated and grafted. The frontside 1089' exposure activates the moieties in not-yet-activated regions of the polymer and grafts the substrate 1010 with the newly light-activated molecules 1061, creating a second grafted surface 1061 (1045). The second grafted surface 1061 forms on the substrate 1010. Polishing the substrate removes the second grafted surface 1061 from surfaces atop the nanowell 1020a, 1020e (not pictured).

While FIG. 10 includes a waveguide 1070 in part of the nanowell to activate moieties in some regions of a polymer without activating moieties in other regions of the polymer (the polymer 1009 is which is in contact with various surfaces of a substrate 1020a-1020e), the workflow 1100 illustrated in FIG. 11 includes patterning a substrate with metal oxide (e.g., TiO2, ZnO, BN, etc.), which is opaque to UV radiation.

In FIGS. 11A-11B, the light sources utilized to activate moieties of a polymer on different portions of the substrate include light 1130 from a light source (not pictured) from a direction of a backside 1188 of the substrate 1110 and light 1132 from a light source (not pictured) from a direction of a frontside 1189 of the substrate 1110. As such, FIGS. 11A-11B illustrates a workflow 1100 in which a first region 1116 of the bottom of the well 1114 of the nanowell in the substrate 1110 and a second region 1117 of the bottom of the nanowell 1114 include regions of moieties that are separately photoactivated. In contrast to the substrate 1010 in FIG. 10, in this example, the substrate 1110 is formed from one or more of transparent materials with UV radiation transparency properties (e.g., fused silica, glass, etc.). Also, in FIGS. 11A-11B, the second region 1117 of the bottom of the nanowell 1114, as well as an adjacent nanowell wall surface 1120d, and the surface adjacent to this wall surface at the top of the wall 1120e (parallel to the bottom of the nanowell 1114), are all patterned with a material that is opaque to UV radiation (1101). This material may or may not be transparent to visible light. In some examples, the material is metal oxide (e.g., TiO2, ZnO, BN, etc.). Once the material that is opaque to UV radiation is patterned (e.g., using photolithography) on certain surface of the substrate 1117, 1120d, 1120e, the well 1140 includes a shallow well portion 1152 (i.e., a portion with an opaque material patterned on the surface) and a deep well portion 1151. By patterning the opaque material (1105), forming an opaque material layer 1147, the substrate 1110 now includes at least one multi-depth nanowell. Thus, an additional two surfaces, a new vertical surface 1120f, and a new horizontal surface 1120g, are formed within the well 1140. The additional vertical surface 1120f is a surface of a shorter wall that extends a distance between a bottom surface of the deep well portion 1116 (a portion of the well surface 1120c, which is not partially covered with the opaque layer 1147) and a bottom surface of the shallow well portion 1117 (a portion of the well surface 1120c, which is now partially covered with the opaque layer 1147). A vertical surface 1120h extends from the bottom surface of the shallow well portion 1117 to a highest point of the opaque layer 1147 to forms a vertical boundary for the shallow well. A horizontal surface 1120*i* is formed on a horizontal portion of the wall of the nanowell perpendicular the to the vertical surface 1120*h*.

Returning to the workflow 1100 in FIGS. 11A-11B, the one or more of the surfaces 1120*a-i*, on a frontside of a substrate 1110 are coated with a polymer (to which oligonucleotides have been coupled) 1109 such that the polymer 1109 is in contact with the one or more surfaces 1120*a-i* (1105). The backside 1188 of the substrate 1110 is exposed to light 1130 to generate active moieties on certain of the surfaces (e.g., surfaces 1120*a*-1120*b*, and the portion of 1120*c* that is not covered with the opaque layer) (1115). Because the substrate 1110 is comprised of a material with UV transparency (e.g., fused silica, glass, etc.), irradiating the substrate with light 1130 from a light source (not depicted) positioned at the backside 1188 of the substrate (i.e., providing a backside exposure to the substrate), generates active moieties 1121 in the region of the polymer 1127 coating the first region 1116 of the bottom of the nanowell 1114, as well as certain of the other upper surfaces 1120*a*-1120*b* which are not covered with the opaque layer 1147. The regions of the polymer 1109 the opaque layer 1147 are not irradiated enough to activate the moieties in the polymer in certain regions 1120*f*-1120*i*, because the opaque material layer 1147 blocks the light 1130 (i.e., the backside UV radiation exposure). The activated moieties (i.e., the activated moieties are grafted 1160 to the substrate 1110 (1125). To irradiate the moieties in the remainder of the polymer 1109, which have not been grafted to the substrate, the frontside 1189 of the substrate 1110 is exposed to light 1132 to generate active moieties 1121 in the portions of the polymer 1109 on these surfaces (e.g., surfaces 1120*f*-1120*i*) (1135). The activated moieties 1121 (i.e., the activated moieties are grafted 1161 to the substrate 1110 (1145). In some examples, the materials grafted to the horizontal surfaces on the walls of the nanowell 1120*a*, 1120*i*, are polished and removed (1155).

Figure 13A:
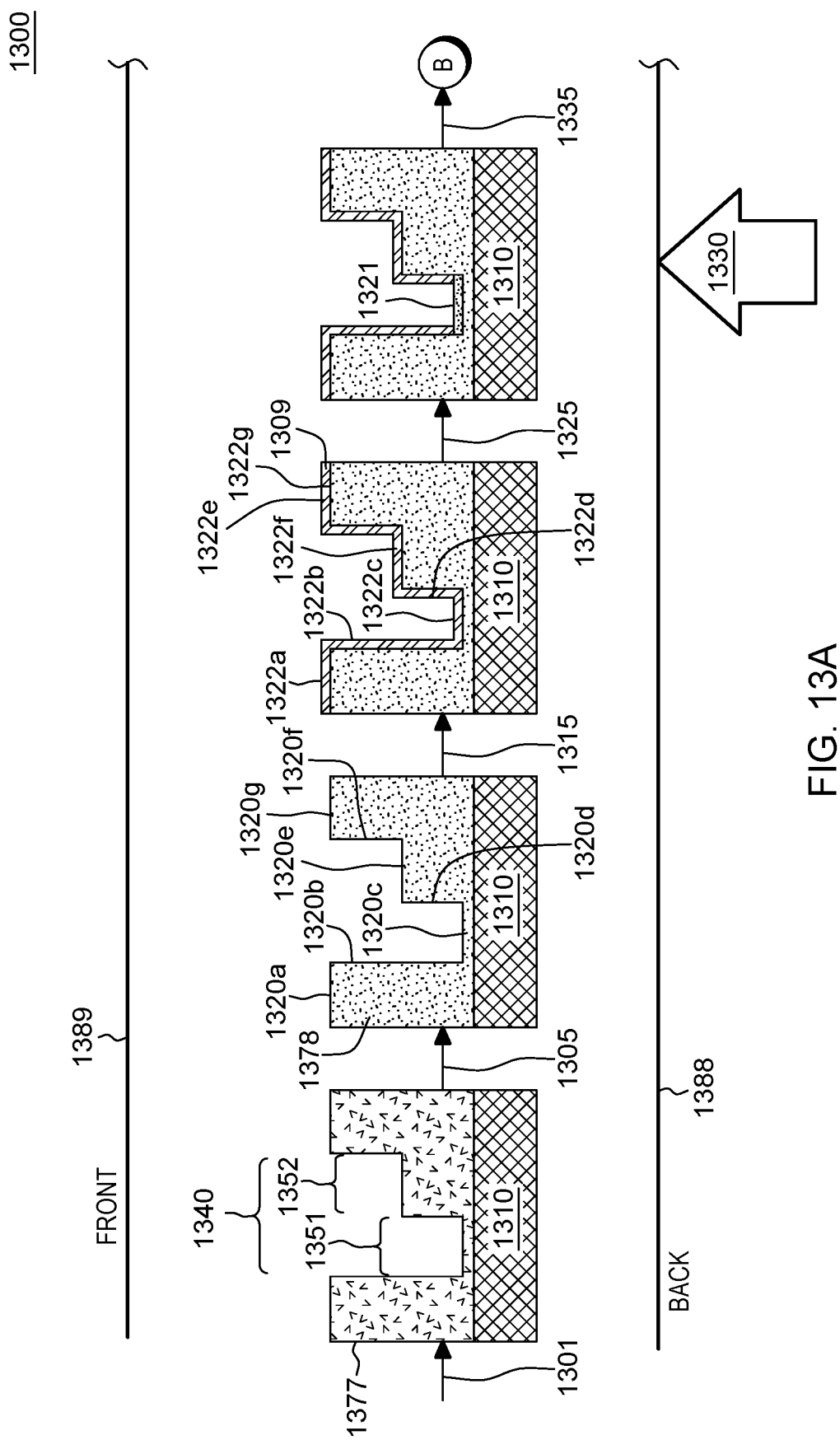
FIGS. 13A-13B illustrates a workflow performed on a substrate with multi-depth wells and includes both backside and frontside exposure of the substrate to light.
Figure 13B:
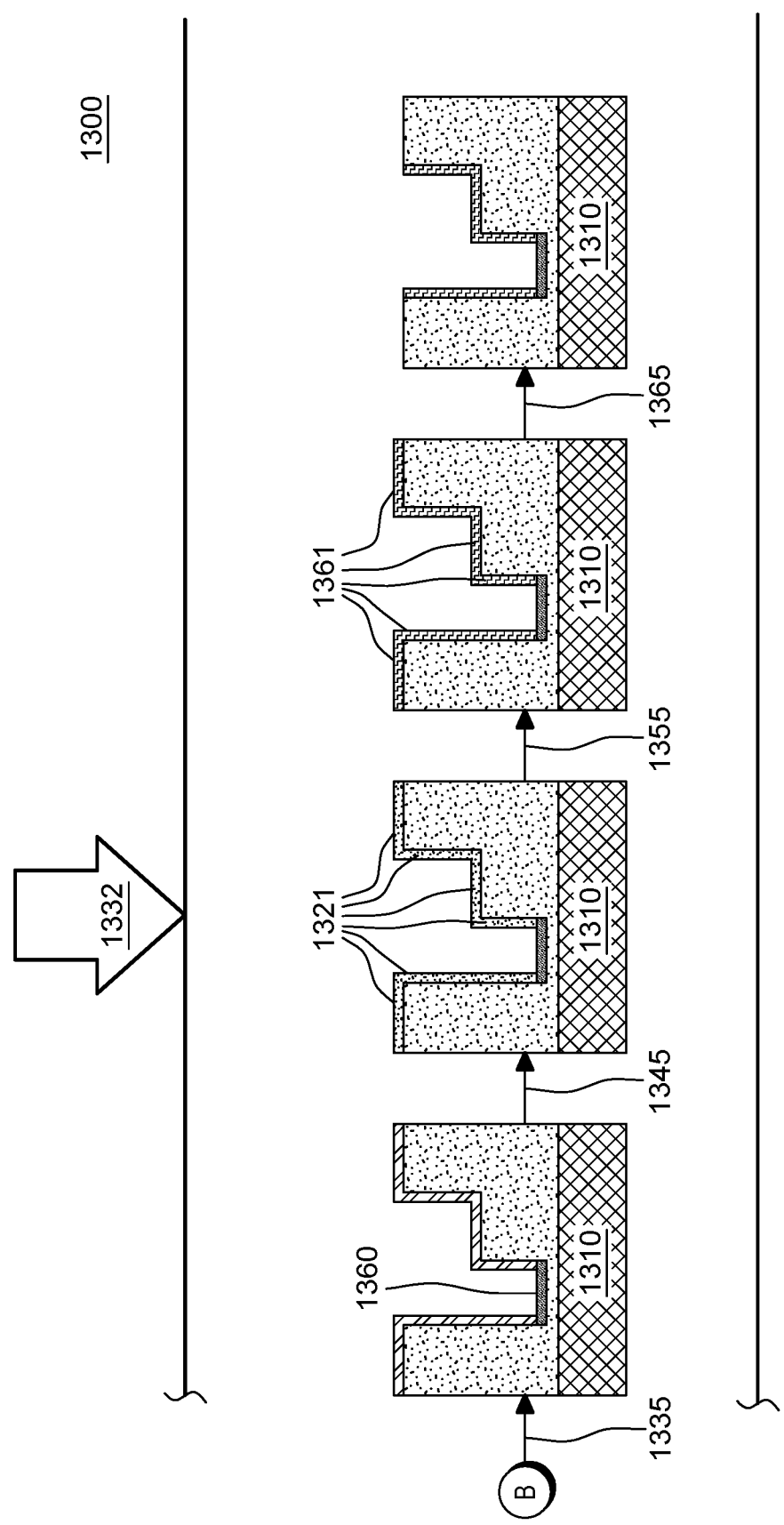

While FIG. 10 and FIGS. 11A-11B demonstrate how aspects of examples of the technique discussed herein can be utilized to convert a substrate with a single depth nanowell into, effectively, a multi-depth nanowell, by generating two different regions in the well, FIG. 12 and FIGS. 13A-13B apply aspects of technique to a substrate 1210, 1310 with one or more multi-depth wells. The thickness of NIL resin is different under a multi-depth nanowell and this differential can be used to selectively graft one or more multi-depth nanowells with light activated molecules. Different chemistry can be patterned in a different areas of a multi-depth nanowell with this process, without alignment. FIG. 12 illustrates a workflow 1200 with aspects performed on a substrate 1210 that includes one or more multi-depth wells with UV absorbing resin. The workflow 1200 includes exposing the substrate to light (e.g., UV radiation) from both the backside 1288 and the frontside 1289. As will be discussed in greater detail below, in this workflow, primers (e.g., P5 and P7 primers) coupled to substrate 1210 surfaces of the substrate, form "seeds" at locations on the surfaces of the substrate 1210 for the oligonucleotides coupled to a polymer to seed. Meanwhile, in FIGS. 13A-13B, a workflow 1300 illustrates aspects of a process involving a substrate 1310 with one or more multi-depth wells with UV absorbing metal oxide and both backside 1388 and frontside 1389 exposure to light (e.g., UV radiation).

Referring first to FIG. 12, in this workflow, a substrate 1210 includes a well 1240 that is a multi-depth nanowell, including a shallow well portion 1252 and a deep well portion 1251. The well 1240 is filled with a combination of silane, including a functional group for attachment to an acrylamide copolymer by reaction with a corresponding functional group, and the acrylamide copolymer (e.g., PAZAM) 1284 (1205). Photoactive molecules 1286 are grafted on the acrylamide copolymer (1215) and hence, the photoactive molecules are also present in the well 1240. The backside 1288 of the substrate 1210 is exposed to light 1230 (e.g., UV radiation) from the backside 1288 of the substrate 1210 to generate active moieties 1221 within the deep well portion 1251 of the well 1240 (1225). The molecules 1286 within the shallow well portion 1252 are not activated, while the molecules 1263 in the deep well portion 1251 are, because the UV thickness of the absorbing resin comprising the substrate 1210 between the light source (not pictured) and the molecules 1286 in the shallow well portion 1252 are not sufficiently irradiated to activate moieties in the polymer.

In this example, the activated moieties 1221 are grafted to portions of the nanowell 1240 in portions, depending on the depth of portion of the nanowell where the inactive moieties are present. As illustrated in FIG. 12, the activated moieties 1221 within the deep well portion 1251 of the well 1240 are grafted 1260 to the substrate 1210 with a primer (e.g., P5) (1235). To graft the molecules in the shallow portion of the well 1252, the inactive moieties in this portion of the well 1240 are first activated by exposing the substrate 1210 to a light 1232 from a light source positioned at the frontside 1289 of the substrate 1210 (1245). This frontside exposure generates active moieties 1221 within the shallow portion 1252 of the well 1240. The material in the deep portion 1251 of the well 1240, which was grafted using a primer, is not affected by the frontside exposure, in this example. The activated moieties 1221 within the shallow well portion 1252 of the well 1240 are grafted 1261 to the substrate 1210 with a primer (e.g., P7) (1255). Thus, in this non-limiting example, utilizing at one or more different primers and at least two positions for light sources, the activated moieties 1221 of the polymer are grafted to the well 1240 in the substrate.

FIGS. 13A-13B, as aforementioned, also illustrates a method 1300 involving a substrate 1310 with one or more multi-depth wells. As in the workflow 1200 of FIG. 12, this workflow 1300 involves exposing the substrate and inactive moieties to light from the backside 1388 as well as from the frontside 1389 of the substrate 1310 to graft active moieties to the well(s) 1340. The substrate 1310 in this example includes materials selected for their adhesion properties to acrylamide polymers and derivatives thereof and a material that is opaque to UV radiation, but may or may not be transparent to visible light, including but not limited to, metal oxide (e.g., TiO2, ZnO, BN, etc.). This portion of the substrate that includes the well 1340. This well 1340 includes a shallow well portion 1352 and a deep well portion 1351.

As illustrated in FIGS. 13A-13B, the portion of the substrate 1310 that includes the well 1340 is imprinted using a chemical process, including but not limited to a sol-gel process (1301). The result of this process is a well portion 1377 that is not annealed. A heat treatment is applied to the well portion 1377 of the substrate 1310 to anneal the material, such that the material is annealed 1378 (1305). In some example, the material comprising the well portion 1377 is metal oxide (e.g., TiO2) and the metal oxide is annealed using a heat treatment. The top surfaces 1320*a*-1320*g* of the well 1340 are coated with the polymer 1309 (e.g., PAZAM) (1315).

As with other examples herein, different portions of the inactive moieties in the polymer 1309 are activated using a backside light exposure and then, frontside light exposure. In this example, the inactive moieties in the portion of the polymer 1322c in contact with the surface 1320c, the bottom surface of the deep well portion 1351, are activated utilizing light 1330 from the backside 1388 of the substrate 1310 (1325). These active moieties 1321 are then grafted 1360 to the bottom surface 1320c of the deep well portion 1351 (1335). The portions of the polymer 1309 that include inactive moieties 1322a-1322b, 1322d-1322g and are not grafted to the substrate 1310 are then irradiated with a light 1332 from the frontside 1389 of the substrate 1310 (1345). As a result of being exposed to the light 1332 (e.g., UV radiation), the moieties in these portions 1322a-1322b, 1322d-1322g of the polymer 1309 are activated 1321. These newly active moieties 1321 are then grafted 1361 to surfaces to which they are connected 1320a-1320b, 1320d-1320g (1355). In some examples, the materials grafted to the horizontal surfaces on the walls of the nanowell 1320a, 1320g are polished and removed (1365).

While various illustrative examples are described above, it will be apparent to one skilled in the art that various changes and modifications may be made therein without departing from the disclosed subject matter. The appended claims are intended to cover all such changes and modifications that fall within the true spirit and scope of the disclosed subject matter.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein and may be used to achieve the benefits and advantages described herein.

What is claimed is:

1. A method of coupling oligonucleotides to a polymer, comprising
    selectively irradiating first inactive moieties in a one or more first region of a polymer with light, while not irradiating second inactive moieties in a one or more second region of the polymer, to generate first active moieties in the one or more first region of the polymer;
    coupling the first active moieties to first oligonucleotides;
    irradiating the second inactive moieties in the one or more second region of the polymer with light to generate second active moieties in the one or more second region of the polymer; and
    coupling the second active moieties to second oligonucleotides, wherein
    one or both of the first inactive moieties and the second inactive moieties comprise a protecting group wherein the protecting group is selected from an o-nitrobenzyl having a structure selected from

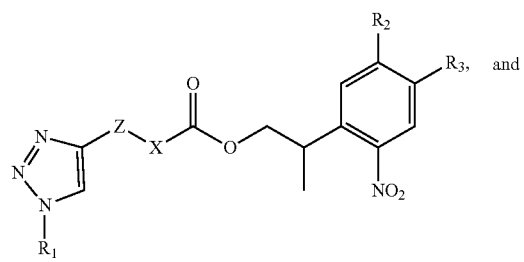

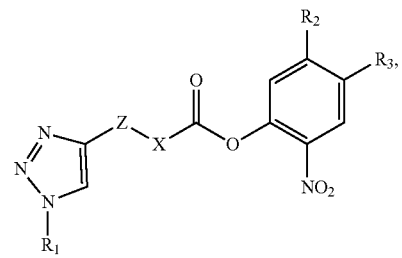

wherein $R_2$ and $R_3$ are each independently selected from —H and —O—$CH_3$, and
a benzopyrone having a structure

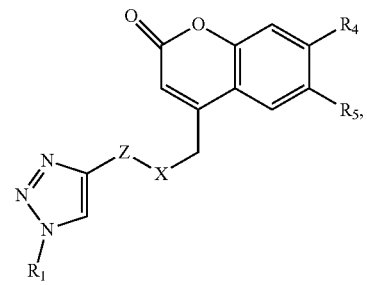

wherein $R_4$ is selected from —H, —O—$CH_3$, and —N—$(CH_3)_2$, and $R_8$ is selected from —H and —Br,
Z comprises an alkane comprising one or more of —$CH_2$—, (—$CH_2$—)$_m$, and (—$CH_2$—O—)$_n$, wherein m and n are independently an integer from 0 to 50, and
X is selected from —S— and —N(H)—, and
$R_1$ is a linkage to a backbone of the polymer.

2. The method of claim 1, wherein one or both of the first active moieties and the second active moieties comprise a triazole:

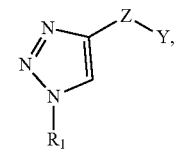

wherein
Z comprises an alkane comprising one or more of —$CH_2$—, (—$CH_2$—)$_m$, and (—$CH_2$—O—)$_n$, wherein m and n are independently an integer from 0 to 50,
Y comprises a backbone reactive group selected from an amine and a thiol, and
$R_1$ is a linkage to a backbone of the polymer.

3. The method of claim 2, wherein the backbone reactive group comprises an anine.

4. The method of claim 3, wherein the first oligonucleotides or second oligonucleotides are coupled to oligonucleotide reactive groups and the oligonucleotide reactive groups are selected from N-hydroxysuccinimide esters, carboxylic acids, and o-acylisoureas that react with the amine to form a coupling having the structure:

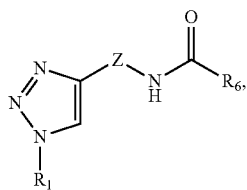

wherein
Z comprises an alkane comprising one or more of —$CH_2$—, (—$CH_2$)$_m$, and (—$CH_2$—O—)$_n$, wherein m and n are independently an integer from 0 to 50,
$R_6$ comprises the first oligonucleotides or the second oligonucleotides, and
$R_1$ is a linkage to a backbone of the polymer.

5. The method of claim 2, wherein the backbone reactive group comprises a thiol.

6. The method of claim 5, wherein the first oligonucleotides or second oligonucleotides are coupled to oligonucleotide reactive groups and the oligonucleotide reactive groups are vinylsulfones that react with the thiol to form a coupling having the structure:

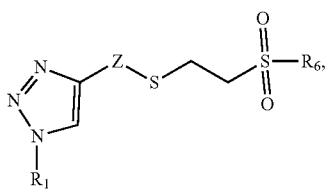

wherein
Z comprises an alkane comprising one or more of —$CH_2$—, (—$CH_2$)$_m$, and (—$CH_2$—O—)$_n$, wherein m and n are independently an integer from 0 to 50,
$R_6$ comprises the first oligonucleotides or the second oligonucleotides, and
$R_1$ is a linkage to a backbone of the polymer.

7. The method of claim 5, wherein the first oligonucleotides or second oligonucleotides are coupled to oligonucleotide reactive groups and the oligonucleotide reactive groups are maleimides that react with the thiol to form a coupling having the structure:

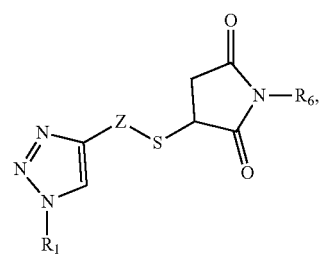

wherein
Z comprises an alkane comprising one or more of —$CH_2$—, (—$CH_2$)$_m$, and (—$CH_2$—O—)$_n$, wherein m and n are independently an integer from 0 to 50,
$R_6$ comprises the first oligonucleotides or the second oligonucleotides, and
$R_1$ is a linkage to a backbone of the polymer.

8. The method of claim 5, wherein the first oligonucleotides or second oligonucleotides are coupled to oligonucleotide reactive groups and the oligonucleotide reactive groups are acrylamides that react with the thiol to form a coupling having the structure:

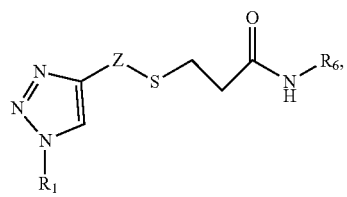

wherein
Z comprises an alkane comprising one or more of —$CH_2$—, (—$CH_2$)$_m$, and (—$CH_2$—O—)$_n$, wherein m and n are independently an integer from 0 to 50,
$R_6$ comprises the first oligonucleotides or the second oligonucleotides, and
$R_1$ is a linkage to a backbone of the polymer.

9. The method of claim 1, wherein:
the polymer contacts a plurality of surfaces on a top side of a substrate, and
one or both of the irradiating the first inactive moieties in the one or more first region of the polymer with light to generate the first active moieties in the one or more first region of the polymer and the irradiating the one or more second inactive moieties in the one or more second region of the polymer with light to generate the second active moieties in the one or more second region of the polymer comprises irradiating at least one surface of the plurality of surfaces.

10. The method of claim 9, wherein the plurality of surfaces comprise surfaces of nanowells and one or both of the irradiating the first inactive moieties in the one or more first region of the polymer with light and the irradiating the second inactive moieties in the one or more second region of the polymer with light comprises irradiating a bottom side of the substrate with ultraviolet radiation.

11. The method of claim 9, wherein the plurality of surfaces comprise surfaces of nanowells and a portion of the surfaces of the nanowells comprise a waveguide.

12. The method of claim 11, wherein one or both of the first inactive moieties in the one or more first region of the polymer and the second inactive moieties in the one or more second region of the polymer is irradiated by the waveguide.

13. The method of claim 11, wherein the substrate further comprises a material with low transparency to ultraviolet radiation.

14. The method of claim 9, wherein the plurality of surfaces comprise surfaces of multidepth nanowells and the multidepth nanowells comprise a deep portion and a shallow portion, wherein the one or more first region of the polymer contacts the deep portion and the one or more second region of the polymer contacts the shallow portion, and irradiating the first inactive moieties comprises:
irradiating a bottom side of the substrate and irradiating the second inactive moieties comprises:
irradiating the top side of the substrate.

15. The method of claim 9, wherein the plurality of surfaces comprise surfaces of multidepth nanowells and the multidepth nanowells comprising a deep well and a shallow well, wherein the one or more first region of the polymer contacts a bottom surface of the deep well and the one or more second region of the polymer contacts a bottom of the shallow, and:

irradiating the first inactive moieties comprises irradiating a bottom side of the substrate and irradiating the second inactive moieties comprises irradiating the top side of the substrate.

16. The method of claim 15, further Comprising:

polishing the substrate to remove excess activated moieties.

17. The method of claim 10, wherein a portion of the substrate comprises metal oxide, wherein the metal oxide portion defines a height and width of the deep well and a height and width of the shallow well.

18. The method of claim 9, further comprising:

before the irradiating, patterning metal oxide on a portion of the plurality of surfaces, wherein based on the patterning, the plurality of surfaces comprise substrate surfaces and metal oxide surfaces; and contacting the substrate surfaces with the one or more first region of the polymer and contacting the metal oxide surfaces with the one or more second region of the polymer.

19. The method of claim 18, wherein:

irradiating the first inactive moieties in the one or more first region of the polymer with light comprises irradiating a bottom side of the substrate; and irradiating the second inactive moieties in the one or more second region of the polymer with light comprises irradiating the top side of the substrate.

20. The method of claim 19, further comprising:

polishing the substrate to remove excess active moieties.

21. The method of claim 11, further comprising:

patterning the waveguide onto the substrate before the irradiating.

22. The method of claim 11, wherein:

irradiating the first inactive moieties in the one or more first region of the polymer comprises irradiating with the waveguide, and irradiating the second inactive moieties in the one or more second region of the polymer comprises irradiating the top side of the substrate.

23. The method of claim 12, further comprising:

polishing the substrate to remove excess inactive moieties.

* * * * *